United States Patent [19]

Ceshkovsky et al.

[11] 4,358,796
[45] Nov. 9, 1982

[54] SPINDLE SERVO SYSTEM FOR VIDEODISC PLAYER

[75] Inventors: Ludwig Ceshkovsky, Fountain Valley; Wayne R. Dakin, Redondo Beach, both of Calif.

[73] Assignee: Discovision Associates, Costa Mesa, Calif.

[21] Appl. No.: 130,901

[22] Filed: Mar. 17, 1980

Related U.S. Application Data

[62] Division of Ser. No. 890,670, Mar. 27, 1978, abandoned.

[51] Int. Cl.³ .................... H04N 5/76; G11B 17/00
[52] U.S. Cl. ........................ 358/322; 358/338; 358/342; 369/44; 369/45; 369/50; 369/239
[58] Field of Search ............ 179/100.1 S, 100.4 E, 179/100.1 G, 100.3 V; 360/73, 36; 358/128.5, 128.6, 4, 8, ; 318/314, 318; 369/44, 45, 50, 111, 43, 239, 241

[56] References Cited

U.S. PATENT DOCUMENTS

| | | | |
|---|---|---|---|
| 3,646,259 | 2/1972 | Schuller | 360/73 |
| 3,829,622 | 8/1974 | Elliott | 369/221 |
| 3,940,556 | 2/1976 | Boltz | 179/100.4 E |
| 3,992,574 | 11/1976 | Bouwhuis | 369/45 |
| 3,992,575 | 11/1976 | Velzel | 369/45 |
| 4,005,259 | 1/1977 | Kaneko | 179/100.4 E |
| 4,006,293 | 2/1977 | Bouwhuis | 369/45 |
| 4,032,971 | 6/1977 | Comenik | 179/100.3 V |
| 4,037,252 | 7/1977 | Janssen | 369/46 |
| 4,074,314 | 2/1978 | Velzel | 369/45 |
| 4,100,577 | 7/1978 | Naruse | 369/45 |
| 4,118,735 | 10/1978 | Wilkinson | 369/44 |
| 4,123,779 | 10/1978 | Goldschmidt | 179/100.4 E |
| 4,152,586 | 5/1979 | Elliott | 369/45 |

OTHER PUBLICATIONS

"A Review of the MCA Discovision System" by Broadbent Jul. 1974, Journal of SMPTE vol. 83, pp. 554-559.

*Primary Examiner*—Alan Faber
*Attorney, Agent, or Firm*—Ronald J. Clark

[57] ABSTRACT

A video disc player is described for use with a video disc having frequency modulated video information recorded thereon in the form of a plurality of concentric circles or a single spiral. The information track comprises successively positioned light reflective and light non-reflective regions. A focused light beam is caused to be positioned over the center of an information track and the light reflected from the information track is gathered by an objective lens for application to electronic circuitry for recovering the recorded frequency modulated video signals. Radial tracking means are described for maintaining the focused light spot to impinge upon the center of an information track. Lens focusing means are described for positioning the objective lens at the optimum focused position above the information track for gathering the maximum amount of reflected light from the information track. FM processing means are described for reconstructing the recovered frequency modulated video information such that the ratio between the amplitude of the signals as recorded is essentially the same in the signals as recovered from the video disc member. Further servo means are described for handling the selective change of the intersection of the reading beam with the video disc member in a predetermined preferred mode of operation.

7 Claims, 32 Drawing Figures

SPINDLE SERVO

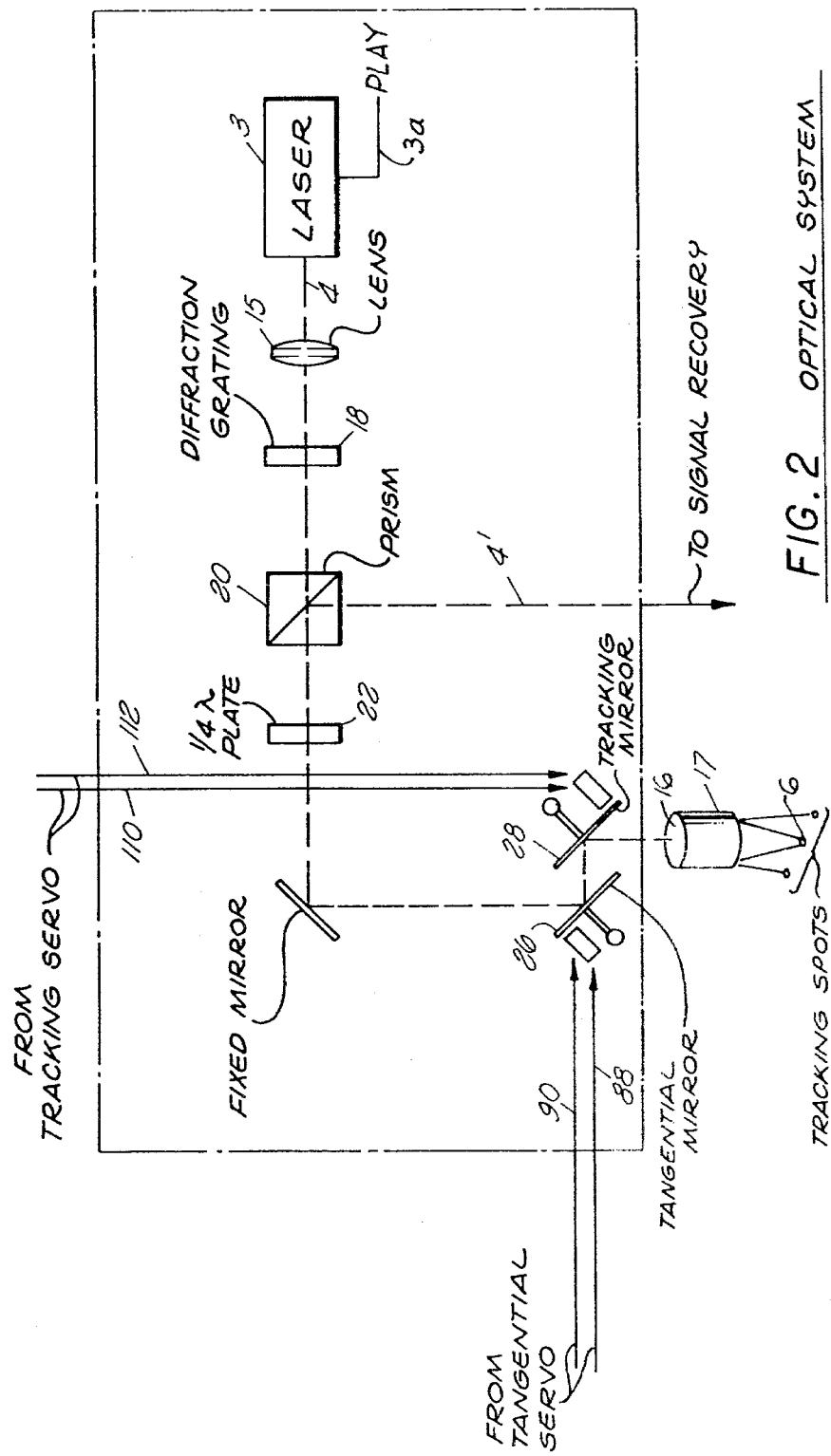
FIG. 2 OPTICAL SYSTEM

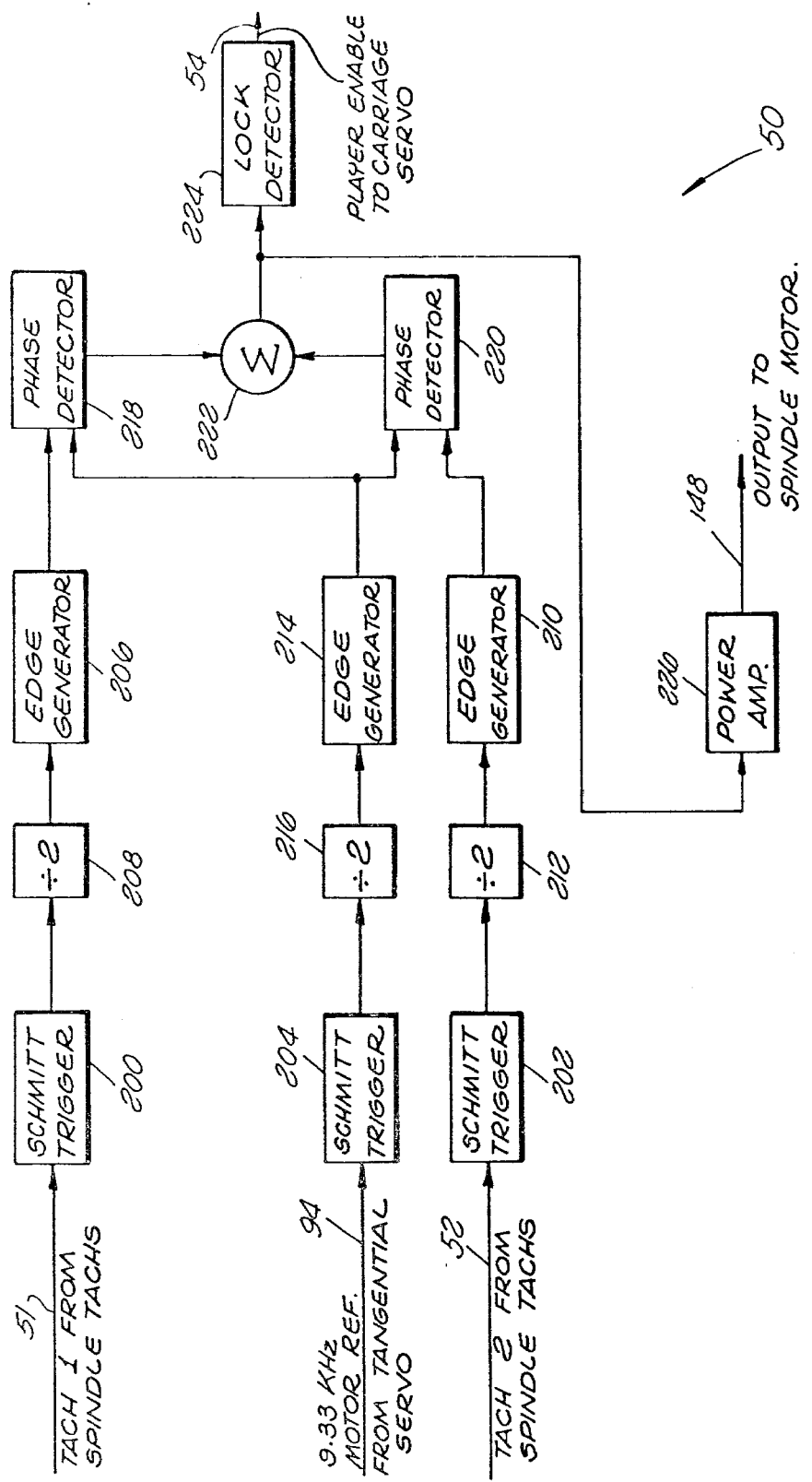
FIG. 3  SPINDLE SERVO

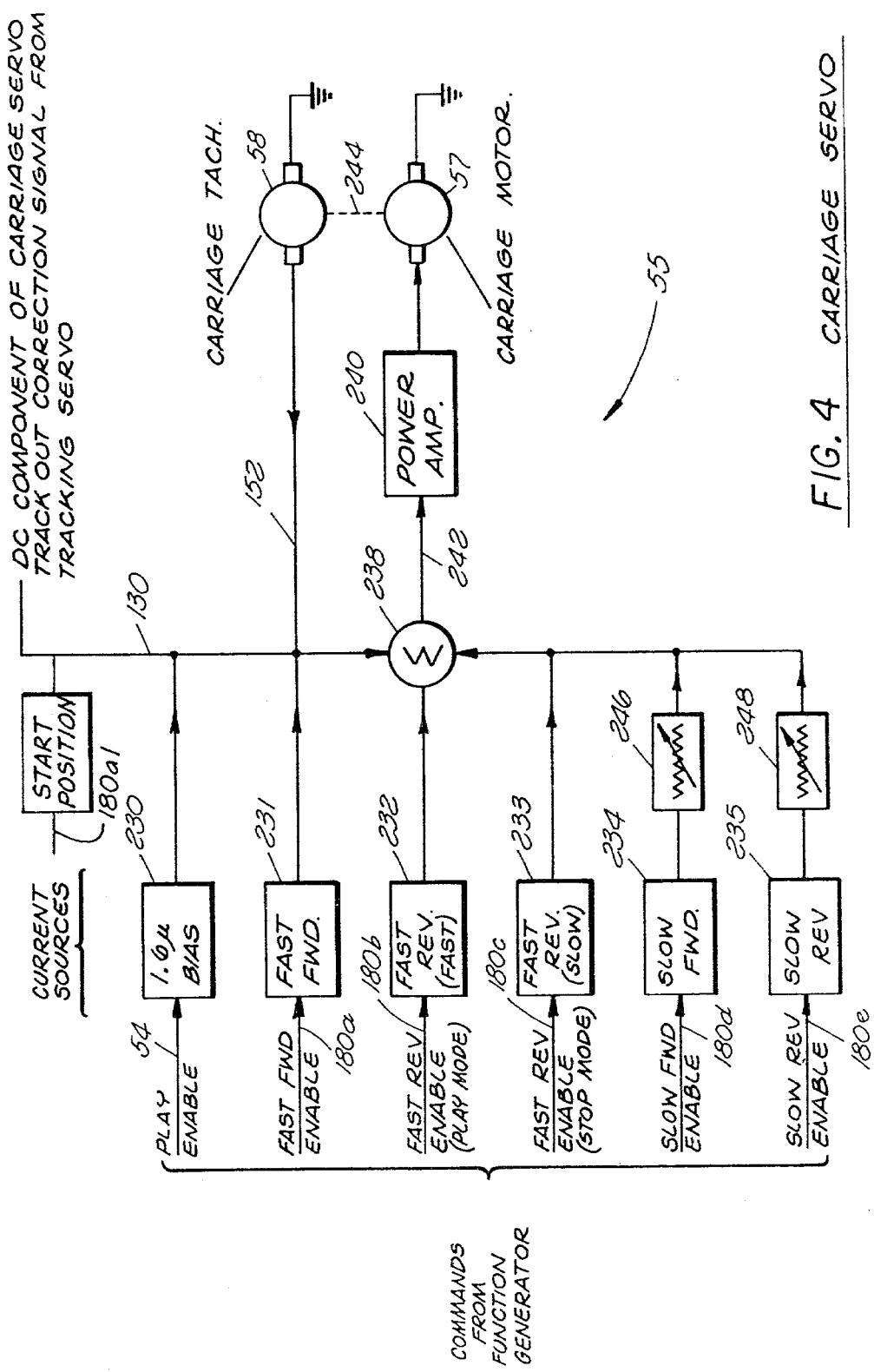
FIG. 4 CARRIAGE SERVO

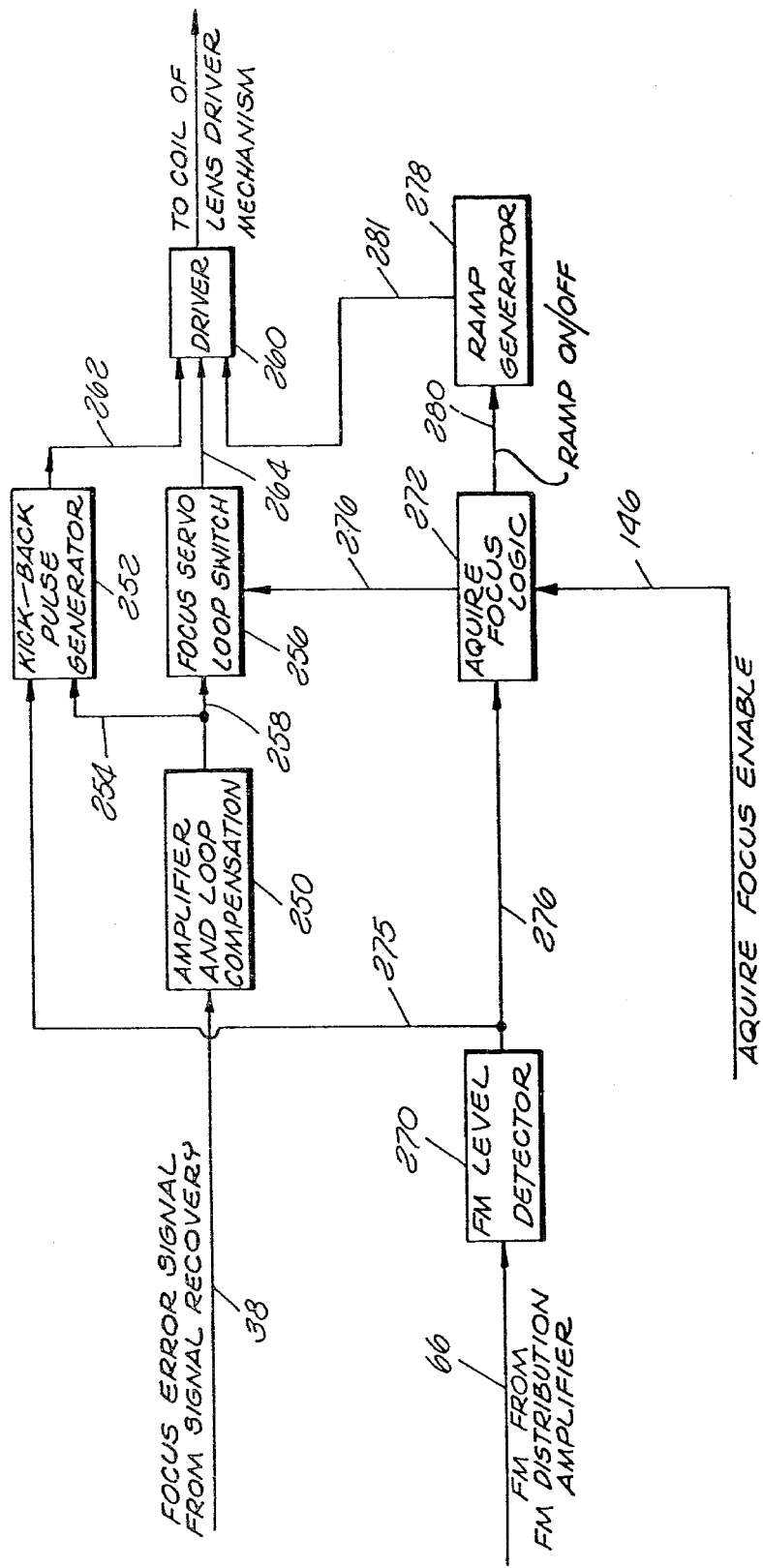
FIG. 5 FOCUS SERVO

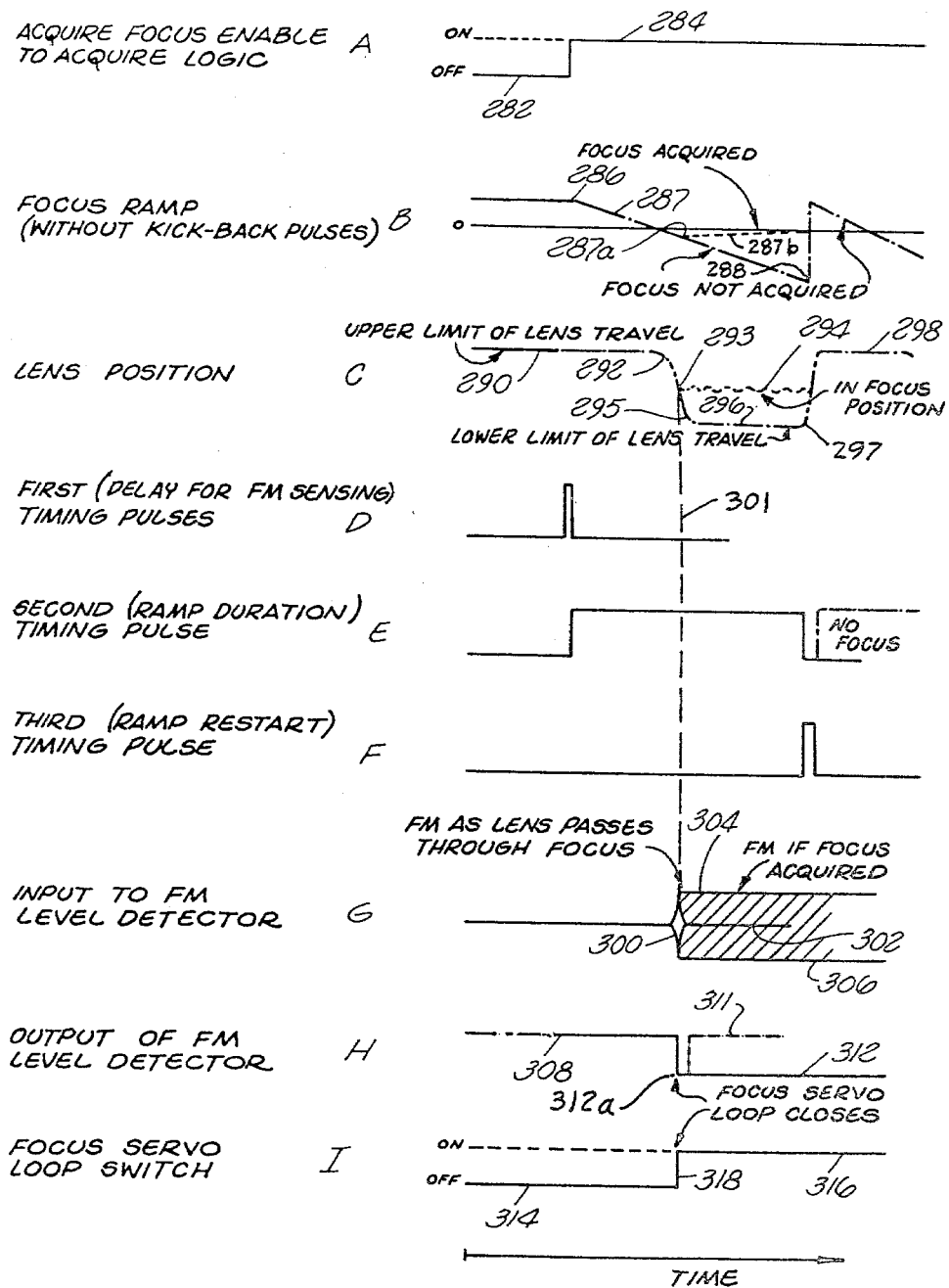
FIG. 6a FOCUS SERVO

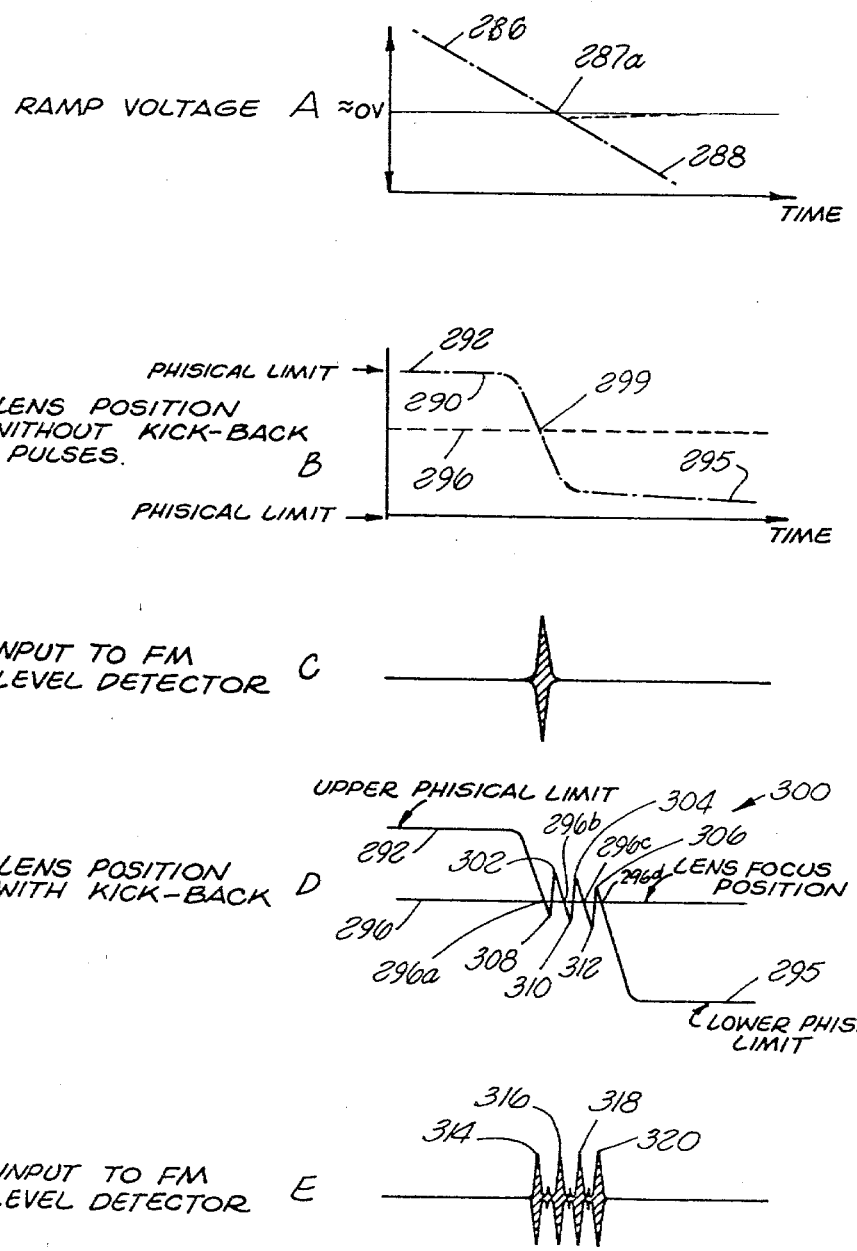
FIG. 6b. LENS FOCUS

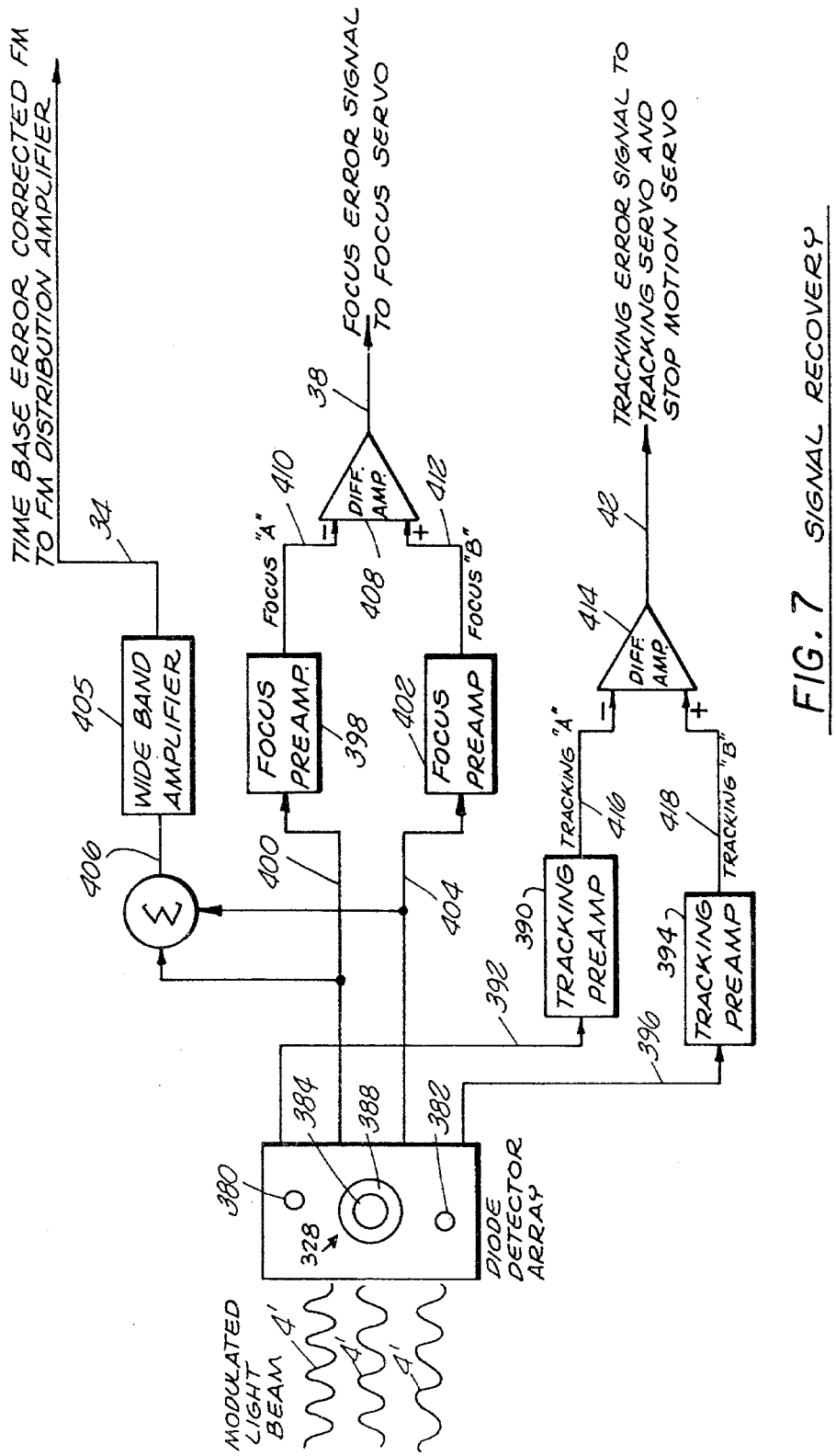
FIG. 7 SIGNAL RECOVERY

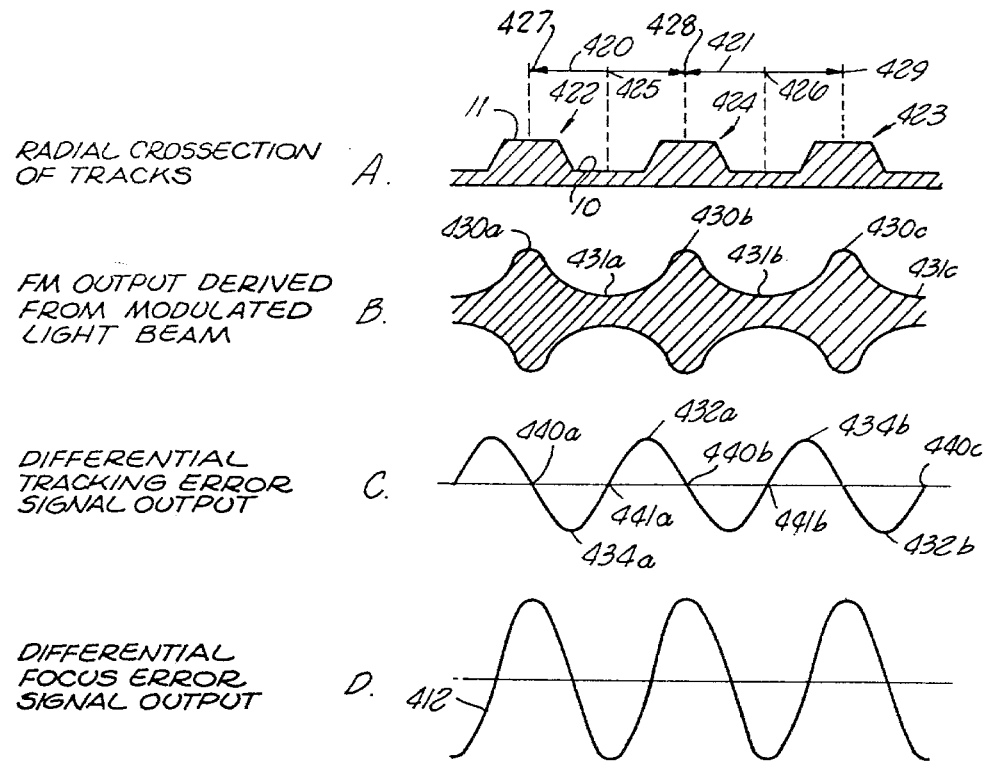
FIG. 8  SIGNAL RECOVERY
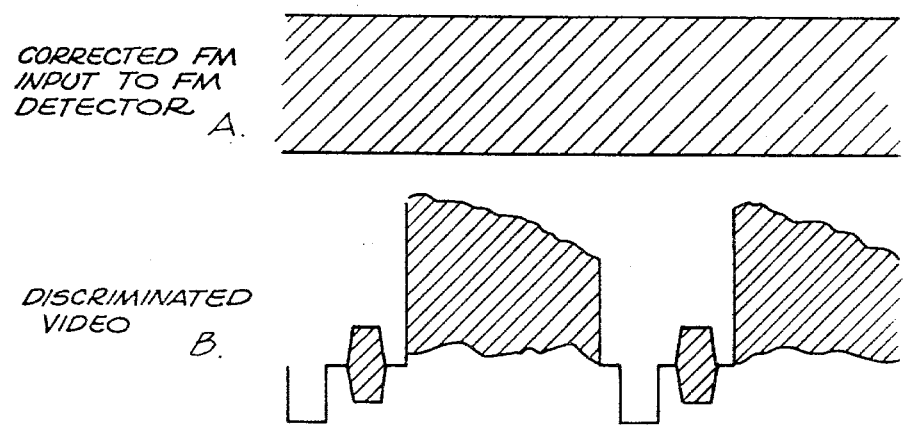
FIG. 18  FM DISCRIMINATOR

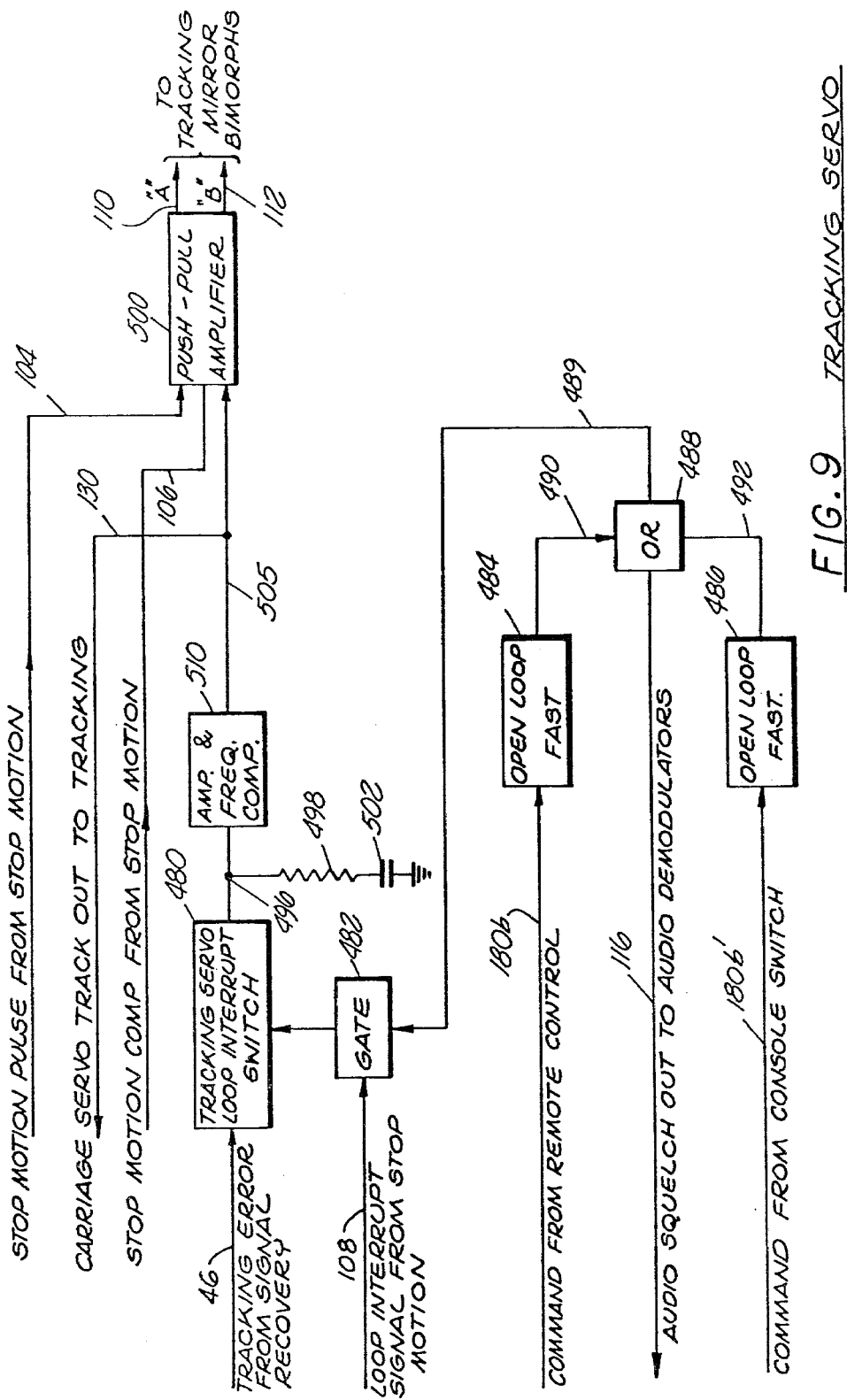

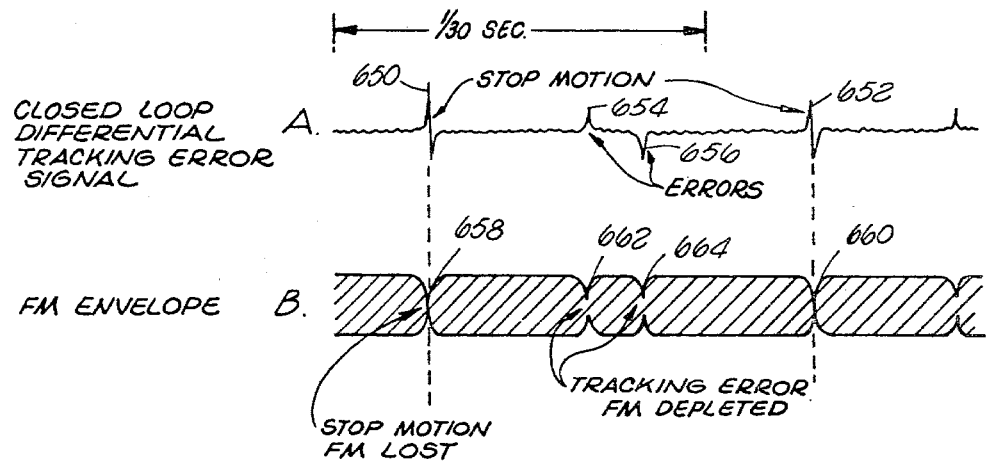
FIG. 13c  TRACKING SERVO
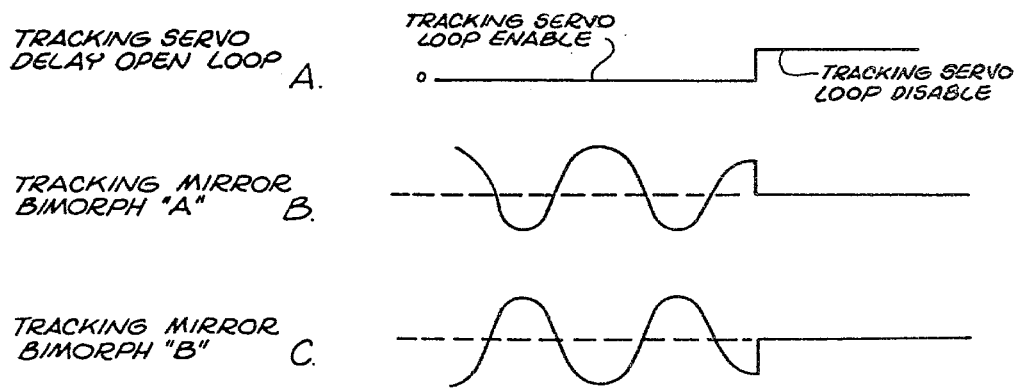
FIG. 10  TRACKING SERVO

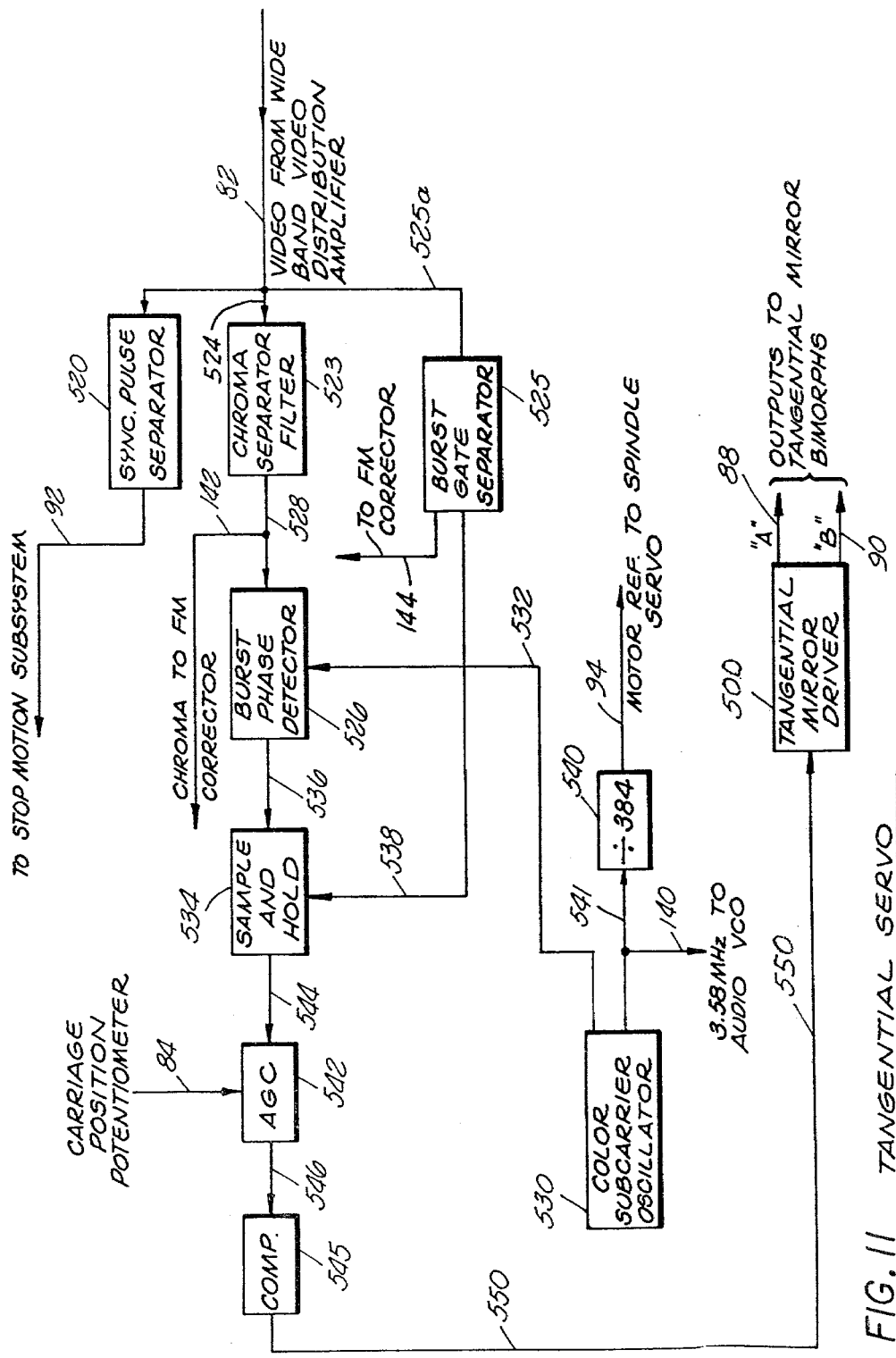
FIG. 11 TANGENTIAL SERVO

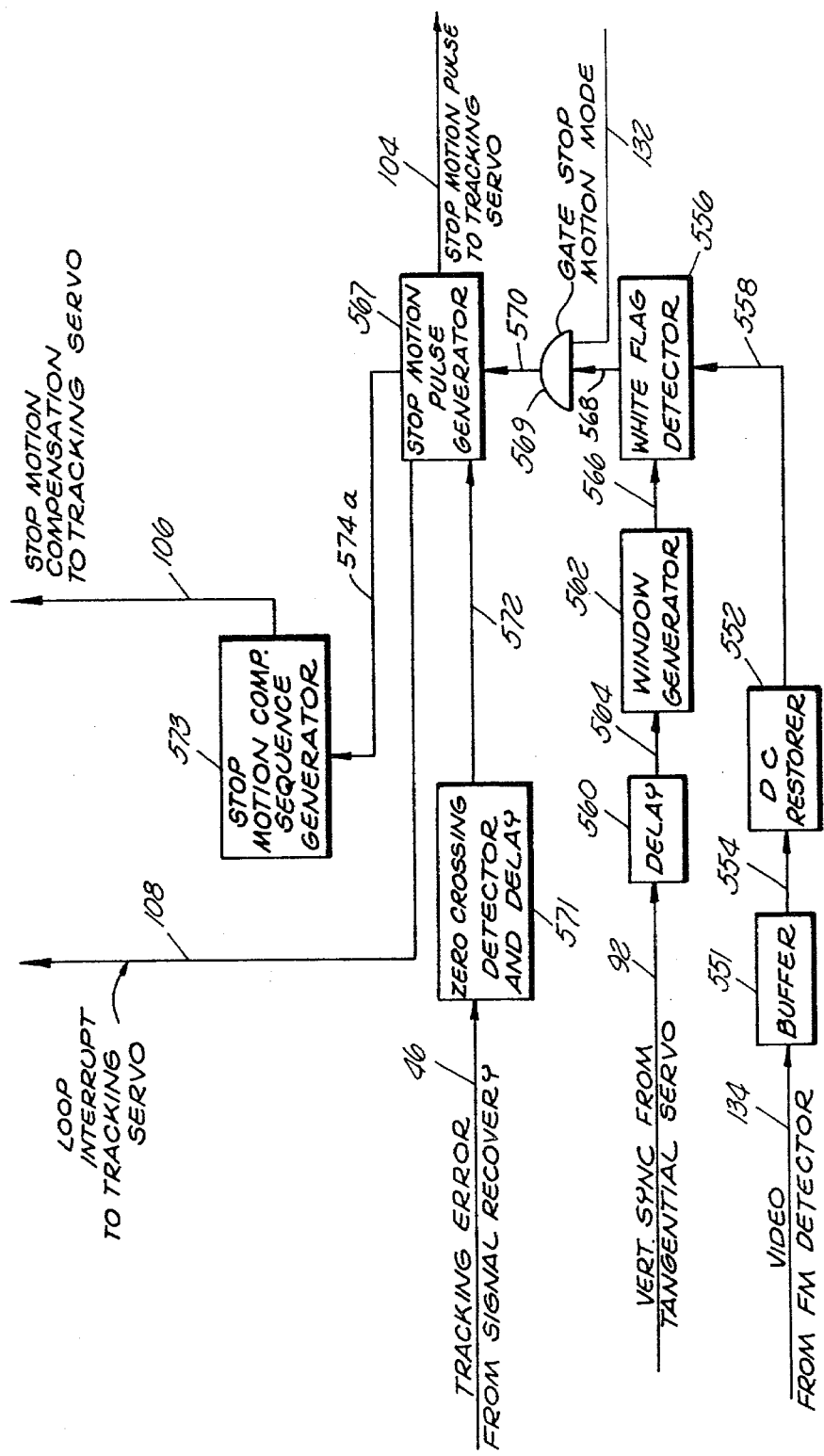
FIG. 12 STOP MOTION

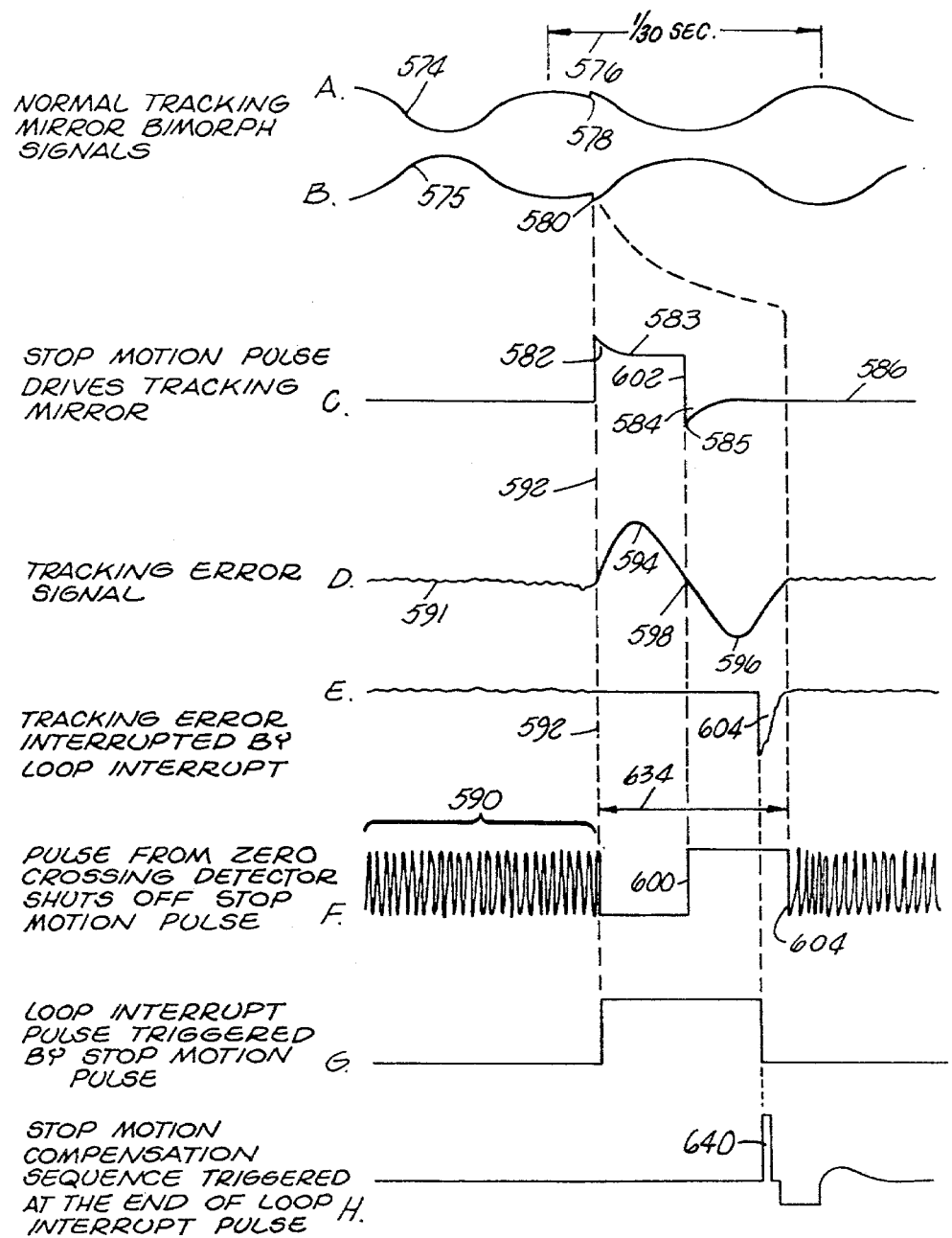
FIG. 13a STOP MOTION SIGNAL SEQUENCE

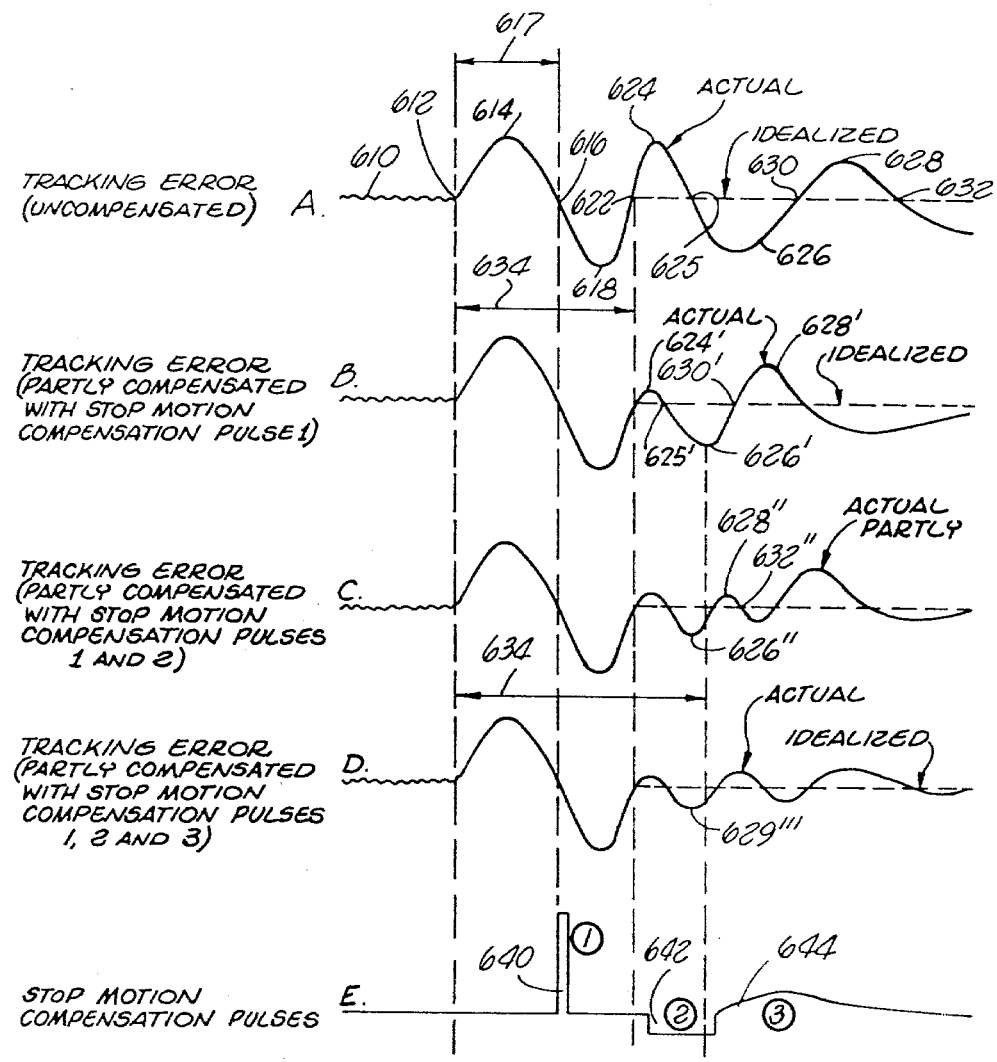
FIG.13b  STOP MOTION COMPENSATION

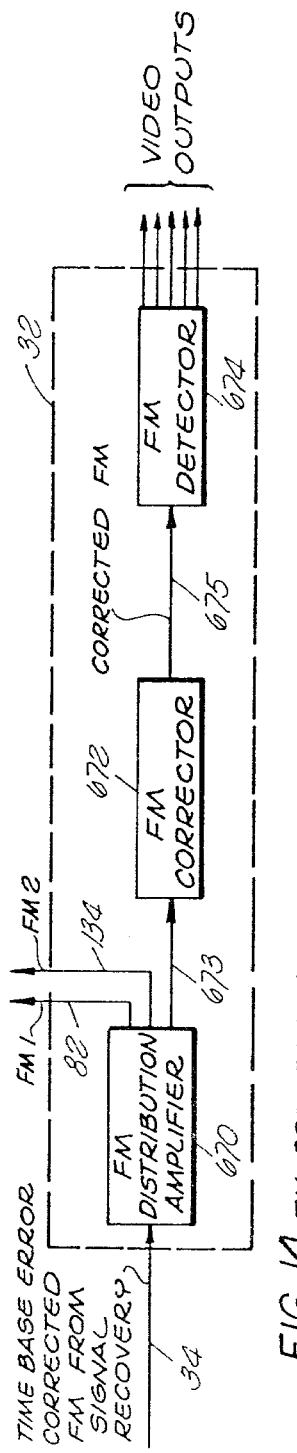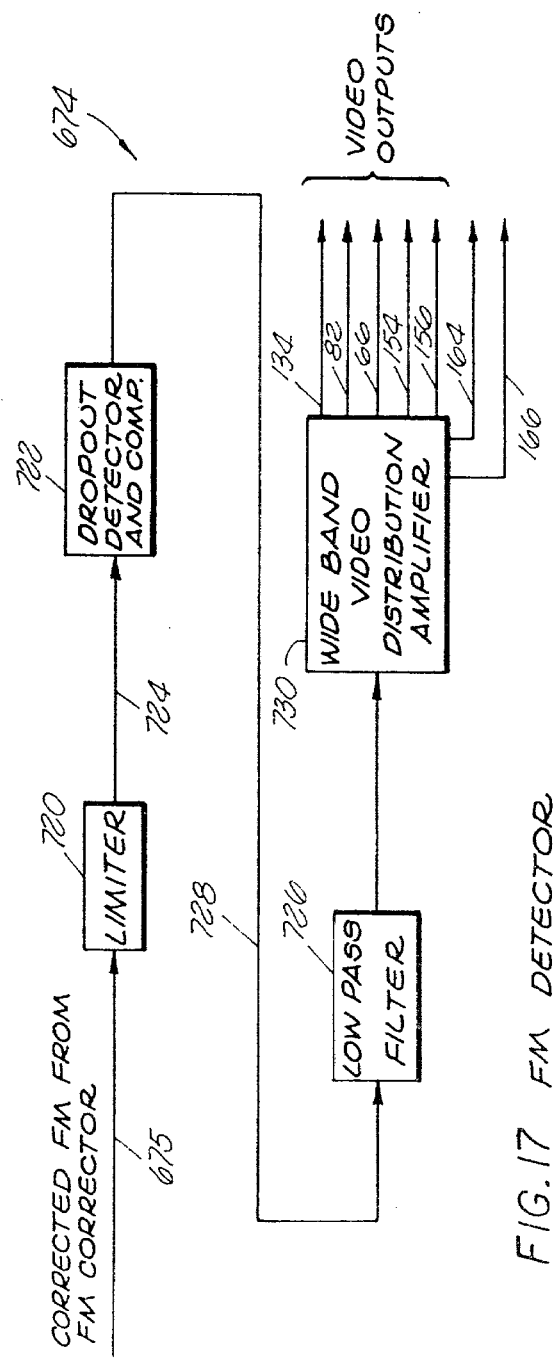

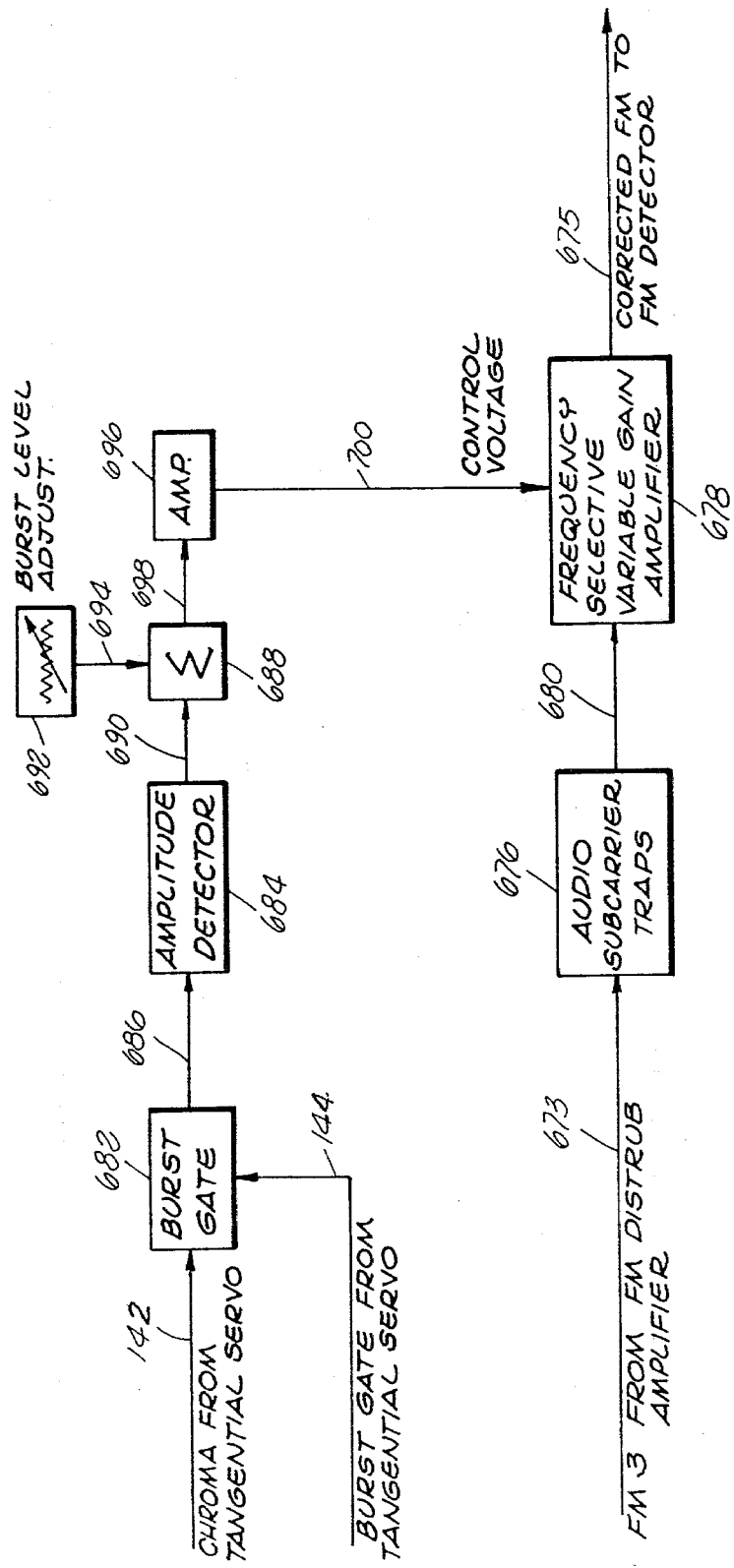
FIG. 15 FM CORRECTOR

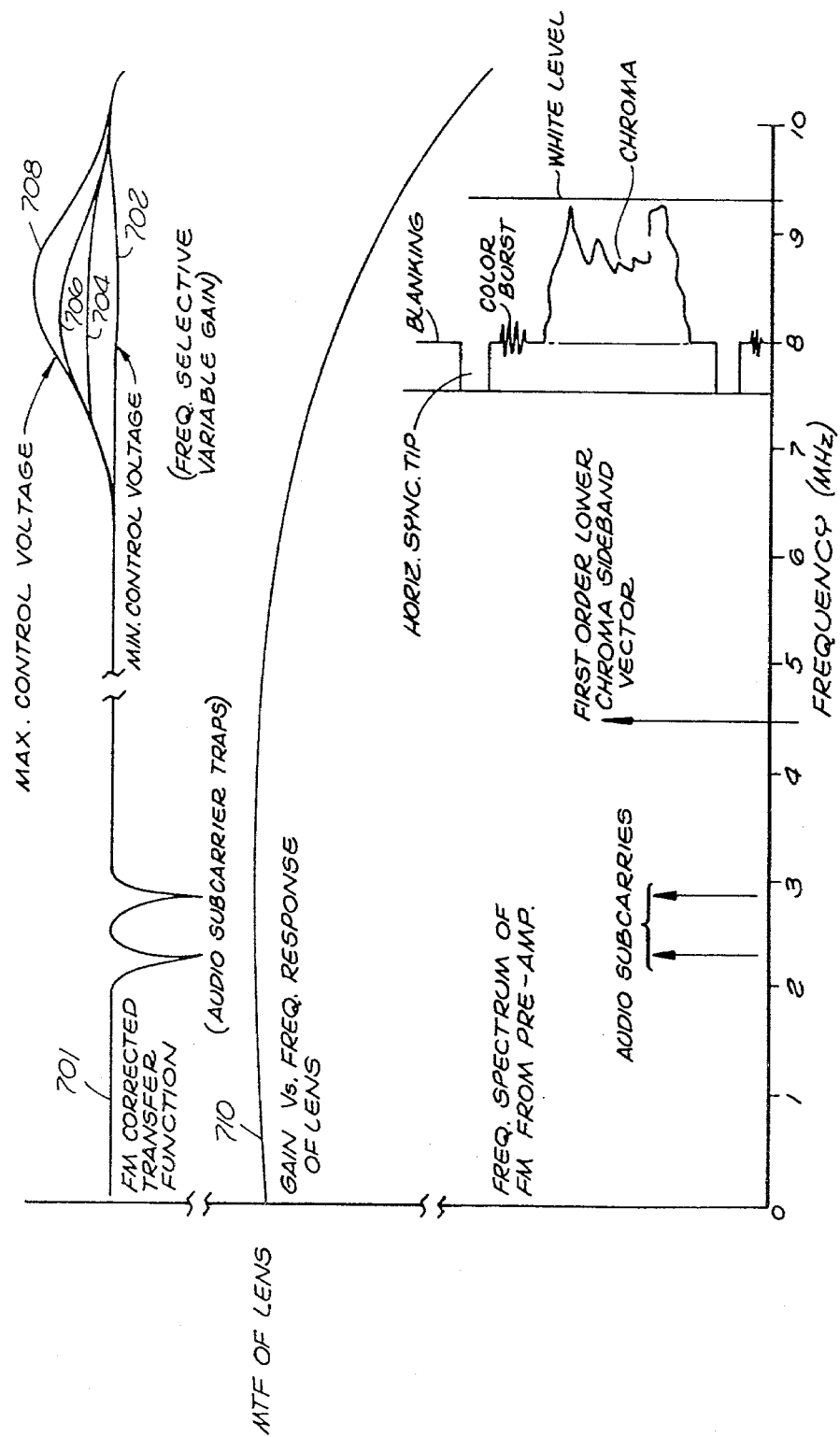
FIG. 16 FM CORRECTOR

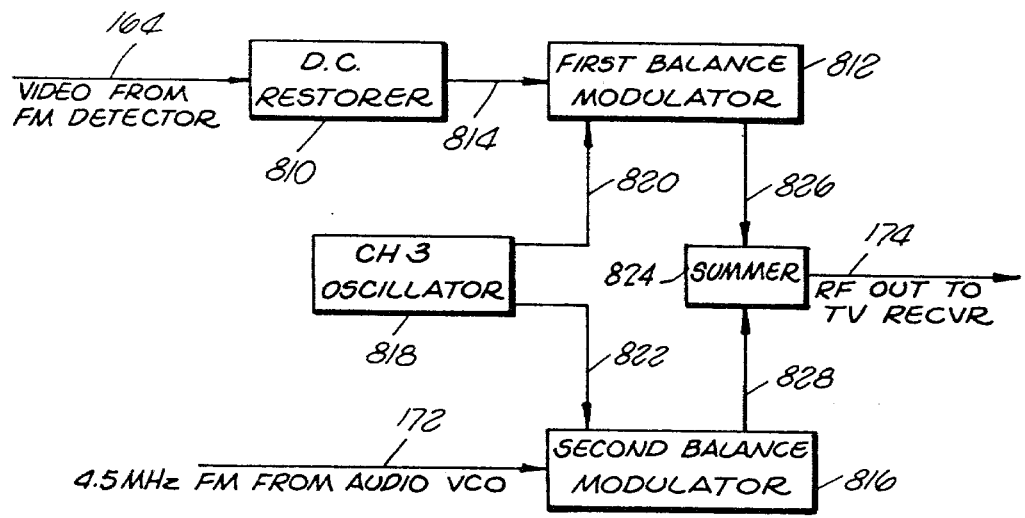
FIG. 24  RF MODULATOR
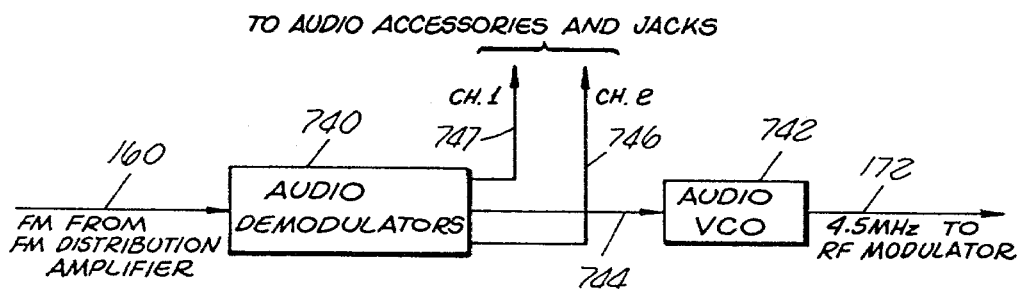
FIG. 19  AUDIO PROCESSING

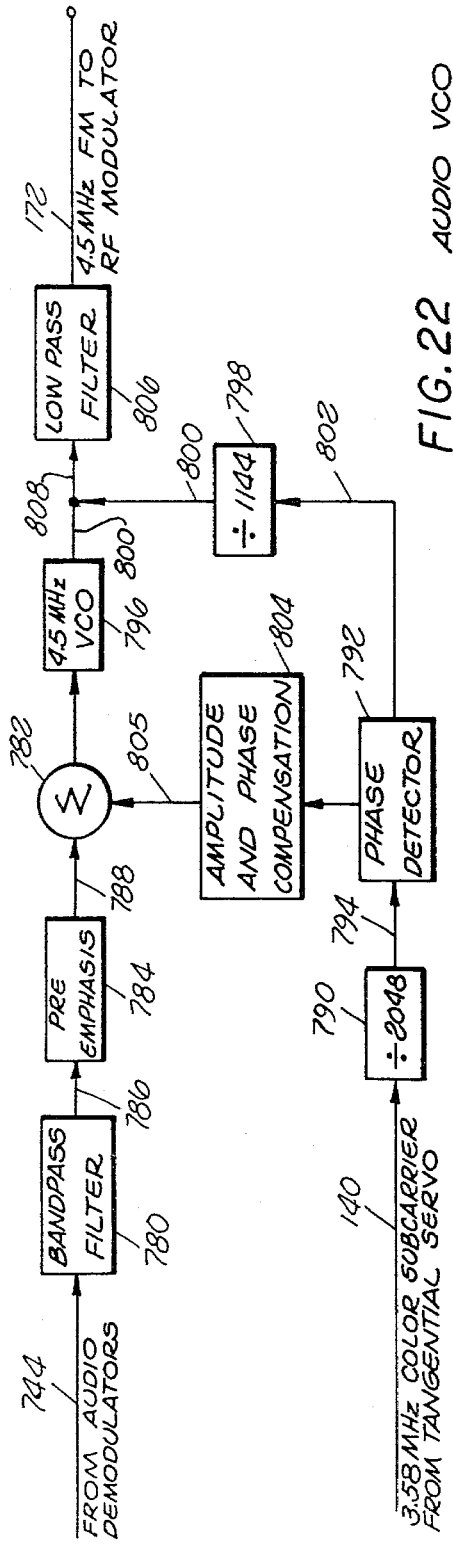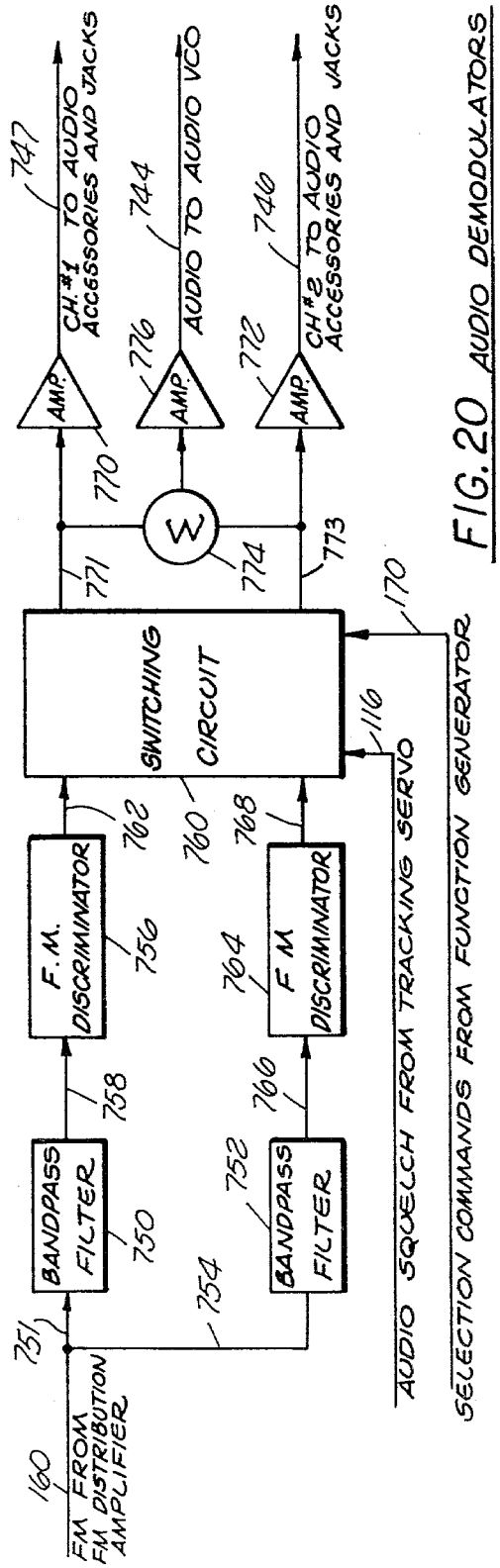
FIG. 22 AUDIO VCO
FIG. 20 AUDIO DEMODULATORS 4.5 MHz FM
FROM AUDIO VCO   A.   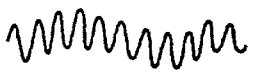
VIDEO FROM
FM DETECTOR   B.   
RF OUTPUT OF RF
MODULATOR TO T.V. RECVR.   C.   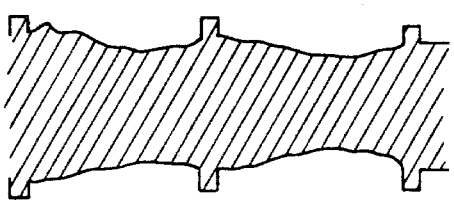
FIG. 25   RF MODULATOR
FM FROM FM DISTRIBUTION
AMPLIFIER   A.   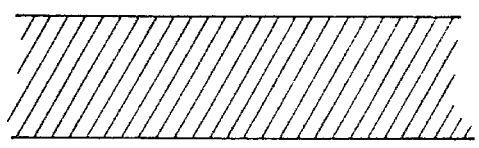
AUDIO OUTPUT OF
AUDIO DEMODULATOR   B.   
FIG. 21   AUDIO DEMODULATOR

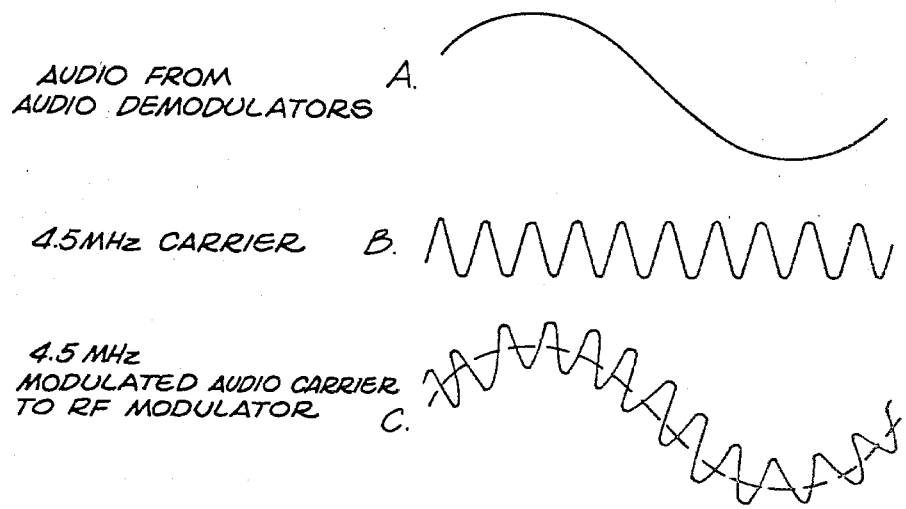
FIG. 23  4.5MHz VCO AUDIO MODULATOR
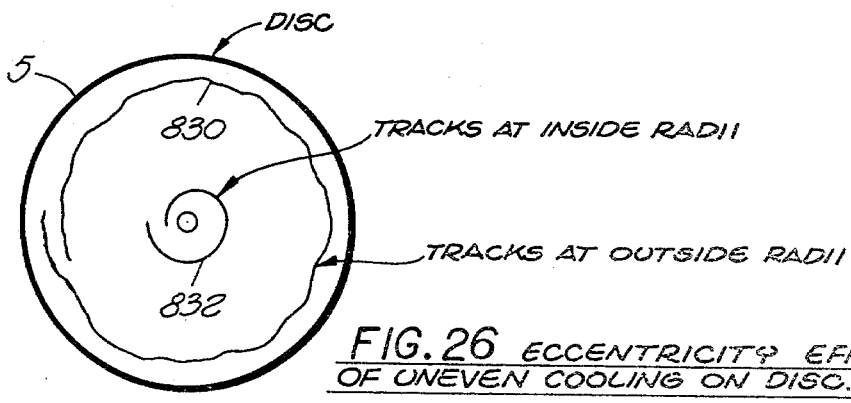
FIG. 26 ECCENTRICITY EFFECT OF UNEVEN COOLING ON DISC.
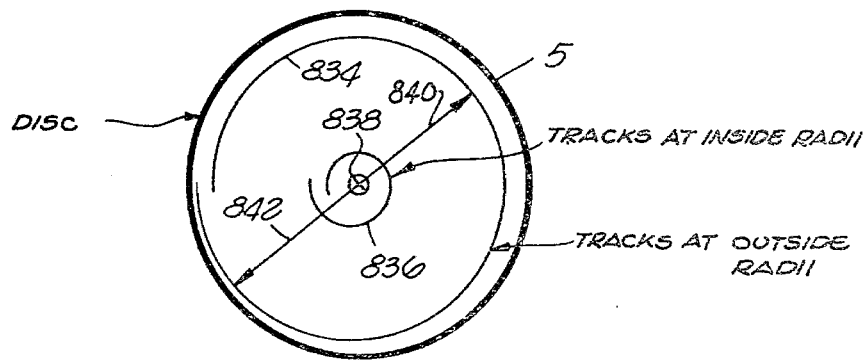
FIG. 27  ECCENTRICITY EFFECT OF OFF-CENTER RELATIONSHIP OF TRACKS TO CENTRAL APERTURE.

SPINDLE SERVO SYSTEM FOR VIDEODISC PLAYER

This is a division, of application Ser. No. 890,670, filed Mar. 27, 1978, now abandoned.

BACKGROUND OF THE INVENTION

Field of the Invention

The present invention relates to the method and means for reading a frequency modulated video signal stored in the form of successively positioned reflective and non-reflective regions on a plurality of information tracks carried by a video disc. More specifically, an optical system is employed for directing a reading beam to impinge upon the information track and for gathering the reflected signals modulated by the reflective and non-reflective regions of the information track. A frequency modulated electrical signal is recovered from the reflected light modulated signal. The recovered frequency modulated electrical signal is applied to a signal processing section wherein the recovered frequency modulated signal is prepared for application to a standard television receiver and/or monitor. The recovered light modulated signals are applied to a plurality of servo systems for providing control signals which are employed for keeping the lens at the optimum focus position with relation to the information bearing surface of the video disc and to maintain the focused light beam in a position such that the focused light spot impinges at the center of the information track.

SUMMARY OF THE INVENTION

The present invention is directed to a video disc player operating to recover frequency modulated video signals from an information bearing surface of a video disc. The frequency modulated video information is stored in a plurality of concentric circles or a single spiral extending over an information bearing portion of the video disc surface. The frequency modulated video signal is represented by indicia arranged in track-like fashion on the information bearing surface portion of the video disc. The indicia comprise successively positioned reflective and non-reflective regions in the information track.

A laser is used as the source of a coherent light beam and an optical system is employed for focusing the light beam to a spot having a diameter approximately the same as the width of the indicia positioned in the information track. A microscopic objective lens is used for focusing the read beam to a spot and for gathering up the reflected light caused by the spot impinging upon successively positioned light reflective and light non-reflective regions. The use of the microscopically small indicia typically 0.5 microns in width and ranging between one micron and 1.5 microns in length taxes the resolving power of the lens to its fullest. In this relationship, the lens acts as a low pass filter. In the gathering of the reflected light and passing the reflected light through the lens when operating at the maximum resolution of the lens, the gathered light assumes a sinusoidal-shaped like modulated beam representing the frequency modulated video signals contained on the video disc member.

The output from the microscopic lens is applied to a signal recovery system wherein the reflected light beam is employed first as an information bearing light member and second as a control signal source for generating radial tracking errors and focus errors. The information bearing portion of the recovered frequency modulated video signal is applied to an FM processing system for preparation prior to transmission to a standard TV receiver and/or a TV monitor.

The control portion of the recovered frequency modulated video signal is applied to a plurality of servo subsystems for controlling the position of the reading beam on the center of the information track and for controlling the placing of the lens for gathering the maximum reflected light when the lens is positioned at its optimum focused position. A tangential servo subsystem is employed for determining the time base error introduced into the reading process due to the mechanics of the reading system. This time base error appears as a phase error in the recovered frequency modulated video signal.

The phase error is detected by comparing a selected portion of the recovered frequency modulated signal with an internally generated signal having the correct phase relationship with the predetermined portion of the recovered frequency modulated video signal. The predetermined relationship is established during the original recording on the video disc. In the preferred embodiment, the predetermined portion of the recovered frequency modulated video signal is the color burst signal. The internally generated reference frequency is the color subcarrier frequency. The color burst signal was originally recorded on the video disc under control of an identical color subcarrier frequency. The phase error detected in this comparison process is applied to a mirror moving in the tangential direction which adjusts the location at which the focused spot impinges upon the information track. The tangential mirror causes the spot to move along the information track either in the forward or reverse direction for providing an adjustment equal to the phase error detected in the comparison process. The tangential mirror in its broadest sense is a means for adjusting the time base of the signal read from the video disc member to adjust for time base errors injected by the mechanics of the reading system.

In an alternative form of the invention, the predetermined portion of the recovered frequency modulated video signal is added to the total recorded frequency modulated video signal at the time of recording and the same frequency is employed as the operating point for the highly controlled crystal oscillator used in the comparison process.

In the preferred embodiment when the video disc player is recovering frequency modulated video signals representing television pictures, the phase error comparison procedure is performed for each line of television information. The phase error is used for the entire line of television information for correcting the time base error for one full line of television information. In this manner, incremental changes are applied to correct for the time base error. These are constantly being recomputed for each line of television information.

A radial tracking servo subsystem is employed for maintaining radial tracking of the focused light spot on one information track. The radial tracking servo subsystem responds to the control signal portion of the recovered frequency modulated signal to develop an error signal indicating the offset from the preferred center of track position to the actual position. This tracking error is employed for controlling the movement of a radial tracking mirror to bring the light spot back into the center of track position.

The radial tracking servo subsystem operates in a closed loop mode of operation and in an open loop mode of operation. In the closed loop mode of operation, the differential tracking error derived from the recovered frequency modulated video signal is continuously applied through the radial tracking mirror to bring the focus spot back to the center of track position. In the open loop mode of operation, the differential tracking error is temporarily removed from controlling the operation of radial tracking mirror. In the open loop mode of operation, various combinations of signals take over control of the movement of the radial tracking mirror for directing the point of impingement of the focused spot from the preferred center of track position on a first track to a center of track position on an adjacent track. A first control pulse causes the tracking mirror to move the focused spot of light from the center of track position on a first track and move towards a next adjacent track. This first control pulse terminates at a point prior to the focused spot reaching the center of track position in the next adjacent track. After the termination of the first control pulse, a second control pulse is applied to the radial tracking mirror to compensate for the additional energy added to the tracking mirror by the first control pulse. The second control pulse is employed for bringing the focused spot into the preferred center of track focus position as soon as possible. The second control pulse is also employed for preventing oscillation of the read spot about the second information track. A residual portion of the differential tracking error is also applied to the radial tracking mirror at a point calcuated to assist the second control pulse in bringing the focused spot to rest at the center of track focus position in the next adjacent track.

A stop motion subsystem is employed as a means for generating a plurality of control signals for application to the tracking servo subsystem to achieve the movement of a focused spot tracking the center of a first information track to a separate and spaced location in which the spot begins tracking the center of the next adjacent information track. The stop motion subsystem performs its function by detecting a predetermined signal recovered from the frequency modulated video signal which indicates the proper position within the recovered frequency modulated video signal at which time the jumping operation should be initiated. This detection function is achieved, in part, by internally generating a gating circuit indicating that portion of the recovered frequency modulated video signal within which the predetermined signal should be located.

In response to the predetermined signal, which is called in the referred embodiment a white flag, the stop motion servo subsystem generates a first control signal for application to the tracking servo subsystem for temporarily interrupting the application of the differential tracking error to the radial tracking mirrors. The stop motion subsystem generates a second control signal for application to the radial tracking mirrors for causing the radial tracking mirrors to leave the center of tracking position on a first information track and jump to an adjacent information track. The stop motion subsystem terminates the second control signal prior to the focus spot reaching the center of focus position on the next adjacent information track.

In the preferred embodiment, a third control signal is generated by the stop motion subsystem at a time spaced from the termination of the second control pulse. The third control pulse is applied directly to the radial tracking mirrors for compensating for the effects on the radial tracking mirror which were added to the radial tracking mirror by the second control pulse. While the second control pulse is necessary to have the reading beam move from a first information track to an adjacent information track, the spaces involved are so small that the jumping operation cannot always reliably be achieved using the second control signal alone. In a preferred embodiment having an improved reliable mode of operation, the third control signal is employed for compensating for the effects of the second control jump pulse on the radial tracking mirror at a point in time when it is assured that the focus spot has, in fact, left the first information track and has yet to be properly positioned in the center of the next adjacent information track. A further embodiment gates the differential error signal through to the radial tracking mirror at a time calculated for the gated portion of the differential tracking error to assist the compensation pulse in bringing the focus spot under control upon the center of track position of the next adjacent information track.

The video disc player employs a spindle servo subsystem for rotating the video disc member positioned upon the spindle at a predetermined frequency. In the preferred embodiment the predetermined frequency is 1799.1 revolutions per minute. In one revolution of the video disc, a complete frame of television information is read from the video disc, processed in electronic portion of the video disc player and applied to a standard television receiver and/or television monitor in a form acceptable to each such unit, respectively. Both the television receiver and the television monitor handle the signals applied thereto by standard internal circuitry and display the color, or black and white signal, on the receiver or monitor.

The spindle servo subsystem achieves the accurate speed of rotation by comparing the actual speed of rotation with a motor reference frequency. The motor reference frequency is derived from the color subcarrier frequency which is also used to correct for time base errors as described hereinbefore. By utilizing the color subcarrier frequency as the source of the motor reference signal, the spindle motor itself removes all fixed time base errors which arise from a mismatching of the recording speed with the playback speed. The recording speed is also controlled by the color frequency subcarrier frequency. The use of a single highly controlled frequency in both the recording mode and the reading back mode removes the major portion of time base error. While the color subcarrier frequency is shown as the preferred source in generating the motor reference frequency, other highly controlled frequency signals can be used in controlling the writing and reading of frequency modulated video signal on the video disc.

A carriage servo subsystem operates in a close loop mode of operation to move the carriage assembly to the specific location under the direction of a plurality of current generators. The carriage servo subsystem controls the relative positioning of the video disc and the optical system used to form the read beam.

A plurality of individual current sources are individually activated by command signals from the function generator for directing the movement of the carriage servo.

A first command signal can direct the carriage servo subsystem to move the carriage assembly to a predetermined location such that the read beam intersects a predetermined portion of the information bearing surface of the video disc member. A second current source provides a continuous bias current for directing the carriage assembly to move in a fixed direction at a predetermined speed. A further current source generates a current signal of fixed magnitude and variable length for moving the carriage assembly at a high rate of speed in a predetermined direction.

A carriage tachometer current generating means is mechanically connected to the carriage motor and is employed for generating a current indicating the instantaneous position and speed of the carriage motor. The current from the carriage tachometer is compared with the sum of the currents being generated in the current sources in a summation circuit. The summation circuit detects the difference between the current sources and the carriage tachometer and applies a different signal to a power amplifier for moving the carriage assembly under the control of the current generators.

BRIEF DESCRIPTION OF THE DRAWINGS

The foregoing and other objects, features and advantages of the invention will be apparent from the following more particular description of a preferred embodiment of the invention as illustrated in the accompanying drawings wherein:

FIG. 2 shows a schematic diagram of the optical system employed with reference to the video disc player shown in FIG. 1;

FIG. 3 shows a block diagram of the spindle servo subsystem employed in the video disc player shown in FIG. 1;

FIG. 4 shows a block diagram of the carriage servo subsystem employed in the video disc player shown in FIG. 1;

FIG. 5 shows a block diagram of the focus servo subsystem employed in the video disc player shown in FIG. 1;

FIGS. 6a, 6b, and 6c show various waveforms illustrating the operation of the servo subsystem shown in FIG. 5;

FIG. 7 shows a partly schematic and partly block diagram view of the signal recovery subsystem employed in the video disc player shown in FIG. 1;

FIG. 8 shows a plurality of waveforms and one sectional view used in explaining the operation of the signal recovery subsystem shown in FIG. 7;

FIG. 9 shows a block diagram of the tracking servo used in the video disc player shown in FIG. 1;

FIG. 10 shows a plurality of waveforms utilized in the explanation of the operation of the tracking servo shown in FIG. 9;

FIG. 11 shows a block diagram of the tangential servo employed in the video disc player shown in FIG. 1;

FIG. 12 shows a block diagram of the stop motion subsystem utilized in the video disc player of FIG. 1;

FIGS. 13A, 13B, and 13C show waveforms generated in the stop motion subsystem shown with reference to FIG. 12;

FIG. 14 is a generalized block diagram of the FM processing subsystem utilized in the video disc player shown with reference to FIG. 1;

FIG. 15 is a block diagram of the FM corrector circuit utilized in the FM processing circuit shown in FIG. 14;

FIG. 16 shows a plurality of waveforms and one transfer function utilized in explaining the operation of the FM corrector shown in FIG. 15;

FIG. 17 is a block diagram of the FM detector used in the FM processing circuit shown in FIG. 14;

FIG. 18 shows a plurality of waveforms used in explaining the operation of the FM detector shown with reference to FIG. 17;

FIG. 19 shows a block diagram of the audio processing circuit utilized in the video disc player shown with reference to FIG. 1;

FIG. 20 shows a block diagram of the audio demodulator employed in the audio processing circuit utilized in the video disc player shown with reference to FIG. 19;

FIG. 21 shows a plurality of waveforms useful in explaining the operation of the audio demodulator shown with reference to FIG. 20;

FIG. 22 shows a block diagram of the audio voltage controlled oscillator utilized in the audio processing circuit shown with reference to FIG. 19;

FIG. 23 shows a plurality of waveforms available in the audio voltage controlled oscillator shown with reference to FIG. 22;

FIG. 24 shows a block diagram of the RF modulator utilizing the video disc player shown in FIG. 1;

FIG. 25 shows a plurality of waveforms utilized in the explanation of the RF modulator shown with reference to FIG. 24;

FIG. 26 shows a schematic view of a video disc member illustrating the eccentricity effect of uneven cooling on the disc;

FIG. 27 is a schematic view of a video disc illustrating the eccentricity effect of an off-center relationship of the information tracks to the central aperture;

DETAILED DESCRIPTION OF THE SHOWN EMBODIMENT

The same numeral will be used in the several views to represent the same element.

Figure 1:
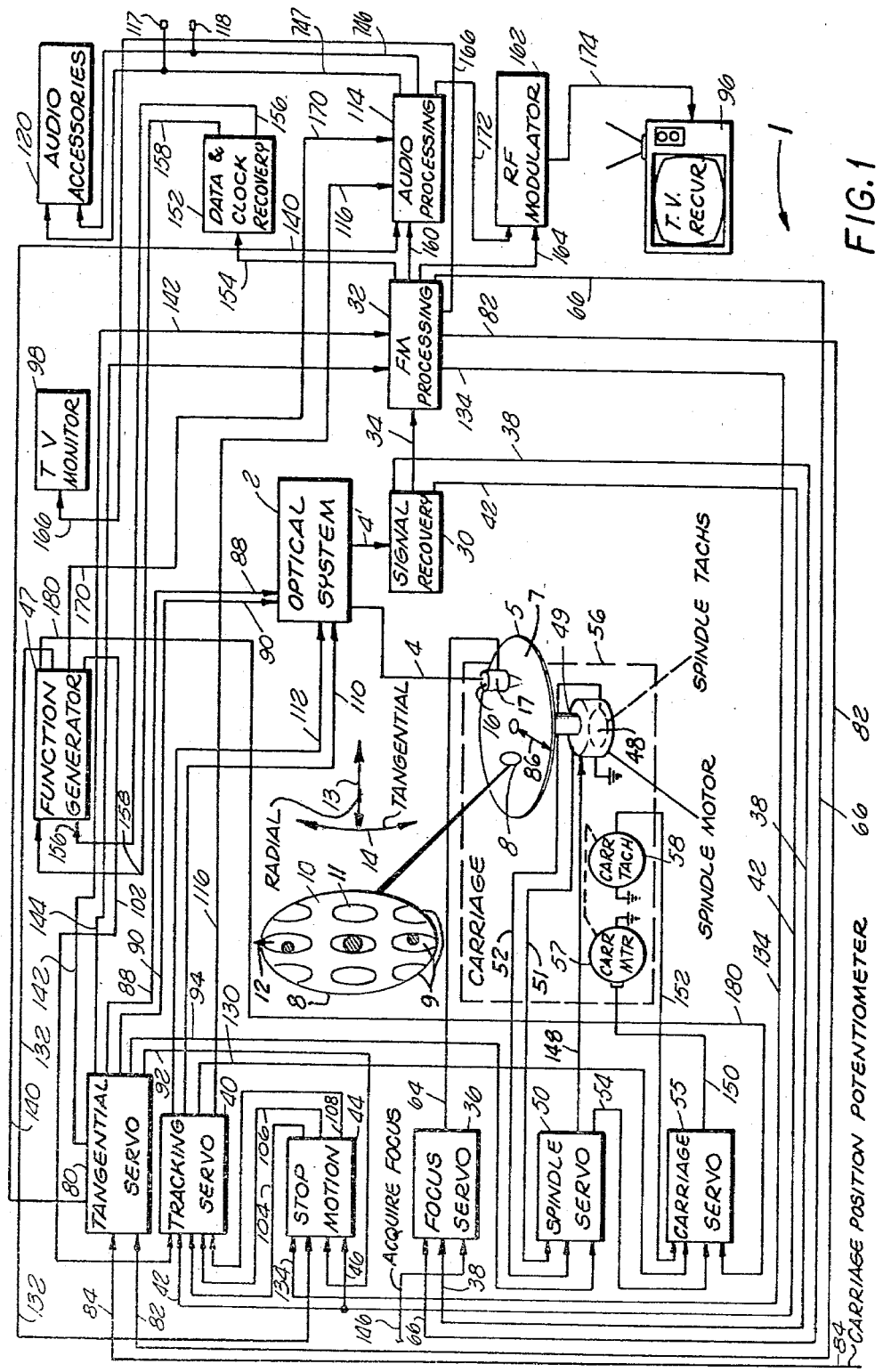
FIG. 1 shows a generalized block diagram of a video disc player.

Referring to FIG. 1, there is shown a schematic block diagram of a video disc player system indicated generally at 1. The player 1 employs an optical system indicated at 2 and shown in greater detail in FIG. 2.

Referring collectively to FIGS. 1 and 2, the optical system 2 includes a read laser 3 employed for generating a read beam 4 which is used for reading a frequency modulated encoded signal stored on a video disc 5. The read beam 4 is polarized in a predetermined direction. The read beam 4 is directed to the video disc 5 by the optical system 2. An additional function of the optical system 2 is to focus the light beam down to a spot 6 at its point of impingement with the video disc 5.

A portion of an information bearing surface 7 of the video disc 5 is shown enlarged within a circle 8. A plurality of information tracks 9 are formed on the video disc 5. Each track is formed with successive light reflective regions 10 and light non-reflective regions 11. The direction of reading is indicated by an arrow 12.

The read beam 4 has two degrees of movement, the first of which is in the radial direction as indicated by a double headed arrow 13. The second of which is the tangential direction as indicated by a double headed arrow 14. The double heads of each of the arrows 13 and 14 indicate that the read beam 4 can move in both directions in each of the radial degree and tangential degree.

Referring to FIG. 2, the optical system comprises a lens 15 employed for shaping the beam to fully fill an entrance aperture 16 of a microscopic objective lens 17. The objective lens is employed for forming the spot 6 of light at its point of impingement with the video disc 5. Improved results have been found when the entrance aperture 16 is overfilled by the reading beam 4. This results in maximum light intensity at the spot 6.

After the beam 4 is properly formed by the lens 15, it passes through a diffraction grating 18 which splits the road beam into three separate beams (not shown). Two of the beams are employed for developing a radial tracking error and the other is used for developing both a focus error signal and the information signal. These three beams are treated identically by the remaining portion of the optical system. Therefore, they are collectively referred to as the read beam 4. The output for the diffraction grating 18 is applied to a beam splitting prism 20. The axis of the prism 20 is slightly offset from the path of the beam 4 for reasons that are explained with reference to the description of the performance of the optical system 2 as it relates to a reflected beam 4'. The transmitted portion of the beam 4 is applied through a quarter wave plate 22 which provides a forty-five degree shift in polarization of the light forming the beam 4. The read beam 4 next impinges upon a fixed mirror 24 which re-directs the read beam 4 to a first articulated mirror 26. The function of the first articulated mirror 26 is to move the light beam in a first degree of motion which is tangential to the surface of the video disc 5. to correct for time base error errors introduced into the reading beam 4 because of eccentricities in the manufacture of the disc 5. The tangential direction is in the forward and/or backward direction of the information track on the video disc 5 as indicated by the double headed arrow 14. The read beam 4 now impinges upon the entrance aperture 16, as previously described, and is focused to a spot 6 upon the information bearing track 9 of the video disc 5 by the lens 17.

The first articulated mirror 26 directs the light beam to a second articulated mirror 28. The second articulated mirror 28 is employed as a tracking mirror. It is the function of the tracking mirror 28 to respond to tracking error signals so as to slightly change its physical position to direct the point of impingement 6 of the read beam 4 so as to radially track the information carrying indicia on the surface of the video disc 5. The second articulated mirror 28 has one degree of movement which moves the light beam in a radial direction over the surface of the video disc 5 or indicated by the double headed arrow 13.

In normal playing mode, the focused beam of light impinges upon successively positioned light reflective regions 10 and light non-reflective regions 11 representing the frequency modulated information. In the preferred embodiment, the light non-reflective regions 11 are light scattering elements carried by the video disc 5. The modulated light beam is a light equivalent of the electrical frequency modulated signal containing all the recorded information. This modulated light beam is generated by the microscopic objective lens 17 by gathering as much reflected light from the successively positioned light reflective region 10 and light nonreflective regions 11 on the video disc 5. The reflected portion of the read beam is indicated at 4'. The reflected read beam 4' retraces the same path previously explained by impinging in sequence upon the second articulated mirror 28, the first articulated mirror 26, and the fixed mirror 24. The reflected read beam 4' next passes through the quarterwave plate 22. The quarterwave plate 22 provides an additional forty-five degree polarization shift resulting in a total of one hundred ninety degrees in shift of polarization to the reflected read beam 4'. The reflected read beam 4' now impinges upon the beam splitting prism 20, which prism diverts the reflected read beam 4' to impinge upon a signal recovery subsystem indicated generally at 30.

The function of the beam splitting prism is to prevent the total reflected read beam 4' from re-entering the laser 3. The effect of the returning read beam 4' upon the laser 3 would be to upset the mechanism whereby the laser oscillates in its predetermined mode of operation. Accordingly, the beam splitting prism 20 redirects a significant portion of the reflected read beam 4' for preventing feedback into the laser 3 when the laser 3 would be affected by this feedback portion of the reflected read beam 4'. For those solid state lasers which are unaffected by the feedback of the reflected light beam 4', the beam splitting prism 20 is unnecessary. The solid state laser 3 can function as the photo detector portion of the signal recovery subsystem 30 to be described hereinafter.

Referring to FIG. 1, the normal operating mode of the signal recovery subsystem 30 is to provide a plurality of informational signals to the remaining portion of the player 1. These informational signals fall generally into two types, an informational signal itself which represents the stored information. A second type of signal is a control signal derived from the informational signal for controlling various portions of the player. The informational signal is a frequency modulated signal representing the information stored on the video disc 5. This informational signal is applied to an FM processing subsystem indicated at 32 over a line 34. A first control signal generated by the signal recovery subsystem 30 is a differential focus error signal applied to a focus servo subsystem indicated at 36 over a line 38. A second type of control signal generated by the signal recovery subsystem 30 is a differential tracking error signal applied to a tracking servo subsystem 40 over a line 42. The differential tracking error signal from the signal recovery subsystem 30 is also applied to a stop motion subsystem indicated at 44 over the line 42 and a second line 46.

Upon receipt of the START pulse generated in a function generator 47, the first function of the video disc player 1 is to activate the laser 3, activate a spindle motor 48, causing an integrally attached spindle 49 and its video disc member 5 mounted thereon to begin spinning. The speed of rotation of the spindle 49, as provided by the spindle motor 48, is under the control of a spindle servo subsystem 50. A spindle tachometer (not shown) is mounted relative to the spindle 49 to generate electrical signals showing the present speed of rotation of the spindle 49. The tachometer comprises two elements which are located one hundred eighty degrees apart with reference to the spindle 49. Each of these tachometer elements generate an output pulse as is common in the art. Because they are located one hundred eighty degrees out of phase with each other, the electrical signals generated by each are one hundred eighty degrees out of phase with each other. A line 51 carries the sequence of pulses generated by the first tachometer elements to the spindle servo subsystem 50. A line 52 carries the tachometer pulses from the second tachometer element to the spindle servo subsystem 50. When the spindle servo subsystem 50 reaches its predetermined rotational velocity of 1799.1 revolutions per minute, it generates a player enable signal on a line 54. The accurate rotational speed of 1799.1 revolutions per minute allows 30 frames of television information to be displayed on a standard television receiver.

The next major functioning of the video disc player 1 is the activation of a carriage servo subsystem 55. As previously mentioned, the reading of the frequency modulated encoded information from the video disc 5 is achieved by directing and focusing a read beam 4 to impinge upon the successively positioned light reflective region 10 and a light non-reflective region 11 on the video disc 5. For optimum results, the read beam 4 should impinge upon the plane carrying the encoded information at right angles. To achieve this geometric configuration requires relative movement between the combined optical system 2 and the video disc 5. Either the video disc 5 can move under the fixed laser read beam 4 or the optical system 2 can move relative to the fixed video disc 5. In this embodiment, the optical system 2 is held stationary and the video disc 5 is moved under the reading beam 4. The carriage servo subsystem controls this relative movement between the video disc 5 and the optical system 2.

As completely described hereinafter, the carriage servo subsystem adds a degree of flexibility to the overall functioning of the video disc player 1 by directing the aforementioned relative movement in a number of different modes of operation. In its first mode of operation the carriage servo subsystem 55 responds to the player enable signal applied to it over the line 54 to move a carriage assembly 56 such that the read beam 4 impinges upon the video disc 5 perpendicular to the information bearing surface of the video disc 5. At this time it would be important to note that the term carriage assembly is used to identify the structural member upon which the video disc is carried. This also includes the spindle motor 48, the spindle 49, the spindle tachometer (not shown), a carriage motor 57 and a carriage tachometer generator 58. For the purpose of not unduly complicating the broad block diagram shown in FIG. 1, the carriage assembly is not shown in great detail. For an understanding of the summarized operation of a video disc player, it is important to note at this time that the function of the carriage servo subsystem is to move the carriage to its initial position at which the remaining player functions will be initiated in sequence. Obviously, the carriage servo subsystem can position the carriage at any number of fixed locations relative to the video disc pursuant to the design requirements of the system, but for the purpose of this description the carriage is positioned at the beginning of the frequency modulated encoded information carried by the video disc. The carriage motor 57 provides the driving force to move the carriage assembly 56. The carriage tachometer generator 58 is a current source for generating a current indicating the instantaneous speed and direction of movement of the carriage assembly.

The spindle servo subsystem 50 has brought the spindle speed up to its operational rotational rate of 1799.1 rpm at which the player enable signal is generated on the line 54. The player enable signal on the line 54 is applied to the carriage servo subsystem 55 for controlling the relative motion between the carriage assembly 56 and the optional system 2. The next sequence in the PLAY operation is for the focus servo subsystem 36 to control the movement of the lens 17 relative to the video disc 5. The focusing operation includes a coil, (not shown), moving the lens 17 under the direction of a plurality of separate electrical waveforms which are summed within the coil itself. These waveforms are completely described with reference to the discription given for the focus servo subsystem in FIGS. 6a, 6b and 6c. A voice coil arrangement as found in a standard loud speaker has been found to be suitable for controlling the up and down motion of the lens 17 relative to the video disc 5. The electrical signals for controlling the voice coil are generated by the focus servo subsystem 36 for application to the coil over a line 64.

The inputs to the focus servo subsystem are applied from a plurality of locations. The first of which is applied from the signal recovery subsystem 30 over the line 38 as previously described. The second input signal is from the FM processing circuit 32 over a line 66. The FM processing subsystem 32 provides the frequency modulated signal read from the surface of the video disc 5. A third input signal to the focus servo subsystem 36 is the ACQUIRE FOCUS enabling logic signal generated by the act of putting the player into its play mode by selection of a function PLAY button within the function generator 47.

The function of the focus servo subsystem 36 is to position the lens 17 at the optimum distance from the video disc 5 such that the lens 17 is able to gather and/or collect the maximum light reflected from the video disc 5 and modulated by the successively positioned light reflective region 10 and light non-reflective region 11. This optimum range is approximately 0.3 microns in length and is located at a distance of one micron above the top surface of the video disc 5. The focus servo subsystem 36 has several modes of operation all of which are described hereinafter in greater detail with reference to FIGS. 5, 6a, 6b and 6c.

At the present time it is important to note that the focus servo subsystem 36 utilizes its three input signals in various combinations to achieve an enhanced focusing arrangement. The differential focus error signal from the signal recovery subsystem 30 provides an electrical representation of the relative distance between the lens 17 and the video disc 5. Unfortunately, the differential focus error signal is relatively small in amplitude and has a wave shape containing a number of positions thereon, each of which indicate that the proper point has been reached. All but one of such positions are not the true optimum focusing positions but rather carry false information. Accordingly, the differential focus error signal itself is not the only signal employed to indicate the optimum focus condition. While the use of differential focus error itself can oftentimes result in the selection of the optimum focus position, it cannot do so reliably on every focus attempt. Hence, the combination of the differential focus error signal with the signal indicative of reading a frequency modulated signal from the video disc 5 provides enhanced operation over the use of using the differential focus error signal itself.

During the focus acquiring mode of operation, the lens 17 is moving at a relatively high rate of speed towards the video disc 5. An uncontrolled lens detects a frequency modulated signal from the information carried by the video disc 5 in a very narrow spacial range. This very narrow spacial range is the optimum focusing range. Accordingly, the combination of the detected frequency modulated signal and the differential focus error signal provides a reliable system for acquiring focus.

The focus servo subsystem 36 hereinafter described contains additional improvements. One of these improvements is an addition of a further fixed signal to those already described which further helps the focus servo subsystem 36 acquire proper focus on the initial attempt to acquire focus. This additional signal is an internally generated kickback signal which is initiated at the time when a frequency modulated signal is detected by the FM processing subsystem 32. This internally generated kickback pulse is combined with the previously discussed signals and applied to the voice coil so as to independently cause the lens to physically move back through the region at which a frequency modulated signal was read from the disc 5. This internally generated fixed kickback pulse signal gives the lens 17 the opportunity to pass through the critical optimum focusing point a number of times during the first transversing of the lens 17 towards the video disc 5.

Further improvements are described for handling momentary loss of focus during the play mode of operation caused by imperfection in the encoded frequency modulated signal which caused a momentary loss of the frequency modulated signal as detected by the FM processing subsystem 32 and applied to the focus servo subsystem 36 over the line 66.

A tangential servo subsystem 80 receives its first input signal from the FM processing subsystem 32 over a line 82. The input signal present on the line 82 is the frequency modulated signal detected from the surface of the video disc 5 by the lens 17 as amplified in the signal recovery subsystem 30 and applied to the FM processing subsystem 32 by a line 34. The signal on the line 82 is the video signal. The second input signal to the tangential servo subsystem 80 is over a line 84. The signal on the line 84 is a variable DC signal generated by a carriage position potentiometer. The amplitude of the variable voltage signal on the line 84 indicates the relative position of the point of impact of the reading spot 6 over the radial distance indicated by a double headed arrow 86 as drawn upon the surface of the video disc 5. This variable voltage adjusts the gain of an internal circuit for adjusting its operating characteristics to track the relative position of the spot as it transverses the radial position as indicated by the length of the line 86.

The function of the tangential time base error correction subsystem 80 is to adjust the signal detected from the video disc 5 for tangential errors caused by eccentricity of the information tracks 9 on the disc 5 and other errors introduced into the detected signal due to any physical imperfection of the video disc 5 itself. The tangential time base error correction subsystem 80 performs its function by comparing a signal read from the disc 5 with a locally generated signal. The difference between the two signals is indicative of the instantaneous error in the signal being read by the player 1. More specially, the signal read from the disc 5 is one which was carefully applied to the disc with a predetermined amplitude and phase relative to other signals recorded therewith. For a color television FM signal this is the color burst portion of the video signal. The locally generated signal is a crystal controlled oscillator operating at the color subcarrier frequency of 3.579545 megahertz. The tangential time base error correction subsystem 80 compares the phase difference between the color burst signal and the color subcarrier oscillator frequency and detects any difference. This difference is then employed for adjusting the phase of the remaining portion of the line of FM information which contained the color burst signal. The phase difference of each succeeding line is generated in exactly the same manner for providing continuous tangential time base error correction for the entire signal read from the disc.

In other embodiments storing information signals which do not have a portion thereof comparable to a color burst signal, such a signal having predetermined amplitude and phase relative to the remaining signals on the disc 5 can be periodically added to the information when recorded on the disc 5. In the play mode, this portion of the recorded information can be selected out and compared with a locally generated signal comparable to the color subcarrier oscillator. In this manner, tangential time base error correction can be achieved for any signal recorded on a video disc member.

The error signal so detected in the comparison of the signal read from the video disc 5 and the internally generated color subcarrier oscillator frequency is applied to the first articulated mirror 26 over lines 88 and 90. The signals on lines 88 and 90 operate to move the first articulated mirror 26 so as to re-direct the read beam 4 forward and backwards along the information track, in the direction of the double headed arrow 14, to correct for the time base error injected due to an imperfection from a manufacture of the video disc 5 and/or the reading therefrom. Another output signal from the tangential time base error correction subsystem 80 is applied to the stop motion subsystem 44 over a line 92. This signal, as completely described hereinafter, is the composite sync signal which is generated in the subsystem 80 by separating the composite sync signal from the remaining video signal. It has been found convenient to locate the sync pulse separator in the tangential time base error correction subsystem 80. This sync pulse separator could be located in any other portion of the player at a point where the complete video signal is available from the FM processing subsystem 32.

A further output signal from the tangential subsystem is a motor reference frequency applied to the spindle servo subsystem 50 over a line 94. The generation of the motor reference frequency in the tangential subsystem 80 is convenient because of the presence of the color subcarrier oscillator frequency used in the comparision operation as previously described. This color subcarrier oscillator frequency is an accurately generated signal. It is divided down to a motor reference frequency used in the control of the spindle servo speed. By utilizing the color subcarrier frequency as a control frequency for the speed of the spindle, the speed of the spindle is effectively locked to this color subcarrier frequency causing the spindle to rotate at the precise frame frequency rate required for maximum fidelity in the display of the information detected from the video disc 5 on either a television receiver indicated at 96 and/or a TV monitor indicated at 98.

The tracking servo subsystem 40 receives a plurality of input signals, one of which is the previously described differential tracking error signal generated by a signal recovery subsystem 30 as applied thereto over a line 42. A second input signal to the tracking servo subsystem 40 is generated in a function generator 47 over a line 102. For the purpose of clarity, the function generator 47 is shown as a single block. In the preferred embodiment, the function generator 47 includes a remote control function generator and a series of switches or buttons permanently mounted on the console of the video disc player 1. The specific functions so generated are described in more detail in the detailed description of the carriage servo subsystem 55 contained hereinafter.

The signal contained on the line 102 is a signal which operates to disable the normal functioning of the tracking servo 40 during certain functions initiated by the function generator 47. For example, the function generator 47 is capable of generating a signal for causing the relative movement of the carriage assembly 56 over the video disc 5 to be in the fast forward or fast reverse condition. By definition, the lens is traversing the video disc 5 in a radial direction, as represented by the arrow 13, rapidly skipping over the tracks at the rate of 11,000 tracks per inch and tracking is not expected in this condition. Hence, the signal from the function generator 47 on the line 102 disables the tracking servo 40 so that it does not attempt to operate in its normal tracking mode.

A third input signal to the tracking servo subsystem 40 is the stop motion compensation pulse generated in the stop motion subsystem 44 and applied over a line 104. An additional input signal applied to the tracking servo subsystem 40 is the subsystem loop interrupt signal generated by the stop motion subsystem 44 and applied over a line 106. A third input signal to the tracking servo subsystem 40 is the stop motion pulse generated by the stop motion subsystem 44 and applied over a line 108.

The output signals from the tracking servo subsystem 40 include a first radial mirror tracking signal over a line 110 and a second radial mirror control on a line 112. The mirror control signals on the line 110 and 112 are applied to the second articulated mirror 28 which is employed for radial tracking purposes. The control signals on the lines 110 and 112 move the second articulated mirror 28 such that the reading beam 4 impinging thereupon is moved in the radial direction and becomes centered on the information track 9 illuminated by the focused spot 6.

A further output signal from the tracking servo subsystem 40 is applied to an audio processing subsystem 114 over a line 116. The audio squelch signal on the line 116 causes the audio processing subsystem 114 to stop transmitting audio signals for the ultimate application to the loud speakers contained in the TV receiver 96, and to a pair of audio jacks 117 and 118 respectively and to an audio accessory block 120. The audio jacks 117 and 118 are a convenient point at which external equipment can be interconnected with the video disc player 1 for receipt of two audio channels for stereo application.

A further output signal from the tracking servo subsystem 40 is applied to the carriage servo subsystem 55 over a line 130. The control signal present on the line 130 is the DC component of the tracking correction signal which is employed by the carriage servo subsystem for providing a further carriage control signal indicative of how closely the tracking servo subsystem 40 is following the directions given by the function generator 47. For example, if the function generator 47 gives an instruction to the carriage servo 55 to provide carriage movement calculated to operate with a slow forward or slow reverse movement, the carriage servo subsystem 55 has a further control signal for determining how well it is operating so as to cooperate with the electronic control signals generated to carry out the instruction from the function generator 47.

The stop motion subsystem 44 is equipped with a plurality of input signals one of which is an output signal of the function generator 47 as applied over a line 132. The control signal present on the line 132 is a STOP enabling signal indicating that the video disc player 1 should go into a stop motion mode of operation. A second input signal to the stop motion subsystem 40 is the frequency modulated signal read off of the video disc and generated by the FM processing subsystem 32. The video signal from the FM processing subsystem 32 is applied to the stop motion subsystem 44 over a line 134. Another input signal to the stop motion subsystem 44 is the differential tracking error as detected by the signal recovery subsystem 30 over the line 46.

The tangential servo system 80 is equipped with a plurality of other output signals in addition to the ones previously identified. The first of which is applied to the audio processing subsystem 114 over a line 140. The signal carried by the line 140 is the color subcarrier oscillator frequency generated in the tangential servo subsystem 80. An additional output signal from the tangential servo 80 is applied to the FM processing subsystem 32 over a line 142. The signal carried by the line 142 is the chroma portion of the video signal generated in the chroma separator filter portion of the tangential servo subsystem 80. An additional output signal from the tangential servo 80 is applied to the FM processing subsystem 32 over a line 144. The signal carried by the 144 is a gate enabling signal generated by a first gate separator portion of the tangential servo system 80 which indicates the instantaneous presence of the burst time period in the received video signal.

The focus servo receives its ACQUIRE FOCUS signal on a line 146.

The power output from the spindle servo subsystem 50 is applied to the spindle motor 48 over a line 148.

The power generated in the carriage servo 55 for driving the carriage motor 57 is applied thereto over a line 150. The current generated in the carriage tachometer generator 58 for application to the carriage servo subsystem 55 indicative of the instantaneous speed and direction of the carriage, is applied to the carriage servo subsystem 55 over a line 152.

The FM processing unit 32 has an additional plurality of output signals other than those already described. A first output signal from the FM processing subsystem 32 is applied to a data and clock recovery subsystem 152 over a line 154. The data and clock recovery circuit is of standard design and it is employed to read address information contained in a predetermined portion of the information stored in each spiral and/or circle contained on the surface of the video disc 5. The address information detected in the video signal furnished by the FM processing unit 32 is applied to the function generator 47 from the data and clock recovery subsystem 152 over a line 156. The clocking information detected by the data and clock recovery subsystem is applied to the function generator over a line 158. An additional output signal from the FM processing unit 32 is applied to the audio processing subsystem 114 over a line 160. The signal carried by the line 160 is a frequency modulated video signal from the FM distribution amplifiers contained in the FM processing unit 32. An additional output signal from the FM processing subsystem 32 is applied to an RF modulator 162 over a line 164. The line 164 carries a video output signal from the FM detector portion of the FM processing unit 32. A final output signal from the FM processing unit 32 is applied to the TV monitor 98 over a line 166. The line 166 carries a video signal of the type displayable in a standard TV monitor 98.

The audio processing system 114 receives an additional input signal from the function generator 47 over a line 170. The signals carried by the line 170 from the function generator 47 are such as to switch the discriminated audio signals to the various audio accessory systems used herewith. The audio contained in the FM modulated signal recovered from the video disc 5 contains plurality of separate audio signals. More specifically, one or two channels of audio can be contained in the FM modulated signal. These audio channels can be used in a stereo mode of operation. In one of the preferred modes of operations, each channel contains a different language explaining the scene shown on the TV receiver 96 and/or TV monitor 98. The signals contained on the line 170 control the selection at which the audio channel is to be utilized.

The audio processing system 114 is equipped with an additional output signal for application to the RF modulator 162 over a line 172. The signal applied to the RF modulator 162 over the line 172 is a 4.5 megahertz carrier frequency modulated by the audio information. The modulated 4.5 megahertz carrier further modulates a channel frequency oscillator having its center frequency selected for use with one channel of the TV receiver. This modulated channel frequency oscillator is applied to a standard TV receiver 96 such that the internal circuitry of the TV receiver demodulates the audio contained in the modulated channel frequency signal in its standard mode of operation.

The audio signals applied to the audio accessory unit 120 and the audio jacks 117 and 118 lies within the normal audio range suitable for driving a loudspeaker by means of the audio jacks 117 and 118. The same audio frequencies can be the input to a stereophonic audio amplifier when such is employed as the audio accessory 120.

In the preferred embodiment, the output from the audio processing system 114 modulates the channel 3 frequency oscillator before application to a standard TV receiver 96. While Channel 3 has been conveniently selected for this purpose, the oscillating frequency of the channel frequency oscillator can be adapted for use with any channel of the standard TV receiver 96. The output of the RF modulator 162 is applied to the TV receiver 96 over a line 174.

An additional output signal from the function generator 47 is applied to the carriage servo subsystem 55 over a line 180. The line 180 represents a plurality of individual lines. Each individual line is not shown in order to keep the main block diagram as clear as possible. Each of the individual lines, schematically indicated by the single line 180, represents an instruction from the function generator instructing the carriage servo to move in a predetermined direction at a predetermined speed. This is described in greater detail when describing the detailed operation of the carriage servo 55.

NORMAL PLAY MODE—SEQUENCE OF OPERATION

The depression of the play button generates a PLAY signal from the function generator followed by an ACQUIRE FOCUS signal. The PLAY signal is applied to the laser 3 by a line 3a for generating a read beam 4. The PLAY signal turns on the spindle motor subsystem 50 and starts the spindle rotating. After the spindle servo subsystem accelerates the spindle motor to its proper rotational speed of 1799.1 revolutions per minute, the spindle servo subsystem 50 generates a PLAYER ENABLE signal for application to the carriage servo subsystem 55 for controlling the relative movement between the carriage assembly and the optical assembly 2. The carriage servo subsystem 55 directs the movement of the carriage such that the read beam 4 is positioned to impinge upon the beginning portion of the information stored on the video disc record 5. Once the carriage servo subsystem 55 reaches the approximate beginning of the recorded information, the lens focus servo subsystem 36 automatically moves the lens 17 towards the video disc surface 5. The movement of the lens is calculated to pass the lens through a point at which optimum focusing is achieved. The lens servo system preferably achieves optimum focus in combination with other control signals generated by reading information recorded on the video disc surface 5. In the preferred embodiment, the lens servo subsystem has a built-in program triggered by information read from the disc whereby the lens is caused to move through the optimum focusing point several times by an oscillatory type microscopic retracing of the lens path as the lens 17 moves through a single lens focusing acquiring procedure. As the lens moves through the optimum focusing point, it automatically acquires information from the video disc. This information consists of a total FM signal as recorded on the video disc 5 and additionally includes a differential focus error signal and a differential tracking error signal. The size of the video information signal read from the disc is used as a feedback signal to tell the lens servo subsystem 36 that the correct point of focus has been successfully located. When the point of optimum focus has been located, the focus servo loop is closed and the mechanically initiated acquire focus procedure is terminated. The radial tracking mirror 28 is now responding to the differential tracking error generated from the information gathered by the reading lens 17. The radial tracking error is causing the radial tracking mirror 28 to follow the information track and correct for any radial departures from a perfect spiral or circle track configuration. Electronic processing of the detected video FM signal generates a tangential error signal which is applied to the tangential mirror 26 for correcting phase error in the reading process caused by small physical deformaties in the surface of the video disc 5. During the normal play mode, the servo subsystems hereinbefore described continue their normal mode of operation to maintain the read beam 4 properly in the center of the information track and to maintain the lens at the optimum focusing point such that the light gathered by the lens generates a high quality signal for display on a standard television receiver or in a television monitor.

The frequency modulated signal read from the disc needs additional processing to achieve optimum fidelity during the display in the television receiver 96 and/or television monitor 98.

Immediately upon recovery from the video disc surface, the frequency modulated video signal is applied to a tangential servo subsystem 80 for detecting any phase difference present in the recovered video signal and caused by the mechanics of the reading process. The detected phase difference is employed for driving a tangential mirror 26 and adjusting for this phase difference. The movement of the tangential mirror 26 functions for changing the phase of the recovered video signal and eliminating time base errors introduced into the reading process. The recovered video signal is FM corrected for achieving an equal amplitude FM signal over the entire FM video spectra. This requires a variable amplification of the FM signal over the FM video spectra to correct for the mean transfer function of the reading lens 17. More specifically, the high frequency end of the video spectrum is attenuated more by the reading lens than the low frequency portion of the frequency spectrum of the frequency modulated signal read from the video disc. This equalization is achieved through amplifying the higher frequency portion more than the lower frequency portion. After the frequency modulation correction is achieved, the detected signal is sent to a discriminator board whereby the discriminated video is produced for application to the remaining portions of the board.

Referring to FIG. 3, there is shown a generalized block diagram of the spindle servo subsystem indicated at 50. One of the functions of the spindle servo subsystem is to maintain the speed of rotation of the spindle 49 by the spindle motor 48 at a constant speed of 1799.1 rpm. Obviously, this figure has been selected to be compatible with the scanning frequency of a standard television receiver. The standard television receiver receives 30 frames per second and the information is recorded on the video disc such that one complete frame of television information is contained in one spiral and/or track. Obviously, when the time requirements of a television receiver or television monitor differ from this standard, then the function of the spindle servo subsystem is to maintain the rotational speed at the new standard.

The function generator 47 provides a START pulse to the spindle motor. As the motor begins to turn, the tachometer input signal pulse train from the first tachometer element is applied to a Schmitt trigger 200 over the line 51. The tachometer input signal pulse train from the second tachometer element is applied to a second Schmitt trigger 202 over the line 52. A 9.33 KHz motor reference frequency is applied to a third Schmitt trigger 204 from the tangential servo subsystem 80 over a line 94.

The output from the Schmitt trigger 200 is applied to an edge generator circuit 206 through a divide by two network 208. The output from the Schmitt trigger 202 is applied to an edge generator 210 through a divided by two network 212. The output from the Schmitt trigger 204 is applied to an edge generator circuit 214 through a divided by two network 216. Each of the edge generators 206, 210 and 214 is employed for generating a sharp pulse corresponding to both the positive going edge and the negative going edge of the signal applied respectively from the divide by two networks 208, 212 and 216.

The output from the edge generator 214 is applied as the reference phase signal to a first phase detector 218 and to a second phase detector 220. The phase detector 218 has as its second input signal the output from the edge generator 206. The phase generator 220 has as its second input signal the output of the edge generator 210. The phase detectors operate to indicate any phase difference between the tachometer input signals and the motor reference frequency. The output from the phase detector 218 is applied to a summation circuit 222. And the output from the phase detector 220 is also applied as a second input to the summation circuit 222. The output from the summation circuit 222 is applied to a lock detector 224 and to a power amplifier 226. The function of the lock detector 224 is to indicate when the spindle speed has reached a predetermined rotational speed. This can be done by sensing the output signals from the summation circuit 222.

In the preferred embodiment it has been determined that the rotational speed of the spindle motor should reach a predetermined speed before the carriage assembly is placed in motion. When a video disc is brought to a relatively high rotational speed, the disc rides on a cushion of air and rises slightly vertical against the force of gravity. Additionally, the centrifugal force of the video disc causes the video disc to somewhat flatten considerably. It has been found that the vertical movement against gravity caused by the disc riding on a cushion of air and the vertical rise caused by the centrifugal force both lift the video disc from its position at rest to a stablized position spaced from its initial rest position and at a predetermined position with reference to other internal fixed members of the video disc player cabinet. The dynamics of a spinning disc at 1799.1 rpm with a predetermined weight and density can be calculated such as to insure that the disc is spaced from all internal components and is not in contact with any such internal components. Any contact between the disc and the player cabinet causes rubbing, and the rubbing causes damage to the video disc through abrasion.

In the preferred embodiment, the lock detector 224 has been set to generate a PLAYER ENABLE pulse on the line 54 when the spindle speed is up to its full 1799.1 rpm speed. A speed less than the full rotational speed can be selected as the point at which the player enable signal is generated provided that the video disc has moved sufficiently from its initial position and has attained a position spaced from the internal components of the video disc player cabinet. In an alternate embodiment, a fixed delay, after applying the START signal to the spindle motor, is used to start the carriage assembly in motion.

During the normal operating mode of the video disc player 1, the tachometer input signals are continuously applied to the Schmitt triggers 200 and 202 over the lines 51 and 52, respectively. These actual tachometer input signals are compared against the motor reference signal and any deviation therefrom is detected in the summation circuit 222 for application to the power amplifier 226. The power amplifier 226 provides the driving force to the spindle motor 48 to maintain the required rotational speed of the spindle 49.

Referring to FIG. 4, there is shown a schematic block diagram of the carriage servo subsystem 55. The carriage servo subsystem 55 comprises a plurality of current sources 230 through 235. The function of each of these current sources is to produce a predetermined value of current in response to an input signal from the function generator 47 over the line 180. It was previously described that the line 180, shown with reference to FIG. 1, comprises of plurality of individual lines. For the purposes of this description, each of these lines will be identified as 180a through 180e. The outputs of the current sources 230 through 235 are applied to a summation circuit 238. The output from the summation circuit 238 is applied to a power amplifier 240 over a line 242. The output from the power amplifier 240 is applied to the carriage motor 57 over the line 150. A dashed line 244 extending between the carriage motor 57 and the carriage tachometer member 58 indicates that these units are mechanically connected. The output from the carriage tachometer 58 is applied to the summation circuit by the line 152.

The START pulse is applied to the current source 232a over a line 180a1. The current source 232a functions to provide a predetermined current for moving the carriage assembly from its initial rest position to the desire start of track position. As previously mentioned, the carriage assembly 56 and the optical system 2 are moved relative one to the other. In the standard PLAY mode of operation, the optical system 2 and carriage assembly 56 are moved such that the read beam 4 from the laser 3 is caused to impinge upon the start of the recorded information. Accordingly, the current source 232 generates the current for application to the summation circuit 238. The summation circuit 238 functions to sense the several incremental amounts of current being generated by the various current sources 230 through 235 and compares this sum of the currents against the current being fed into the summation circuit 238 from the carriage tachometer system 58 over the line 152. It has been previously mentioned that the current generated by the carriage tachometer 58 indicates the instantaneous speed and position of the carriage assembly 56. This current on the line 152 is compared with the currents being generated by the current sources 230 through 235 and the resulting difference current is applied to the power amplifier 240 over the line 242 for generating the power required to move the carriage motor 57 to the desired location.

Only for purposes of example, the carriage tachometer 58 could be generating a negative current indicating that the carriage assembly 56 is positioned at a first location. The current source 232a would generate a second current indicating the desired position for the carriage assembly 56 to reach for start-up time. The summation circuit 238 compares the two currents and generates a resulting difference current on the line 242 for application to the power amplifier 240. The output from the amplifier 240 is applied to the carriage motor 57 for driving the carriage motor and moving the carriage assembly to the indicated position. As the carriage motor 57 moves, the carriage tachometer 58 also moves as indicated by the mechanical linkage shown by the line 244. As its position changes, the carriage tachometer 58 generates a new and different signal on the line 152. When the carriage tachometer 58 indicates that it is at the same position as indicated by the output signal from the current source 232a, the summation circuit 238 indicates a COMPARE EQUAL condition. No signal is applied to the power amplifier 240 and no additional power is applied to the carriage motor 57 causing the carriage motor 57 to stop.

The START signal on the line 180a1 causes the carriage motor 57 to move to its START position. When the spindle servo subsystem 50 has brought the speed of rotation of the spindle 49 up to its reading speed, a PLAY ENABLE signal is generated by the spindle servo subsystem 50 for application to a current source 230 over a line 54. The current source 230 generates a constant bias current sufficient to move the carriage assembly 56 a distance of 1.6 microns for each revolution of the disc. This bias current is applied to the summation circuit 238 for providing a constant current input signal to the power amplifier for driving the carriage motor 57 at the indicated distance per revolution. This constant input bias current from the current source 230 is further identified as a first fixed bias control signal to the carriage motor 57.

The current source 231 receives a FAST FORWARD ENABLE signal from the function generator 47 over the line 180b. The fast forward current source 231 generates an output current signal for application to the summation circuit 238 and the power amplifier 240 for activating the carriage motor 57 to move the carriage assembly 56 in the fast forward direction. For clarification, the directions referred to in this section of the description refer to the relative movement of the carriage assembly and the reading beam 4. These movements are directed generally in a radial direction as indicated by the double headed arrow 13 shown in FIG. 1. In the first forward mode of operation, the video disc 5 is rotating at a very high rotational speed and hence the radial tracking does not occur in a straight line across the tracks as indicated by the double arrow 13. More specifically, the carriage servo subsystem is capable of providing relative motion between the carriage assembly and the optical system 2 such as to traverse the typically four inch wide band of information bearing surface of the video disc 5 in approximately four seconds from the outer periphery to the inner periphery. The average speed is one inch per second. During which the four second period, the reading head moves across approximately forty-four thousand tracks. The video disc is revolving at nearly thirty revolutions per second and hence, under idealized conditions, the video disc 5 rotates one hundred and twenty times while the carriage servo subsystem 55 provides the relative motion from the outer periphery to the inner periphery. Hence, the absolute point of impact of the reading beam upon the rotating video disc is a spirally shaped line having one hundred and twenty spirals. The net effect of this movement is a radial movement of the point of impingement of the reading beam 4 with the video disc 5 in a radial direction as indicated by a double headed line 13.

The current source 233 receives its FAST REVERSE ENABLE signal from the function generator 47 over the line 180c. The fast reverse current source 233 provides its output directly to the summation circuit 238.

The current source 234 is a SLOW FORWARD current source and receives its SLOW FORWARD ENABLE input signal from the function generator 47 over a line 180d. The output signal from the slow forward current source 234 is applied to the summation circuit 238 through an adjustable potentiometer circuit 246. The function of the adjustable potentiometer circuit 246 is to vary the output from the slow forward current source 234 so as to select any speed in the slow forward direction.

The current source 235 is a SLOW REVERSE current source which receives its SLOW REVERSE ENABLE signal from the function generator 47 over the line 180e. The output from the slow forward current source 235 is applied to the summation circuit 238 through an adjustable potentiometer circuit 248. The adjustable potentiometer circuit 248 functions in a similar manner with the circuit 246 to adjust the output signal from the slow reverse current source 235 such that the carriage servo subsystem 55 moves the carriage assembly 56 at any speed in the slow reverse direction.

The DC component of the tracking correction signal from the tracking servo subsystem 40 is applied to the summation circuit 238 over the line 130. The function of this DC component of the tracking correction signal is to initiate carriage assembly movement when the tracking errors are in a permanent off-tracking situation such that the carriage servo subsystem should provide relative motion to bring the relative position of the video disc 5 and the read beam 4 back within the range of the tracking capability of the tracking mirrors. The DC component indicates that the tracking mirrors have assumed a position for a substantial period of time which indicates that they are attempting to acquire tracking and have been unable to do so.

CARRIAGE SERVO—NORMAL MODE OF OPERATION

The carriage servo subsystem 55 is the means for controlling the relative movement between the carriage assembly on which the video disc 5 is located and the optical system in which the reading laser 3 is located. A carriage tachometer is mechanically linked to the carriage motor and operates as a means for generating a highly accurate current value representing the instantaneous speed and direction of the movement of the carriage assembly 56.

A plurality of individually activated and variable level current sources are employed as means for generating signals for directing the direction and speed of movement of the carriage assembly. A first current source for controlling the direction of the carriage motor generates a continuous reference current for controlling the radial tracking of the read beam relative to the video disc as the read beam radially tracks from the outer periphery to the inner periphery in the normal mode of operation. A second current source operates as a means for generating a current of the same but greater amplitude to direct the carriage assembly to move at a higher rate of speed in the same direction as the bias current. This second type of current ceases to operate when the carriage assembly reaches its predetermined position.

An additional current source is available for generating a current value of opposite polarity when compared with the permanently available bias current for causing the carriage motor to move in a direction opposite to that direction moving under the influence of the permanently available bias current.

A summation circuit is employed for summing the currents available from the plurality of current sources for generating a signal for giving directions to the carriage motor. The summation circuit also sums the output current from the carriage tachometer indicating the instantaneous speed and location of the carriage assembly as the carriage assembly moves pursuant to the various commands from the input current generators. The summation circuit provides a difference output signal to a power amplifier for generating the power required to move the carriage assembly such that the current generated in the carriage tachometer matches the current generated from input current sources.

Referring collectively to FIG. 5 and FIGS. 6A through 6F, there is shown and described a schematic block diagram of the focus servo subsystem 36, a plurality of different waveforms which are employed with the focus servo subsystem and a plurality of single logic diagrams showing the sequence of steps used in the focus servo to operate in a plurality of different modes of operation. The focus error signal from the signal recovery subsystem 30 is applied to an amplifier and loop compensation circuit 250 over the line 38. The output from the amplifier and loop compensation circuit 250 is applied to a kickback pulse generator 252 over a line 254 and to a focus servo loop switch 256 over the line 254 and a second line 258. The output from the kickback pulse generator 252 is applied to a driver circuit 260 over a line 262. The output from the focus servo loop switch 256 is applied to the driver circuit 260 over a line 264.

The FM video signal is applied from the distribution amplifier portion of the FM processing subsystem 32 to a FM level detector 270 over the line 66. The output from the FM level detector 270 is applied to an acquire focus logic circuit 272 over line 274. The output of the FM level detector 270 is applied as a second alternative input signal to the generator 252 over a line 275. The output from the acquire focus logic circuit is applied to the focus servo loop switch 256 over a line 276. A second output signal from the acquire focus logic circuit 272 is applied to a ramp generator circuit 278 over a line 280. The acquire focus logic circuit 272 has as its second input signal the acquire focus enable signal generated by the function generator 47 over the line 146. The output of the ramp generator 278 is applied to the driver circuit 260 over a line 281.

The acquire focus enable signal applied to the acquire focus logic 272 over the line 146 is shown on line A of FIG. 6A. Basically, this signal is a two-level signal generated by the function generator 47 and having a disabling lower condition indicated at 282 and an enabling condition indicated generally at 284. The function generator produces this pulse when the video disc player 1 is in one of its play modes and it is necessary to read the information stored on the video disc 5.

Referring to line B of FIG. 6A, there is shown a typical ramping voltage waveform generated by the ramp generator circuit 278. During the period of time corresponding to the disabling portion 282 of the acquire focus signal, the focus ramp waveform is in a quiescent condition. Coincidental with the turning on of the acquire focus enable signal, the ramp generator 278 generates its ramping voltage waveform shown as a sawtooth type output waveform going from a higher position at 286 to a lower position at 288. This is shown as a linearly changing signal and has been found to be the most useful waveform for this purpose.

Referring to line C of FIG. 6A, there is shown a representation of the motion of the lens itself during a number of operating modes of the video disc player. Prior to the generation of the acquire focus enable signal, the lens is generally in a retracted position indicated generally at 290. Upon the receipt of the acquire focus enable signal, the lens begins to move in a path indicated by the dash/dot line 292. The dash/dot line 292 begins at a point identified as the upper limit of lens travel and moves through an intersection with a dotted line 294. This point of intersection is identified as the lens in focus position 293. When focus is not acquired on the first attempt, the lens continues along the dash/dot line 292 to a point 295 identified as lower limit of lens travel. When the lens reaches point 295, the lens remains at the lower limit of lens travel through the portion of the line indicated generally at 296. The lens continues to follow the dash/dot line to a point indicated at 297 identified as the RAMP RESET point. This is also shown on line A as 288. During the ramp reset time the lens is drawn back to the upper limit of lens travel portion of the waveform as indicated at 298.

In this first mode of operation the lens fails in its first attempt at acquiring focus. The lens passes through the lens in focus position as indicated by the dotted line 294. After failing to acquire focus, the lens then moves all the way to its lower limit of lens travel at 296 before retracting to its upper limit of lens travel indicated at 298. The upper limit of lens travel position and the lower limit of lens travel position are sensed by limit switches in the lens driver subassembly not shown.

During a successful attempt to acquire focus, the path of lens travel changes to the dotted line indicated at 294 and remains there until focus is lost. The lens is normally one micron above the video disc 5 when in the focus position. Also, the in-focus position can vary over a range of 0.3 microns.

The output signal from the ramp generator 278 to the driver 260 on the line 281 has the configuration shown on line B of FIG. 6A.

The waveform shown on line G of FIG. 6A shows the wave shape of the signal applied to the FM level detector 270 over the line 66. The waveform shown on line G illustrates two principal conditions. The open double sided sharp pulse indicated generally at 300 is generated by the signal recovery subsystem 30 as the lens passes through focus. This is shown by the vertical line 301 connecting the top of the pulse 300 with the point on line 282 indicating that the lens has passed through the in-focus position as indicated by its intersection with the dotted line 294. Corresponding to the description previously given with reference to line C of FIG. 6A, the lens passes through focus and the sharp pulse retracts to its no activity level indicated generally at 302.

In the second illustration, the waveform shown on line G of FIG. 6A illustrates the output from the FM distribution amplifier on the line 66 when the lens acquires focus. This is indicated by the envelope generally represented by the crossed hatched sections between lines 304 and 306.

Referring to the waveform shown on line H of FIG. 6A, there is shown a dash/dot line 308 representing the output from the FM level detector 270 corresponding to that situation when the lens does not acquire focus in its first pass through the lens in focus position by line 294 of line C of FIG. 6A. The output of the level detector represented by the dotted line 311 shows the loss of the FM signal by the detector 270. The solid line 312 shows the presence of an FM signal detected by the FM level detector when the lens acquires focus. The continuing portion of the waveform at 312 indicates that a FM signal is available in the focus servo subsystem 36.

Figure 6C:
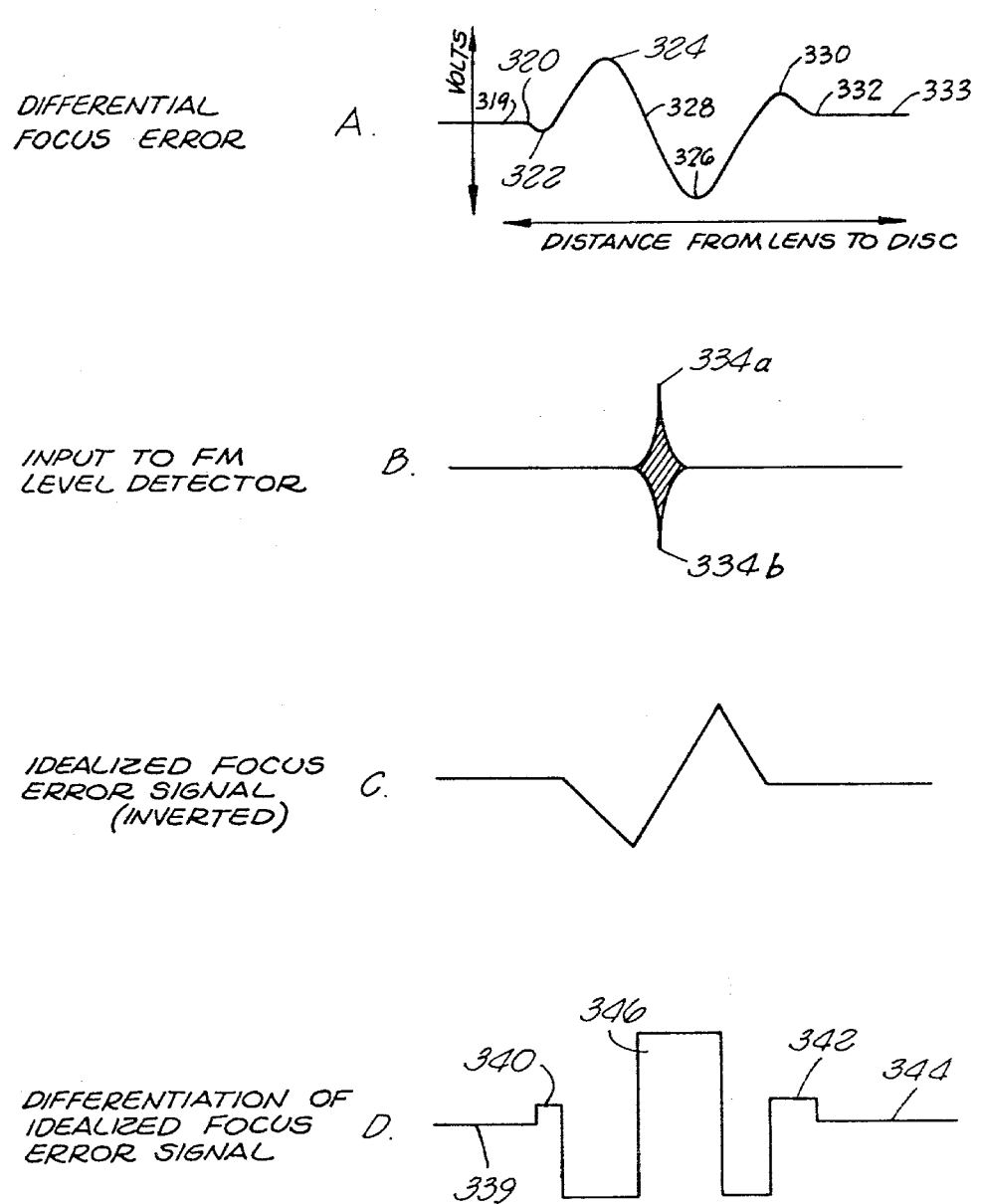

Referring to line I of FIG. 6A, there is shown the output characteristic of the focus servo loop switch 256. In the portion of its operating characteristics generally indicated by the portion of the line indicated at 314, the switch is in the off condition representing the unfocused condition. The position of the line 316 represents the focused condition. The vertical transition at 318 indicates the time at which focus is acquired. The operating mode of the video disc player during the critical period of acquiring focus is more fully described with reference to the waveforms shown in FIG. 6C. Line A of FIG. 6C represents a corrected differential focus error generated by the signal recovery system 30 as the lens follows its physical path as previously described with reference to line C of FIG. 6A. At point 319 of the waveform A shown in FIG. 6C, the differential focus error corresponds to a portion of the lens travel during which no focus errors are available. At the region indicated at 320, the first false in-focus error signal is available. There is a first a momentary rise in focus error to a first maximum initial level at point 322. At point 322, the differential focus error begins to rise in the opposite direction until it peaks at a point 324. The differential focus error begins to drop to a second but opposite maximum at a point 326. At a point 328, halfway between the points 324 and 326, is the optimum in-focus position for the lens. At this point 328, the lens gathers maximum reflected light from the video disc surface. Continuing past point 326, the differential focus error begins to fall towards a second false in-focus condition represented at this point 330. The differential focus error rises past the in-focus position to a lower maximum at 332 prior to falling back to the position at 333 where no focus error information is available. No focus error information is available because the lens is so close to the video disc surface as to be unable to distinguish a difference of the diffused illumination presently bathing the two focus detectors.

Referring to line B, there is shown a waveform representing the frequency modulated signal detected from the video disc surface 5 through the lens 17 as the lens is moving towards the video disc 5 in an attempt to acquire focus. It should be noted that the frequency modulated signal from the video disc 5 is detected only over a small distance as the lens reaches optimum focus, and then passes through optimum focus. This small distance is represented by a sharp peaks 334a and 344b of the FM detected video as the lens 17 moves through this preferred in-focus position when focus is missed.

While focus can be achieved using only the differential focus error signal shown with reference to line A of FIG. 6C, one embodiment of the present inventions utilizes the differential focus error signal as shown on line A of FIG. 6C in combination with the signal shown on line B of FIG. 6C to achieve more reliable acquisition of focus during each attempt at focus.

FIG. C of line 6C shows an inverted idealized focus error signal. This idealized error signal is then differentiated and the results shown on line D of FIG. 6C. The differentiation of the idealized focus error signal is represented by the line 339. Small portions of this line 339 shown at 340 and 342 lying above the zero point indicated at 344 give false indication of proper focusing regions. The region 346 falling under the line 339 and above the zero condition represented by the line 344 indicates the range within which the lens should be positioned to obtain proper and optimum focus. The region 346 represents approximately 0.3 microns of lens travel and corresponds to the receipt of an FM input to the FM level detector as shown in line B. It should be noted that no FM is shown on line B corresponding to regions 340 and 342. Hence, the FM pulse shown on line B is used as a gating signal to indicate when the lens has been positioned at the proper distance above the video disc 5 at which it can be expected to acquire focus.

The signal representing the differentiation of the idealized focus error is applied to the generator 252 for activating the generator 252 to generate its kickback waveform. The output from the FM level detector 270 is an alternative input to the kickback generator for generating the kickback waveform for application to the driver 260.

Referring back to line B of FIG. 6A and continuing the description of the waveform shown thereon, the dot/dash portion beginning at 286 represents the start of the output signal from the ramp generator 278 for moving the lens through the optimum focusing range. This is a sawtooth signal and it is calculated to move the lens smoothly through the point at which FM is detected by the FM level detector 270 as indicated by the waveform on line H. In a first mode of operation, the focus ramp follows a dot/dash portion 287 of the waveform to a point 287a corresponding to the time at which the output of the FM level detector shows the acquisition of focus by generating the signal level at 312a in line H. The output signal from the acquire focus logic block 272 turns off the ramp generator over the line 280 indicating that focus has been acquired. When focus is acquired, the output from the ramp generator follows the dash line portion at 287b indicating that focus has been acquired.

Referring to line A of FIG. 6B, a portion of the focus ramp is shown extending between a first upper voltage at 286 and a second lower voltage at 288. The optimum focus point is located at 287a and corresponds with the peak of the FM signal applied to the FM level detector 270 as shown on line C of FIG. 6B. Line B is a simplified version of the lens position transfer function 290 as shown more specifically with reference to line C of FIG. 6A. The lens position transfer function line 290 extends between an upper limit of lens travel indicated at point 292 and a lower limit of lens travel indicated at point 295. The optimum lens focus position is indicated by a line 296. The optimum lens focus point is therefore located at 299.

Referring to line D of FIG. 6B, there is shown the superimposing of a kickback sawtooth waveform indicated generally in the area 300 upon the lens position transfer line 292. This indicates that in the top portion of the three kickback pulses are located at 302, 304 and 306. The lower portion of the three kickback pulses are located at 308, 310 and 312, respectively. The line 296 again shows the point of optimum focus. The intersection of the line 296 with the line 292 at points 296a, 296b, 296c and 296d shows that the lens itself passes through the optimum lens focus position a plurality of times during one acquire focus enable function.

Referring to line E of FIG. 6B, the input to the FM level detector indicates that during an oscillatory motion of the lens through the optimum focus position as shown by the combined lens travel function characteristic shown in FIG. D, the lens has the opportunity to acquire focus of the FM signal at four locations indicated at the peaks of waveforms 314, 316, 318 and 320.

The waveforms shown with reference to FIG. 6B demonstrate that the addition of a high frequency oscillating sawtooth kickback pulse upon the ramping signal generated by the ramp generator 278 causes the lens to pass through the optimum lens focus position a plurality of times for each attempt at acquiring lens focus. This improves the reliability of achieving proper lens focus during each attempt.

The focus servo system employed in the present invention functions to position the lens at the place calculated to provide optimum focusing of the reflected read spot after impinging upon the information track. In a first mode of operation, the lens servo is moved under a ramp voltage waveform from its retracted position towards its fully down position. When focus is not acquired during the traverse of this distance, means are provided for automatically returning the ramping voltage to its original position and retracing the lens to a point corresponding to the start of the ramping voltage. Thereafter, the lens automatically moved through its focus acquire mode of operation and through the optimum focus position at which focus is acquired.

In a third mode of operation, the fixed ramping waveform is used in combination with the output from an FM detector to stabilize the mirror at the optimum focus position which corresponds to the point at which a frequency modulated signal is recovered from the information bearing surface of the video disc and an output is indicated at an FM detector. In a further embodiment, an oscillatory waveform is superimposed upon the ramping voltage to help the lens acquire proper focus. The oscillatory waveform is triggered by a number of alternative input signals. A first such input signal is the output from the FM detector indicating that the lens has reached the optimum focus point. A second triggering signal occurs a fixed time after the beginning of the ramp voltage waveform. A third alternative input signal is a derivation of the differential tracking error indicating the point at which the lens is best calculated to lie within the range at which optimum focus can be achieved. In a further embodiment of the present invention, the focus servo is constantly monitoring the presence of FM in the recovered frequency modulated signal. The focus servo can maintain the lens in focus even though there is a momentary loss of detected frequency modulated signal. This is achieved by constantly monitoring the presence of FM signal detected from the video disc. Upon the sensing of a momentary loss of frequency modulated signal, a timing pulse is generated which is calculated to restart the focus acquire mode of operation. However, if the frequency modulated signals are detected prior to the termination of this fixed period of time, the pulse terminates and the acquire focus mode is skipped. If FM is lost for a period of time longer than this pulse, then the focus acquire mode is automatically entered. The focus servo continues to attempt to acquire focus until successful acquisition is achieved.

FOCUS SERVO SUBSYSTEM—NORMAL MODE OF OPERATION

The principal function of the focus servo subsystem is to drive the lens mechanism towards the video disc 5 until the objective lens 17 acquires optimum focus of the light modulated signal being reflected from the surface of the video disc 5. Due to the resolving power of the lens 17, the optimum focus point is located approximately one micron from the disc surface. The range of lens travel at which optimum focus can be achieved is 0.3 microns. The information bearing surface of the video disc member 5 upon which the light reflective and light non-reflective members are positioned, are oftentimes distorted due to imperfections in the manufacture of the video disc 5. The video disc 5 is manufactured according to standards which will make available for use on video disc players those video disc members 5 having errors which can be handled by the focus servo system 36.

In a first mode of operation, the focus servo subsystem 36 responds to an enabling signal telling the lens driver mechanism when to attempt to acquire focus. A ramp generator is a means for generating a ramping voltage for directing the lens to move from its upper retracted position down towards the video disc member 5. Unless interrupted by external signals, the ramping voltage continues to move the lens through the optimum focus position to a full lens down position corresponding to the end of the ramping voltage. The full lens down position can also be indicated by a limit switch which closes when the lens reaches this position.

The lens acquire period equals the time of the ramping voltage. At the end of the ramping voltage period, automatic means are provided for automatically resetting the ramp generator to its initial position at the start of the ramping period. Operator intervention is not required to reset the lens to its lens acquire mode in the preferred embodiment after focus was not achieved during the first attempt at acquiring focus.

In the recovery of FM video information from the video disc surface 5, imperfections on the disc surface can cause a momentary loss of the FM signal being recovered. A gating means is provided in the lens servo subsystem 36 for detecting this loss FM from the recovered FM video signal. This FM detecting means momentarily delays the reactivation of the acquire focus mode of operation of the lens servo subsystem 36 for a predetermined time. During this predetermined time, the reacquisition of the FM signal prevents the FM detector means from causing the servo subsystem to restart the acquire focus mode of operation. In the event that FM is not detected during this first predetermined time, the FM detector means reactivates the ramp generator for generating the ramping signal which causes the lens to follow through the acquire focus procedure. At the end of the ramp generator period, the FM detector means provides a further signal for resetting the ramp generator to its initial position and to follow through the ramping and acquire focus procedure.

In a third embodiment, the ramping voltage generated by the ramp generator has superimposed upon it an oscillatory sequence of pulses. The oscillatory sequence of pulses are added to the standard ramping voltage in response to the sensing of recovered FM from the video disc surface 5. The combination of the oscillatory waveform upon the standard ramping voltage is to drive the lens through the optimum focus position in the direction towards the disc a number of times during each acquire focus procedure.

In a further embodiment, the generation of the oscillatory waveform is triggered a fixed time after the initiation of the focus ramp signal. While this is not as efficient as using the FM level detector output signal as the means for triggering the oscillatory waveform generator it provides reasonable and reliable results.

In a third embodiment, the oscillatory waveform is triggered by the compensated tracking error signal.

Referring to FIG. 7, there is shown a schematic block diagram of the signal recovery subsystem 30. The waveforms shown in FIG. 8, lines B, C and D, illustrate certain of the electrical waveform available within the signal recovery subsystem 30 during the normal operation of the player. Referring to FIG. 7, the reflected light beam is indicated at 4' and is divided into three principal beams. A first beam impinges upon a first tracking photo detector indicated at 380, a second portion of the read beam 4' impinges upon a second tracking photo detector 382 and the central information beam is shown impinging upon a concentric ring detector indicated generally at 384. The concentric ring detector is fully described in U.S. Pat. No. 4,152,586 to James E. Elliott, which is a continuation-in-part of the application Ser. No. 803,986 filed June 6, 1977, entitled "Optical Focusing Servo System". The concentric ring detector 384 has an inner portion at 386 and an outer portion at 388, respectively.

The output from the first tracking photo detector 380 is applied to a first tracking preamp 390 over a line 392. The output from the second tracking photo detector 382 is applied to a second tracking preamp 394 over a line 396. The output from the inner portion 386 of the concentric ring detector 384 is applied to a first focus preamp 398 over a line 400. The output from the outer portion 388 of the concentric ring detector 384 is applied to a second focus preamp 402 over a line 404. The output from both portions 386 and 388 of the concentric ring focusing element 384 are applied to a wide band amplifier 405 over a line 406. An alternative embodiment to that shown would include a summation of the signals on the lines 400 and 404 and the application of this sum to the wide band amplifier 405. The showing of the line 406 is schematic in nature. The output from the wide band amplifier 405 is the time base error corrected frequency modulated signal for application to the FM processing subsystem 32 over the line 34.

The output from the first focus preamp 398 is applied as one input to a differential amplifier 408 over a line 410. The output from the second focus preamplifier 402 forms the second input to the differential amplifier 408 over the line 412. The output from the differential amplifier 408 is the differential focus error signal applied to the focus servo 36 over the line 38.

The output from the first tracking preamplifier 390 forms one input to a differential amplifier 414 over a line 416. The output from the second tracking preamplifier 394 forms a second input to the differential amplifier 414 over a line 418. The output from the differential amplifier 414 is a differential tracking error signal applied to the tracking servo system over the line 42 and applied to the stop motion subsystem over the line 42 and an additional line 46.

Line A of FIG. 8 shows a cross-sectional view taken in a radial direction across a video disc member 5. Light non-reflective elements are shown at 11 and intertrack regions are shown at 10a. Such intertrack regions 10a are similar in shape to light reflective elements 10. The light reflective regions 10 are planar in nature and normally are highly polished surfaces, such as a thin aluminum layer. The light non-reflective regions 11 in the preferred embodiment are light scattering and appear as bumps or elevations above the planar surface represented by the light reflective regions 10. The lengths of the line indicated at 420 and 421 shows the center to center spacing of two adjacently positioned tracks 422 and 423 about a center track 424. A point 425 in the line 420 and a point 426 in the line 421 represents the crossover point between each of the adjacent tracks 422 and 423 when leaving the central track 424 respectively. The crossover points 425 and 426 are each exactly halfway between the central track 424 and the tracks 422 and 423 respectively. The end points of line 420 represented at 427 and 428 represents the center of information tracks 422 and 424 respectively. The end of line 421 at 429 represents the center of information track 423.

The waveform shown in line B of FIG. 8 represents an idealized form of the frequency modulated signal output derived from the modulated light beam 4' during radial movement of the read beam 6 across the tracks 422, 424 and 423. This shows that a maximum frequency modulated signal is available at the area indicated generally at 430a, 430b and 430c which correspond to the centers 427, 428 and 429 of the information tracks 422, 424 and 423 respectively. A minimum frequency modulated signal is available at 431a and 431b which corresponds to the crossover points 425 and 426. The waveform shown on line B of FIG. 8 is generated by radially moving a focused lens across the surface of a video disc 5.

Referring to line C of FIG. 8, there is shown the differential tracking error signal generated in the differential amplifier 414 shown in FIG. 7. The differential tracking error signal is the same as that shown in line A of FIG. 6C except for the details shown in the FIG. 6C for purposes of explanation of the focus servo subsystem peculiar to that mode of operations.

Referring again to FIG. C of line 8, the differential tracking error signal output shows a first maximum tracking error at a point indicated at 432a and 432b which is intermediate the center 428 of an information track 424 and the crossover point indicated at 425 or 426 depending on the direction of beam travel from the central track 424. A second maximum tracking error is also shown at 434a and 434b corresponding to a track location intermediate the crossover points 425 and 426 between the information track 424 and the next adjacent tracks 422 and 423. Minimum focus error is shown in line C at 440a, 440b and 440c corresponding to the center of the information tracks 422, 424 and 423 respectively. Minimum tracking error signals are also shown at 441a and 441b corresponding to the crossover points 425 and 426 respectively. This corresponds with the detailed description given with reference to FIG. 6C as to the importance of identifying which of the minimum differential tracking error signal outputs corresponds with the center of track location so as to insure proper focusing on the center of an information track and to avoid attempting to focus upon the track crossovers.

Referring to line D of FIG. 8, there is shown the differential focus error signal output waveform generated by the differential amplifier 408. The waveform is indicated generally by a line 442 which moves in quadrature with the differential tracking error signal shown with reference to line C of FIG. 8.

Referring to FIG. 9, there is shown a schematic block diagram of the tracking servo subsystem 40 employed in the video disc player 1. The differential tracking error is applied to a tracking servo loop interrupt switch 480, over the line 46 from the signal recovery system 30. The loop interrupt signal is applied to a gate 482 over a line 108 from the stop motion subsystem 44. An open fast loop command signal is applied to an open loop fast gate 484 over a line 180b from the function generator 47. As previously mentioned, the function generator includes both a remote control unit from which commands are received and a set of console switches from which commands can be received. Accordingly, the command signal on line 180b is diagrammatically shown as the same signal applied to the carriage servo fast forward current generator over a line 180b. The console switch is shown entering an open loop fast gate 486 over the line 180b'. The fast reverse command from the remote control portion of the function generator 47 is applied to the open loop fast gate 484 over the line 180b. The fast reverse command from the console portion of the function generator 47 is applied to the open loop fast gate 486 over the line 180b'. The output from the gate 484 is applied to an or gate 488 over a line 490. The output from the open loop fast gate 486 is applied to the or gate 488 over a line 492. The first output from the or gate 488 is applied to the audio processing system 114 to provide an audio squelch output signal on the line 116. A second output from the or gate 488 is applied to the gate 482 as a gating signal. The output from the tracking servo open loop switch 480 is applied to a junction 496 connected to one side of a resistor 498 and as an input to a tracking mirror amplifier driver 500 over a line 505 and an amplifier and frequency compensation network 51. The other end of the resistor 498 is connected to one side of a capacitor 502. The other side of the capacitor 502 is connected to ground. The amplifier 500 receives a second input signal from the stop motion subsystem 44 over the line 106. The signal on the line 106 is a stop motion compensation pulse.

The function of the amplifier 510 is to provide a DC component of the tracking error, developed over the combination of the resistor 498 and capacitor 502, to the carriage servo system 55 during normal tracking periods over a line 130. The DC component from the junction 496 is gated to the carriage servo 55 by the play enabling signal from the function generator 47. The push/pull amplifier circuit 500 generates a first tracking A signal for the radial tracking mirror 28 over the line 110 and generates a second tracking B output signal to the radial tracking mirror 28 over the line 112. The radial mirror requires a maximum of 600 volts across the mirror for maximum operating efficiency when bimorph type mirrors are used. Accordingly, the push/pull amplifier circuit 500 comprises a pair of amplifier circuits, each one providing a three hundred voltage swing for driving the tracking mirror 28. Together, they represent a maximum of six hundred volts peak to peak signal for application over the lines 110 and 112 for controlling the operation of the radial tracking mirror 28. For a better understanding of the tracking servo 40, the description of its detailed mode of operation is combined with the detailed description of the operation of the step motion subsystem 44 shown with reference to FIG. 12 and the waveforms shown in FIGS. 13A, 13B and 13C.

TRACKING SERVO SUBSYSTEM—NORMAL MODE OF OPERATION

The video disc member 5 being played on the video disc player 1 contains approximately eleven thousand information tracks per inch. The distance from the center of one information track to the next adjacent information track is in the range of 1.6 microns. The information indicia aligned in an information track is approximately 0.5 microns in width. This leaves approximately one micron of empty and open space between the outermost regions of the indicia positioned in adjacent information bearing tracks.

The function of the tracking servo is to direct the impingement of a focused spot of light to impact directly upon the center of an information track. The focused spot of light is approximately the same width as the information bearing sequence of indicia which form an information track. Obviously, maximum signal recovery is achieved when the focused beam of light is caused to travel such that all or most of the light spot impinges upon the successively positioned light reflective and light non-reflective regions of the information track.

The tracking servo is further identified as the radial tracking servo because the departures from the information track occur in the radial direction upon the disc surface. The radial tracking servo is continuously operable in the normal play mode.

The radial tracking servo system is interrupted or released from the differential tracking error signal generated from the FM video information signal recovered from the video disc 5 in certain modes of operation. In a first mode of operation, when the carriage servo is causing the focused read beam to radially traverse the information bearing portion of the video disc 5, the radial tracking servo system 40 is released from the effects of the differential tracking error signal because the radial movement of the reading beam is so rapid that tracking is not thought to be necessary. In a jump back mode of operation wherein the focused reading beam 4 is caused to jump from one track to an adjacent track, the differential tracking error is removed from the radial tracking servo loop for eliminating a signal from the tracking mirror drivers which tend to unsettle the radial mirror and tend to require a longer period of time prior for the radial tracking servo subsystem to reacquire proper tracking of the next adjacent information track. In this embodiment of operation where the differential tracking error is removed from the tracking mirror drivers, a substitute pulse is generated for giving a clean unambiguous signal to the tracking mirror drivers to direct the tracking mirror to move to its next assigned location. This signal in the preferred embodiment is identified as the stop motion pulse and comprises regions of pre-emphasis at the beginning and end of the stop motion pulse which are tailored to direct the tracking mirror drivers to move the focused spot to the predetermined next track location and to help maintain the focused spot in the proper tracking position. In review, one mode of operation of the video disc player removes the differential tracking error signal from application to the tracking mirror drivers and no additional signal is substituted therefor. In a further embodiment of operation of the video disc player, the differential tracking error signal is replaced by a particularly shaped stop motion pulse.

In a still further mode of operation of the tracking mirror servo subsystem 40, the stop motion pulse which is employed for directing the focused beam to leave a first information track and depart for a second adjacent information track is used in combination with a compensation signal applied directly to the radial tracking mirrors to direct the mirrors to maintain focus on the next adjacent track. In the preferred embodiment, the compensation pulse is applied to the tracking mirror drivers after the termination of the stop motion pulse.

In a still further embodiment of the tracking servo subsystem 40, the differential tracking error signal is interrupted for a period less than the time necessary to perform the stop motion mode of operation and the portion of the differential tracking error allowed to pass into the tracking mirror drivers is calculated to assist the radial tracking mirrors to achieve proper radial tracking.

Referring to FIG. 11, there is shown a block diagram of the tangential servo subsystem 80. A first input signal to the tangential servo subsystem 80 is applied from the FM processing system 32 over the line 82. The signal present on the line 82 is the video signal available from the video distribution amplifiers as contained in the FM processing system 32. The video signal on the line 82 is applied to a sync pulse separator circuit 520 over a line 522 and to a chroma separator filter 523 over a line 524. The video signal on the line 82 is also applied to a burst gate separator circuit 525 over a line 525a.

The function of the vertical sync pulse separator circuit 520 is to separate the vertical sync signal from the video signal. The vertical sync signal is applied to the stop motion subsystem 44 over the line 92. The function of the chroma separator filter 523 is to separate the chroma portion from the total video signal received from the FM processing circuit 32. The output from the chroma separator filter 523 is applied to the FM corrector portion of the FM processing circuit 32 over the line 142. The output signal from the chroma separator filter 523 is also applied to a burst phase detector circuit 526 over a line 528. The burst phase detector circuit 526 has a second input signal from a color subcarrier oscillator circuit 530 over a line 532. The purpose of the burst phase detector circuit 526 is to compare the instantaneous phase of the color burst signal with a very accurately generated color subcarrier oscillator signal generated in the oscillator 530. The phase difference detected in the burst phase detector circuit 526 is applied to a sample and hold circuit 534 over a line 536. The function of the sample and hold circuit is to store a voltage equivalent of the phase difference detected in the burst phase detector circuit 526 for the time during which the full line of video information containing that color burst signal, used in generating the phase difference, is read from the disc 5.

The purpose of the burst gate separator 525 is to generate an enabling signal indicating the time during which the color burst portion of the video waveform is received from the FM processing unit 32. The output signal from the burst gate separator 525 is applied to the FM corrector portion of the FM processing system 32 over a line 144. The same burst gate timing signal is applied to the sample and hold circuit 534 over a line 538. The enabling signal on the line 538 gates the input from the burst phase detector 526 into the sample and hold circuit 534 during the color burst portion of the video signal.

The color subcarrier oscillator circuit 530 applies the color subcarrier frequency to the audio processing circuit 114 over a line 140. The color subcarrier oscillator circuit 530 supplies the color subcarrier frequency to a divide circuit 540 over a line 541 which divides the color subcarrier frequency by three hundred and eighty-four for generating the motor reference frequency. The motor reference frequency signal is applied to the spindle servo subsystem 50 over the line 94.

The output from the sample and hold circuit 534 is applied to an automatic gain controlled amplifier circuit 542 over a line 544. The automatic gain controlled amplifier 542 has a second input signal from the carriage position potentiometer as applied thereto over the line 84. The function of the signal on the line 84 is to change the gain of the amplifier 542 as the reading beam 4 radially moves from the inside track to the outside track and/or conversely when the reading beam moves from the outside track to the inside track. The need for this adjustment to change with a change in the radial position is caused by the formation of the reflective regions 10 and non-reflective regions 11 with different dimensions from the outside track to the inside track. The purpose of the constant rotational speed from the spindle motor 48 is to turn the disc 5 through nearly thirty revolutions per second to provide thirty frames of information to the television receiver 96. The length of a track at the outermost circumference is much longer than the length of a track at the innermost circumference. Since the same amount of information is stored in one revolution at both the inner and outer circumference, the size of the reflective and nonreflective regions 10 and 11 respectively are adjusted from the inner radius to the outer radius. Accordingly, this change in size requires that certain adjustment in the processing of the detected signal read from the video disc 5 are made for optimum operation. One of the required adjustments is to adjust the gain of the amplifier 542 which adjusts for the time base error as the reading point radially changes from an inside to an outside circumference. The carriage position potentiometer (not shown) generates a sufficiently accurate reference voltage indicating the radial position of the point of impingement of the reading beam 4 onto the video disc 5. The output from the amplifier 542 is applied to a compensation circuit 545 over a line 546. The compensation network 545 is employed for preventing any system oscillations and instability. The output from the compensation network 545 is applied to a tangential mirror driver circuit 500 over a line 550. The tangential mirror driver circuit 500 was described with reference to FIG. 9. The circuit 500 comprises a pair of push/pull amplifiers. The output from one of the push/pull amplifiers (not shown) is applied to the tangential mirror 26 over a line 88. The output from the second push/pull amplifier (not shown) is applied to the tangential mirror 26 over a line 90.

TIME BASE ERROR CORRECTION MODE OF OPERATION

The recovered FM video signal, from the surface of the video disc 5 is corrected, for time base errors introduced by the mechanics of the reading process, in the tangential servo subsystem 80. Time base errors are introduced into the reading process due to the minor imperfections in the video disc 5. A time base error introduces a slight phase change into the recovered FM video signal. A typical time base error base correction system includes a highly accurate oscillator for generating a source of signals used as a phase standard for comparison purposes. In the preferred embodiment, the accurate oscillator is conveniently chosen to oscillate at the color subcarrier frequency. The color subcarrier frequency is also used during the writing process for controlling the speed of revolution of the writing disc during the writing process. In this manner, the reading process is phase controlled by the same highly accurate oscillator as was used in the writing process. The output from the highly controlled oscillator is compared with the color burst signal of a FM color video signal. An alternative system records a highly accurate frequency at any selected frequency during the writing process. During the reading process, this frequency would be compared with a highly accurate oscillator in the player and the phase difference between the two signals is sensed and is employed for the same purpose.

The color burst signal forms a small portion of the recovered FM video signal. A color burst signal is repeated in each line of color T.V. video information in the recovered FM video signal. In the preferred embodiment, each portion of the color burst signal is compared with the highly accurate subcarrier oscillator signal for detecting the presence of any phase error. In a different embodiment, the comparison may not occur during each availability of the color burst signal or its equivalent, but may be sampled at randomly or predetermined locations in the recovered signal containing the recorded equivalent of the color burst signal. When the recorded information is not so highly sensitive to phase error, the comparison may occur at greater spaced locations. In general, the phase difference between the recorded signal and the locally generated signal is repetitively sensed at spaced locations on the recording surface for adjusting for phase errors in the recovered signal. In the preferred embodiment this repetitive sensing for phase error occurs on each line of the FM video signal.

The detected phase error is stored for a period of time extending to the next sampling process. This phase error is used to adjust the reading position of the reading beam so as to impinge upon the video disc at a location such as to correct for the phase error.

Repetitive comparison of the recorded signal with the locally generated, highly accurate frequency, continuously adjusts for an incremental portion of the recovered video signal recovered during the sampling periods.

In the preferred embodiment, the phase error changes as the reading beam radially tracks across the information bearing surface portion of the video disc 5. In this embodiment, a further signal is required for adjusting the phase error according to the instantaneous location of the reading beam to adjust the phase error according to its instantaneous location on the information bearing portion of the video disc 5. This additional signal is caused by the change in physical size of the indicia contained on the video disc surface as the radial tracking position changes from the inner location to the outer location. The same amount of information is contained at an inner radius as at an outer radius and hence the indicia must be smaller at the inner radius when compared to the indicia at the outer radius.

In an alternative embodiment, when the size of the indicia is the same at the inner radius and at the outer radius, this additional signal for adjusting for instantaneous radial position is not required. Such an embodiment would be operable with video disc members which are in strip form rather than in disc form and when the information is recorded using indicia of the same size on a video disc member.

In the preferred embodiment, a tangential mirror 26 is the mechanism selected for correcting the time base errors introduced by the mechanics of the reading system. Such a mirror is electronically controlled and is a means for changing the phase of the recovered video signal read from the disc by changing the time base on which the signals are read from the disc. This is achieved by directing the mirror to read the information from the disc at an incremental point earlier or later in time when compared to the time and spacial location during which the phase error was detected. The amount of phase error determines the degree of change in location and hence time in which the information is read.

When no phase error is detected in the time base correcting system the point of impingement of the read beam with the video disc surface 5 is not moved. When a phase error is detected during the comparison period, electronics signals are generated for changing the point of impingement so that the recovered information from the video disc is available for processing at a point in time earlier or later when compared to the comparison period. In the preferred embodiment, this is achieved by changing the spacial location of the point of intersection of the read beam with the video disc surface 5.

Referring to FIG. 12, there is shown a block diagram of the stop motion subsystem 44 employed in the video disc player 1. The waveoform shown with reference to FIGS. 13A, 13B and 13C are used in conjunction with the block diagram shown in FIG. 12 to explain the operation of the stop motion system. The video signal from the FM processing unit 32 is applied to an input buffer stage 551 over the line 134. The output signal from the buffer 551 is applied to a DC restorer 552 over a line 554. The function of the DC restorer 552 is to set the blanking voltage level at a constant uniform level. Variations in signal recording and recovery oftentimes result in video signals available on the line 134 with different blanking levels. The output from the DC restorer 552 is applied to a white flag detector circuit 556 over a line 558. The function of the white flag detector 556 is to identify the presence of an all white level video signal existing during an entire line of one or both fields contained in a frame of television information. While the white flag detector has been described as being detecting an all white video signal during a complete line interval of a frame of television information, the white flag may take other forms. One such form would be a special number stored in a line. Alternatively, the white flag detector can respond to the address indicia found in each video frame for the same purpose. Other indicia can also be employed. However, the use of an all white level signal during an entire line interval in the television frame of information has been found to be the most reliable.

The vertical sync signal from the tangential servo 80 is applied to a delay circuit 560 over a line 92. The output from the delay circuit 560 is supplied to a vertical window generator 562 over a line 564. The function of the window generator 562 is to generate an enabling signal for application to the white flag detector 556 over the line 566 to coincide with that line interval in which the white flag signal has been stored. The output signal from the generator 562 gates the predetermined portion of the video signal from the FM detector and generates an output white flag pulse whenever the white flag is contained in the portion of the video signal under surveillance. The output from the white flag detector 556 is applied to a stop motion pulse generator 567 over a line 568 a gate 569 and a further line 570. The gate 569 has as a second input signal, over the line 132, the STOP MOTION MODE enabling signal from the function generator 47.

The differential tracking error from the signal recovery subsystem 30 is applied to a zero crossing detector and delay circuit 571 over the lines 42 and 46. The function of the zero crossing detector circuit 571 is to identify when the lens crosses the mid points 425 and/or 426 between two adjacent tracks 422 and 423 as shown with reference to line A of FIG. 8. This mid point is the point at which the differential tracking error shown in line C of FIG. 8 at point 441b corresponds to the mid point 426 between adjacent tracks 424 and 423. It is important to note that the differential tracking signal output also indicates the same level signal at point 440c which identifies the optimum focusing point at which the tracking servo system 40 seeks to position the lens in perfect tracking alignment on the mid point 429 of the track 423 when the tracking suddenly jumps from track 424 to track 423. Accordingly, a means must be provided for recognizing the difference between points 441b and 440c on the differential error signal shown in line C of FIG. 8.

The output of the zero crossing detector and delay circuit 571 is applied to the stop motion pulse generator 567 over a line 572. The stop motion pulse generated in the generator 567 is applied to a plurality of locations, the first of which is as a loop interrupt pulse to the tracking servo 40 over the line 108. A second output signal from the stop motion pulse generator 567 is applied to a stop motion compensation sequence generator 573 over a line 574a. The function of the stop motion compensation sequence generator 573 is to generate a compensation pulse waveform for application to the radial tracking mirror to cooperate with the actual stop motion pulse sent directly to the tracking mirror over the line 104. The stop motion compensation pulse is sent to the tracking servo over the line 106.

With reference to line A of FIG. 8, the center to center distance, indicated by the line 420, between adjacent tracks is presently fixed at 1.6 microns. The tracking servo mirror gains sufficient inertia upon receiving a stop motion pulse that the focused spot from the mirror jumps from one track to the next adjacent track. The inertia of the tracking mirror under normal operating conditions causes the mirror to swing past the one track to be jumped. Briefly, the stop motion pulse on the line 104 causes the radial tracking mirror 28 to leave the track on which it is tracking and jump to the next sequential track. A short time later, the radial tracking mirror receives a stop motion compensation pulse to remove the added inertia and direct the tracking mirror into tracking the next adjacent track without skipping one or more tracks before selecting a track for tracking.

In order to insure the optimum cooperation between the stop motion pulse from the generator 567 and the stop motion compensation pulse from the generator 573, the loop interrupt pulse on line 108 is sent to the tracking servo to remove the differential tracking error signal from being applied to the tracking error amplifiers 500 during the period of time that the mirror is purposely caused to leave one track under direction of the stop motion pulse from the generator 567 and to settle upon a next adjacent track under the direction of the stop motion compensation pulse from the generator 573.

As an introduction to the detail understanding of the interaction between the stop motion system 44 and the tracking servo system 40, the waveform shown in FIGS. 13A, 13B and 13C are described.

Referring to line A of FIG. 13A, there is shown the normal tracking mirror drive signals to the radial tracking mirror 28. As previously discussed, there are two driving signals applied to the tracking mirror 28. The radial tracking A signal represented by a line 574 and a radial tracking B signal represented by a line 575. Since the information track is normally in the shape of a spiral, there is a continuous tracking control signal being applied to the radial tracking mirror for following the spiral shaped configuration of the information track. The time frame of the information shown in the waveform shown in line A represents more than a complete revolution of the disc. A typical normal tracking mirror drive signal waveform for a single revolution of the disc is represented by the length of the line indicated at 576. The two discontinuities shown at 578 and 580 on waveforms 574 and 575, respectively, indicate the portion of the normal tracking period at which a stop motion pulse is given. The stop motion pulse is also referred to as a jump back signal and these two terms are used to describe the output from the generator 567. The stop motion pulse is represented by the small vertically disposed discontinuity present in the lines 574 and 575 at points 578 and 580, respectively. The remaining waveforms contained in FIGS. 13A, 13B and 13C are on an expanded time base and represent those electrical signals which occur just before the beginning of this jump back period, through the jump back period and continuing a short duration beyond the jump back period.

The stop motion pulse generated by the stop motion pulse generator 567 and applied to the tracking servo system 40 over the line 104 is represented on line C of FIG. 13A. The stop motion pulse is ideally not a squarewave but has areas of pre-emphasis located generally at 582 and 584. These areas of pre-emphasis insure optimum reliability in the stop motion system 44. The stop motion pulse can be described as rising to a first higher voltage level during the initial period of the stop motion pulse period. Next, the stop motion pulse gradually falls of to a second voltage level, as at 583. The level at 583 is maintained during the duration of the stop motion pulse period. At the termination of the stop motion pulse, the waveform falls to a negative voltage level at 585 below the zero voltage level at 586 and rises gradually to the zero voltage level at 586.

Line D of FIG. 13 represents the differential tracking error signal received from the recovery system 30 over the lines 42 and 46. The waveform shown on line D of FIG. 13A is a compensated differential tracking error achieved through the use of the combination of a stop motion pulse and a stop motion compensation pulse applied to the radial tracking mirror 28 according to the teaching of the present invention.

Line G of FIG. 13A represents the loop interrupt pulse generated by the stop motion pulse generator 567 and applied to the tracking servo subsystem 40 over the line 108. As previously mentioned, it is best to remove the differential tracking error signal as represented by the waveform on line D from application to the radial tracking mirror 28 during the stop miton interval period. The loop interrupt pulse shown on line G achieves this gating function. However, by inspection, it can be seen that the differential tracking error signal lasts for a period longer than the loop interrupt pulse shown on line G. The waveform shown on line E is the portion of the differential tracking error signal shown on line D which survives the gating by the loop interrupt pulse shown on line G. The waveform shown on line E is the compensated tracking error as interrupted by the loop interrupt pulse which is applied to the tracking mirror 28. Referring to line F, the high frequency signal represented generally under the bracket 590 indicates the output waveform of the zero crossing detector circuit 571 in the stop motion system 44. A zero crossing pulse is generated each time the differential error tracking signal shown in line D of FIG. 13A crosses through a zero bias level. While the information shown under the bracket 590 is helpful in maintaining a radial tracking mirror 28 in tracking a single information track, such information must be gated off at the beginning of the stop motion interval as indicated by the dashed lines 592 connecting the start of the stop motion pulse in line C of FIG. 13A and the absence of zero crossing detector pulses shown on line F of FIG. 13A. By referring again to line D, the differential tracking error signal rises to a first maximum at 594 and falls to a second opposite but equal maximum at 596. At point 598, the tracking mirror is passing over the zero crossing point 426 between two adjacent tracks 424 and 423 as shown with reference to line A of FIG. 8. This means that the mirror has traveled half way from the first track 424 to the second track 423. At this point indicated by the number 598, the zero crossing detector generates an output pulse indicated at 600. The output pulse 600 terminates the stop motion pulse shown on line C as represented by the vertical line segment 602. This termination of the stop motion pulse starts the negative pre-emphasis period 584 as previously described. The loop interrupt pulse is not affected by the output 600 of the zero crossing detector 571. In the preferred embodiment, improved performance is achieved by presenting the differential tracking error signal from being applied to the radial tracking mirror 28 too early in the jump back sequence before the radial tracking mirror 28 has settled down and acquired firm radial tracking of the desired track. As shown by reference to the waveform shown in line F, the zero crossing detector again begins to generate zero crossing pulses when the differential tracking error signal reappears as indicated at point 604. Referring to line H of FIG. 13A, there is shown a waveform representing the stop motion compensation sequence which begins coincidental with the end of the loop interrupt pulse shown on line G.

Referring to FIG. 13B, there is shown a plurality of waveforms explaining the relationship between the stop motion pulse as shown on line C of FIG. 13A, and the stop motion compensation pulse waveform as shown on the line H of FIG. 13A and repeated for convenience on line E of FIG. 13B. The compensation pulse waveform is used for generating a differential compensated tracking error as shown with reference to line D of FIG. 13B.

Line A of FIG. 13B shows the differential uncompensated tracking error signal as developed in the signal recovery subsystem 30. The waveform shown in FIG. A represents the radial tracking error signal as the read beam makes an abrupt departure from an information track on which is was tracking and moves towards one of the adjacent tracks positioned on either side of the track being read. The normal tracking error signal, as the beam oscillates slightly down the information track, is shown at the region 610 of Line A. The tracking error represents the slight side to side (radial) motion of the read beam 4 to the successively positioned reflective and non-reflective regions on the disc 5 as previously described. A point 612 represents the start of a stop motion pulse. The uncompensated tracking error is increasing to a first maximum indicated at 614. The region between 612 and 614 shows an increase in tracking error indicating the departure of the read beam from the track being read. From point 614, the differential tracking error signal drops to a point indicated at 616 which represents the mid point of an information track as shown at point 426 in line A of FIG. 8. However, the distance traveled by the read beam between points 612 and 616 on curve A in FIG. 13B is a movement of 0.8 microns and is equal to length of line 617. The uncompensated radial tracking error rises to a second maximum at point 618 as the read beam begins to approach the next adjacent track 423. The tracking error reaches zero at point 622 but is unable to stop and continues to a new maximum at 624. The radial tracking mirror 28 possesses sufficient inertia so that it is not able to instantaneously stop in response to the differential tracking error signal detecting a zero error at point 622 as the read beam crosses the next adjacent information track. Accordingly, the raw tracking error increases to a point indicated at 624 wherein the closed loop servoing effect of the tracking servo subsystem slows the mirror down and brings the read beam back towards the information track represented by the zero crossing differential tracking error as indicated as point 625. Additional peaks are identified at 626 and 628. These show a gradual damping of the differential tracking error as the radial tracking mirror becomes gradually positioned in its proper location to generate a zero tracking error, such as at points 612, 622, 625. Additional zero crossing locations are indicated at 630 and 632. The portion of the waveform shown in line A existing after point 632 shows a gradual return of the raw tracking error to its zero position as the read spot gradually comes to rest on the next adjacent track 423.

Point 616 represents a false indication of zero tracking error as the read beam passes over the center 426 of the region between adjacent tracks 424 and 423.

For optimum operation in a stop motion situation wherein the read beam jumps to the next adjacent track, the time allowed for the radial tracking mirror 28 to reacquire proper radial tracking is 300 microseconds. This is indicated by the length of the line 634 shown on line B. By observation, it can be seen that the radial tracking mirror 28 has not yet reacquired zero radial error position at the expiration of the 300 microsecond time period. Obviously, if more time were available to achieve this result, the waveform shown with reference to FIG. A would be suitable for those systems having more time for the radial tracking mirror to reacquire zero differential tracking error on the center of the next adjacent track.

Referring briefly to line D of FIG. 13, line 634 is redrawn to indicate that the compensated radial tracking error signal shown in line D does not include those large peaks shown with reference to line A. The compensated differential tracking error shown in line D is capable of achieving proper radial tracking by the tracking servo subsystem within the time frame allowed for proper operation of the video disc player 1. Referring briefly to line E of FIG. 13A, the remaining tracking error signal available after interruption by the loop interrupt pulse is of the proper direction to cooperate with the stop motion compensation pulses described hereinafter to bring the radial tracking mirror to its optimum radial tracking position as soon as possible.

The stop motion compensation generator 573 shown with reference to FIG. 12, applies the waveform shown in line E of FIG. 13B to the radial tracking mirror 28 by way of the line 106 and the amplifier 500 shown in FIG. 9. The stop motion pulse directs the radial tracking mirror 28 to leave the tracking of one information track and begin to seek the tracking of the next adjacent track. In response to the pulse from the zero crossing detector 571 shown in FIG. 12, the stop motion pulse generator 567 is caused to generate the stop motion compensation pulse shown in line E.

Referring to line E of FIG. 13B, the stop motion compensation pulse waveform comprises a plurality of individual and separate regions indicated at 640, 642 and 644, respectively. The first region 640 of the stop motion compensation pulse begins as the differential uncompensated radial tracking error at point 616 cross the zero reference level indicating that the mirror is in a mid track crossing situation. At this time, the stop motion pulse generator 567 generates the first portion 640 of the compensation pulse which is applied directly to the tracking mirror 28. The generation of the first portion 640 of the stop motion compensation pulse has the effect of reducing the peak 624 to a lower radial tracking displacement as represented by the new peak 624′ as shown in line B. It should be kept in mind that the waveforms shown in FIG. 13B are schematic only to show the overall interrelationship of the various pulses used in the tracking servo subsystem and the stop motion subsystem to cause a read beam to jump from one track to next adjacent track. Since the peak error 624′ is not as high as the error at peak 624, this has the effect of reducing the error at peak error point 626′ and generally shifting the remaining portion of the waveform to the left such that the zero crossings at 625′, 630′ and 632′ all occur sooner than they would have occurred without the presence of the stop motion compensation pulse.

Referring back to line E of FIG. 13B, the second portion 642 of the stop motion compensation pulse is of a second polarity when compared to the first region 640. The second portion 642 of the stop motion compensation pulse occurs at a point in time to compensate for the tracking error shown at 626′ of line B. This results in an even smaller radial tracking error being generated at that time and this smaller radial tracking error is represented as point 626″ on line C. Since the degree of the radial tracking error represented by the point 626″ of line C is significantly smaller than that shown with reference to point 626′ of line B, the maximum error in the opposite direction shown at point 626″ is again significantly smaller than that represented at point 626 of line A. This counteracting of the natural tendency of the radial tracking mirror 28 to oscillate back and forth over the information track is further dampened as indicated by the further movement to the left of points 628″ and 626″ with reference to their relative locations shown in lines B and A.

Referring again to line E of FIG. 13B and the third region 644 of the stop motion compensation pulse, this region 644 occurs at the time calculated to dampen the remaining long term tracking error as represented that portion of the error signal to the right of the zero crossing point 632″ shown in line C. Region 644 is shown to be approximately equal and opposite to this error signal which would exist if the portion 644 of compensation pulse did not exist. Referring to line D of FIG. 13B, there is shown the differential and compensated radial tracking error representative of the motion of the light beam as it is caused to depart from one information track being read to the next adjacent track under the control of a stop motion pulse and a stop motion compensation pulse. It should be noted that the waveform shown in line D of FIG. 13B can represent the movement in either direction although the polarity of various signals would be changed to represent the different direction of movement.

The cooperation between the stop motion subsystem 44 and the tracking servo subsystem 40 during a stop motion period will what now be described with reference to FIGS. 9 and 12 and their related waveforms. Referring to FIG. 9, the tracking servo subsystem 40 is in operation just prior to the initiation of a stop motion mode to maintain the radial tracking mirror 28 in its position centered directly atop of information track. In order to maintain this position, the differential tracking error is detected in the signal recovery subsystem 30 and applied to the tracking servo subsystem 40 by the line 42. In this present operating mode, the differential tracking error passes directly through the tracking servo loop switch 480, the amplifier 510 and the push-/pull amplifiers 500. That portion of the waveform shown at 591 on line D of FIG. 13A as being traversed.

The function generator 47 generates a stop motion mode signal for application to the stop motion mode gate 569 over a line 132. The function of the stop motion mode gate 569 is to generate a pulse in response to the proper location in a television frame for the stop motion mode to occur. This point is detected by the combined operation of the total video signal from the FM processing board 32 being applied to the white flag detector 566 over a line 134 in combination with the vertical sync pulse developed in the tangential servo system 80 and applied over a line 92. The window generator 562 provides an enabling signal which corresponds with a predetermined portion of the video signal containing the white flag indicator. The white flag pulse applied to the stop motion mode gate 569 is gated to the stop motion pulse generator 567 in response to the enabling signal received from the function generator 47 over the line 132. The enabling signal from the stop motion mode gate 569 initiates the stop motion pulse as shown with reference to line C of FIG. 13A. The output from the zero crossing detector 571 indicates the end of the stop motion pulse period by application of a signal to the stop motion pulse generator 567 over the line 572. The stop motion pulse from the generator 567 is applied to the tracking servo loop interrupt switch 480 by way of the gate 482 and the line 108. The function of the tracking servo loop interrupt switch 480 is to remove the differential tracking error currently being generated in the signal recovery subsystem 30 from the push/pull amplifiers 500 driving the radial tracking mirror 28. Accordingly, the switch 480 opens and the differential tracking error is no longer applied to the amplifiers 500 for driving the radial tracking mirror 28. Simultaneously, the stop motion pulse from the generator 567 is applied to the amplifiers 500 over the line 104. The stop motion pulse, in essence, is substituted for the differential tracking error and provides a driving signal to the push/pull amplifiers 500 for starting the read spot to move to the next adjacent information track to be read.

The stop motion pulse from the generator 567 is also applied to the stop motion compensation sequence generator 573 wherein the waveform shown with reference to line H of FIG. 13A and line E of FIG. 13B is generated. By inspection of line H, it is to be noted that the compensation pulse shown on line H occurs at the termination of the loop interrupt pulse on line G, which loop interrupt pulse is triggered by the start of the stop motion pulse shown on line C. The compensation pulse is applied to the push/pull amplifiers 500, over the line 106 shown in FIGS. 9 and 12, for damping out any oscillation in the operation of radial tracking mirror 28 caused by the application of the stop motion pulse.

As previously mentioned, the compensation pulse is initiated at the termination of the loop interrupt signal. Occurring simultaneously with the generation of the compensation pulse, the tracking servo loop interrupt switch 480 closes and allows the differential tracking error to be reapplied to the push/pull amplifiers 500. The typical waveform available at this point is shown in line E of FIG. 13A which cooperates with the stop motion compensation pulse to quickly bring the radial tracking mirror 28 into suitable radial tracking alignment.

Referring briefly to line A of FIG. 13C, two frames of television video information being read from the video disc 5 are shown. Line A represents the differential tracking error signal having abrupt discontinuities located at 650 and 652 representing the stop motion mode of operation. Discontinuities of smaller amplitude are shown at 654 and 656 to show the effect of errors on the surface of the video disc surface in the differential tracking error signal. Line B of FIG. 13C shows the FM envelope as it is read from the video disc surface. The stop motion periods at 658 and 660 show that the FM envelope is temporarily interrupted as the reading spot jumps tracks. Changes in the FM envelope at 662 and 664 show the temporary loss of FM as tracking errors cause the tracking beam to temporarily leave the information track.

In review of the stop motion mode of operation, the following combinations occur in the preferred embodiment. In a first embodiment, the differential tracking error signal is removed from the tracking mirror 28 and a stop motion pulse is substituted therefor to cause the radial tracking mirror to jump one track from that track being tracked. In this embodiment, the stop motion pulse has areas of pre-emphasis such as to help the radial tracking mirror to regain tracking of the new track to which it has been positioned. The differential tracking error is reapplied into the tracking servo subsystem and cooperate with the stop motion pulse applied to the radial tracking mirror to reacquire radial tracking. The differential tracking error can be re-entered into the tracking servo system for optimum results. In this embodiment, the duration of the loop interrupt pulse is varied for gating off the application of the differential tracking error into the push/pull amplifiers 500. The stop motion pulse is of fixed length in this embodiment. An alternative to this fixed length of the stop motion pulse is to initiate the end of the stop motion pulse at the first zero crossing detected after the beginning of the stop motion pulse was initiated. Suitable delays can be entered into this loop to remove any extraneous signals that may slip through due to misalignment of the beginning of the stop motion pulse and the detection of zero crossings in the detector 571.

A further embodiment includes any one of the above combinations and further includes the generation of a stop motion compensation sequence. In the preferred embodiment, the stop motion compensation sequence is initiated with the termination of the loop interrupt period. Coincidental with the termination of the loop interrupt period, the differential tracking error is reapplied into the tracking servo subsystem 40. In a further embodiment, the stop motion compensation pulse can be entered into the tracking servo subsystem over the line 106 at a period fixed in time from the beginning of the stop motion pulse as opposed to the ending of the loop interrupt pulse. The stop motion compensation sequence comprises a plurality of separate and distinct regions. In the preferred embodiment, the first region opposes the tendency of the tracking mirror to overshoot the next adjacent track and directs the mirror back into radial tracking of that next adjacent particular track. A second region is of lower amplitude than the first region and of opposite polarity to further compensate the motion of the radial tracking mirror as the spot again overshoots the center portion of the next adjacent track but in the opposite direction. The third region of the stop motion compensation sequence is of the same polarity as the first region, but of significantly lower amplitude to further compensate any tendency of the radial tracking mirror having the focus spot again leave the information track.

While in the preferred embodiment, the various regions of the stop motion sequence are shown to consist of separate individual regions. It is possible for these regions to be themselves broken down into individual pulses. It has been found by experiment that the various regions can provide enhanced operation when separated by zero level signals. More specifically, a zero level condition exists between region one and region two allowing the radial tracking mirror to move under its own inertia without the constant application of a portion of the compensation pulse. It has also been found by experiment that this quiescent period of the compensation sequence can coincide with the reapplication of the differential tracking error to the radial tracking mirrors. In this sense, region one, shown at 640, of the compensation sequence cooperates with the portion 604 shown in line E of FIG. 13A from the differential tracking error input into the tracking loop.

By observation of the compensation waveform shown in line E of FIG. 13B, it can be observed that the various regions tend to begin at a high amplitude and fall off to very low compensation signals. It can also be observed that the period of the various regions begin at a first relatively short time period and gradually become longer in duration. This coincides with the energy contained in the tracking mirror as it seeks to regain radial tracking. Initially in the track jumping sequence, the energy is high and the early portions of the compensation pulse are appropriately high to counteract this energy. Thereafter, as energy is removed from the tracking mirror, the corrections become less so as to bring the radial tracking mirror back into radial alignment as soon as possible.

Referring to FIG. 14, there is shown a block diagram of the FM processing system 32 employed in the video disc player 1. The frequency modulated video signal recovered from the disc 5 forms the input to the FM processing unit 32 over the line 34. The frequency modulated video signal is applied to a distribution amplifier 670. The distribution amplifier provides three equal unloaded representations of the received signal. The first output signal from the distribution amplifier is applied to a FM corrector circuit 672 over a line 673. The FM corrector circuit 672 operates to provide variable gain amplification to the received frequency modulated video signal to compensate for the mean transfer function of the lens 17 as it reads the frequency modulated video signal from the disc. The lens 17 is operating close to its absolute resolving power and as a result, recovers the frequency modulated video signal with different amplitudes corresponding to different frequencies.

The output from the FM corrector 672 is applied to an FM detector 674 over a line 675. The FM detector generates discriminated video for application to the remaining circuits requiring such discriminated video in the video disc player. A second output signal from the distribution amplifier 670 is applied to the tangential servo subsystem 80 over a line 82. A further output signal from the distribution amplifier 670 is applied to the stop motion subsystem 44 over the line 134.

Referring to FIG. 15, there is shown a more detailed block diagram of the FM corrector 672 shown in FIG. 14. The FM video signal from the amplifier 670 is applied to an audio subcarrier trap circuit 676 over the line 673. The function of the subcarrier trap circuit 676 is to remove all audio components from the frequency modulated video signal prior to application to a frequency selective variable gain amplifier 678 over a line 680.

The control signals for operating the amplifier 678 include a first burst gate detector 682 having a plurality of input signals. A first input signal is the chroma portion of the FM video signal as applied over a line 142. The second input signal to the burst gate 682 is the burst gate enable signal from the tangential servo system 80 over the line 144. The function of the burst gate 682 is to gate into an amplitude detector 684 over a line 686 that portion of the chroma signal corresponding to the color burst signal. The output from the amplitude detector 684 is applied to a summation circuit 688 over a line 690. A second input to the summation circuit 688 is from a variable burst level adjust potentiometer 692 over a line 694. The function of the amplitude detector 684 is to determine the first order lower chroma side band vector and apply it as a current representation to the summation circuit 688. The burst level adjust signal on the line 694 from the potentiometer 692 operates in conjunction with this vector to develop a control signal to an amplifier 696. The output from the summation circuit is applied to the amplifier 696 over the line 698. The output from the amplifier 696 is a control voltage for application to the amplifier 678 over a line 700.

Referring to FIG. 16, there is shown a number of waveforms helpful in understanding the operation of the FM corrector shown in FIG. 15. The waveform represented by the line 701 represents the FM corrector transfer function in generating control voltages for application to the amplifier 678 over the line 700. The line 702 includes four sections of the curve indicated generally at 702, 704, 706 and 708. These segments 702, 704, 706 and 708 represent the various control voltages generated in response to the comparison with the instantaneous color burst signal amplitude and the pre set level.

Line 710 represents the mean transfer function of the objective lens 17 employed for reading the successive light reflective regions 10 and light non-reflective regions 11. It can be seen upon inspection that the gain versus frequency response of the lens falls off as the lens reads the frequency modulated representations of the video signal. Referring to the remaining portion of FIG. 16, there is shown the frequency spectrum of the frequency modulated signals as read from the video disc. This indicates that the video signals are located principally between the 7.5 and 9.2 megahertz region at which the frequency response of the lens shown on line 710 is showing a significant decrease. Accordingly, the control voltage from the amplifier 696 is variable in nature to compensate for the frequency response of the lens. In this manner the effective frequency response of the lens is brought into a normalized or uniform region.

FM CORRECTOR SUBSYSTEM—NORMAL MODE OF OPERATION

The FM corrector subsystem functions to adjust the FM video signal received from the disc such that all recovered FM signals over the entire frequency spectra of the recovered FM signals are all amplified to a level, relative one to the other to reacquire their substantially identical relationships one to the other as they existed during the recording process.

The microscopic lens 17 employed in the video disc player 1 has a mean transfer characteristic such that it attenuates the higher frequencies more than it attenuates the lower frequencies. In this sense, the lens 17 acts similar to a low pass filter. The function of the FM corrector is to process the received FM video signal such that the ratio of the luminance signal to the chrominance signal is maintained regardless of the position on the disc from which the FM video signal is recovered. This is achieved by measuring the color burst signal in the lower chroma side band and storing a representation of its amplitude. This lower chroma side band signal functions as a reference amplitude.

The FM video signal is recovered from the video disc as previously described. The chrominance signal is removed from the FM video signal and the burst gate enable signal gates the color burst signal present on each line of FM video information into a comparison operation. The comparison operation effectively operates for sensing the difference between the actual amplitude of the color burst signal recovered from the video disc surface with a reference amplitude. The reference amplitude has been adjusted to the correct level and the comparison process indicates an error signal between the recovered amplitude of the color burst signal and the reference color burst signal indicating the difference in amplitude between the two signals. The error signal generated in this comparison operation can be identified as the color burst error amplitude signal. This color burst error amplitude signal is employed for adjusting the gain of a variable gain amplifier to amplify the signal presently being recovered from the video disc 5 to amplify the chrominance signal more than the luminance signal. This variable amplification provides a variable gain over the frequency spectrum. The higher frequencies are amplified more than the lower frequencies. Since the chrominance signals are at the higher frequencies, they are amplified more than the luminance signals. This variable amplification of signals results in effectively maintaining the correct ratio of the luminance signal to the chrominance signal as the reading process radially moves from the outer periphery to the inner periphery. As previously mentioned, the indicia representing the FM video signal on the video disc 5 change in size from the outer periphery to the inner periphery. At the inner periphery they are smaller than at the outer periphery. The smallest size indicia are at the absolute resolution power of the lens and the lens recovers the Fm signal represented by this smallest size indicia at a lower amplitude value than the lower frequency members which are larger in size and spaced farther apart.

In a preferred mode of operation, the audio signals contained in the FM video signal are removed from the FM video signal before application to the variable gain amplifier. The audio information is contained around a number of FM subcarrier signals and it has been found by experience that the removal of these FM subcarrier audio signals provides enhanced correction of the remaining video FM signal in the variable gain amplifier.

In an alternative mode of operation the frequency band width applied to the variable gain amplifier is that band width which is affected by the mean transfer function of the objective lens 17. More specifically, when a portion of the total FM recovered from the video disc lies in a range not affected by the mean transfer function, then this portion of the total waveform can be removed from that portion of the FM signal applied to the variable gain amplifier. In this manner, the operation of the variable gain amplifier is not complicated by signals having a frequency which need not be corrected because of the resolution characteristics of the objective lens 17.

The FM corrector functions to sense the absolute value of a signal recovered from the video disc, which signal is known to suffer an amplitude change due to the resolution power of the objective lens 17 used in the video disc signal. This known signal is then compared against a reference signal indicating the amplitude that the known signal should have. The output from the comparison is an indication of the additional amplification required for all of the signals lying in the frequency spectra affected by the resolving power of the lens. The amplifier is designed to provide a variable gain over the frequency spectra. Furthermore, the variable gain is further selective based on the amplitude of the error signal. Stated another way for a first error signal detected between the signal recovered from the disc and the reference frequency, the variable gain amplifier is operated at a first level of variable amplification over the entire frequency range of the affected signal. For a second level of error signal, the gain across the frequency spectra is adjusted a different amount when compared for the first color burst error amplitude signal.

Referring to FIG. 17, there is shown a block diagram of the FM detector circuit 674 shown with reference to FIG. 14. The corrected frequency modulated signal from the FM corrector 672 is applied to a limiter 720 over the line 675. The output from the limiter is applied to a drop-out detector and compensation circuit 722 over a line 724. A suitable drop-out detector circuit is described in a co-pending application Ser. No. 299,891 filed Oct. 24, 1972 entitled "Drop-Out Compensator" and filed in the name of Wayne Ray Dakin. It is the function of the limiter to change the corrected FM video signal into a discriminated video signal. The output from the drop-out detector 722 is applied to a low pass filter 726 over a line 728. The output from the low pass filter 726 is applied to a wide band video distribution amplifier 730 whose function is to provide a plurality of output signals on the line 66, 82, 134, 154, 156, 164 and 166, as previously described. The function of the FM detector is to change the frequency modulated video signal into a discriminated video signal as shown with reference to lines A and B of FIG. 18. The frequency modulated video signal is represented by a carrier frequency having carrier variations in time changing about the carrier frequency. The discriminated video signal is a voltage varying in time signal generally lying within the zero to one volt range suitable for display on the television monitor 98 over the line 166.

Referring to FIG. 19, there is shown a block diagram of the audio processing circuit 114. The frequency modulated video signal from the distribution amplifier 670 of the FM processing unit 32, as shown with reference to FIG. 14, applies one of its inputs to an audio demodulator circuit 740. The audio demodulator circuit provides a plurality of output signals, one of which is applied to an audio variable controlled oscillator circuit 742 over a line 744. A first audio output is available on a line 746 for application to the audio accessory unit 120 and a second audio output signal is available on a line 747 for application to the audio accessory unit 120 and/or the audio jacks 117 and 118. The output from the audio voltage controlled oscillator is a 4.5 megahertz signal for application to the RF modulator 162 over the line 172.

Referring to FIG. 20, there is shown a block diagram of the audio demodulator circuit 740 shown with reference to FIG. 19. The frequency modulated video signal is applied to a first band pass filter 750 having a central band pass frequency of 2.3 megahertz, over the line 160 and a second line 751. The frequency modulated video signal is applied to a second band pass filter 752 over the line 160 and a second line 754. The first band pass filter 750 strips the first audio channel from the FM video signal, applies it to an audio FM discriminator 756 over a line 758. The audio FM discriminator 756 provides an audio signal in the audio range to a switching circuit 760 over a line 762.

The second band pass filter 752 having a central frequency of 2.8 megahertz operates to strip the second audio channel from the FM video input signal and applies this frequency spectra of the total FM signal to a second video FM discriminator 764 over a line 766. The second audio channel in the audio frequency range applied to the switching circuit 760 over a line 768.

The switching circuit 760 is provided with a plurality of additional input signals. A first of which is the audio squelch signal from the tracking servo subsystem as applied thereto over the line 116. The second input signal is a selection command signal from the function generator 47 as applied thereto over the line 170. The output from the switching circuit is applied to a first amplifier circuit 770 over a line 771 and to a second amplifier circuit 772 over a line 773. The lines 771 and 773 are also connected to a summation circuit indicated at 774. The output from the summation circuit 774 is applied to a third amplifier circuit 776. The output from the first amplifier 770 is the channel one audio signal for application to the audio jack 117. The output from the second amplifier 772 is the second channel audio signal for application to the audio jack 118. The output from the third amplifier 776 is the audio signal to the audio VCO 742 over the line 744. Referring briefly to FIG. 21, there is shown on line A the frequency modulated envelope as received from the distribution amplifier in the FM processing unit 32. The output of the audio FM discriminator for one channel is shown on line B. In this manner, the FM signal is changed an audio frequency signal for application to the switching circuits 760, as previously described.

Referring to FIG. 22, there is shown a block diagram of the audio voltage controlled oscillator 742 as shown with reference to FIG. 19. The audio signal from the audio demodulator is applied to a band pass filter 780 over the line 744. The band pass filter passes the audio frequency signals to a summation circuit 782 by way of a pre-emphasis circuit 784 and a first line 786 and a second line 788.

The 3.58 megahertz color subcarrier frequency from the tangential servo system 80 is applied to a divide circuit 790 over the line 140. The divide circuit 790 divides the color subcarrier frequency by 2048 and applies the output signal to a phase detector 792 over a line 794. The phase detector has a second input signal from the 4.5 megahertz voltage controlled oscillator circuit as applied to a second divide circuit 798 and a first line 800 and 802. The divide circuit 798 divides the output of the VCO 796 by 1144. The output from the phase detector is applied to an amplitude and phase compensation circuit 804. The output from the circuit 804 is applied as a third input to the summation circuit 782. The output from the voltage controlled oscillator 796 is also applied to a low pass filter 806 by the line 800 and a second line 808. The output from the filter 806 is the 4.5 megahertz frequency modulated signal for application to the RF modulator 182 by the line 172. The function of the audio voltage controlled oscillator circuit is to prepare the audio signal received from the audio demodulator 740 to a frequency which can be applied to the RF modulator 162 so as to be processed by a standard television receiver 96.

Referring briefly to FIG. 23, there can be seen on line A a waveform representing the audio signal received from the audio demodulators and available on the line 744. Line B of FIG. 23 represents the 4.5 megahertz carrier frequency. Line C of FIG. 23 represents the 4.5 megahertz modulated audio carrier which is generated in the VCO circuit 796 for application to the RF modulator 162.

Referring to FIG. 24, there is shown a block diagram of the RF modulator 162 employed in the video disc player. The video information signal from the FM processing circuit 32 is applied to a DC restorer 810 over the line 164. The DC restorer 810 readjusts the blanking level of the received video signal. The output from the restorer 810 is applied to a first balanced modulator 812 over a line 814.

The 4.5 megahertz modulated signal from the audio VCO is applied to a second balanced modulator 816 over the line 172. An oscillator circuit 818 functions to generate a suitable carrier frequency corresponding to one of the channels of a standard television receiver 96. In the preferred embodiment, the Channel 3 frequency is selected. The output from the oscillator 818 is applied to the first balanced modulator 812 over a line 820. The output from the oscillator 818 is applied to the second balanced modulator 816 over the line 822. The output from the modulator 812 is applied to a summation circuit 824 over a line 826. The output from the second balanced modulator 816 is applied to the summation circuit 824 over the line 828. Referring briefly to the waveform shown in FIG. 25, line A shows the 4.5 megahertz frequency modulated signal received from the audio VCO over the line 172. Line B of FIG. 25 shows the video signal received from the FM processing circuit 32 over the line 164. The output from the summation circuit 824 is shown on line C. The signal shown on line C is suitable for processing by a standard television receiver. The signal shown on line C is such as to cause the standard television receiver 96 to display the sequential frame information as applied thereto.

Referring briefly to FIG. 26, there is shown a video disc 5 having contained thereon a schematic representation of an information track at an outside radius as represented by the numeral 830. An information track schematically shown at the inside radius is shown by the numeral 832. The uneven form of the information track at the outside radius demonstrates an extreme degree of eccentricity arising from the effect of uneven cooling of the video disc 5.

Referring briefly to FIG. 27, there is shown a schematic view of a video disc 5 having contained thereon an information track at an outside radius represented by the numeral 834. An information track at an inside radius is represented by the numeral 836. This FIG. 27 shows the eccentricity effect of an off-center relationship of the tracks to a central aperture indicated generally at 838. More specifically, the off-center aperture effectively causes the distance represented by a line 840 to be effectively different from the length of the line 842. Obviously, one can be larger than the other. This represents the off-centered position of the center aperture hole 838.

Figure 28:
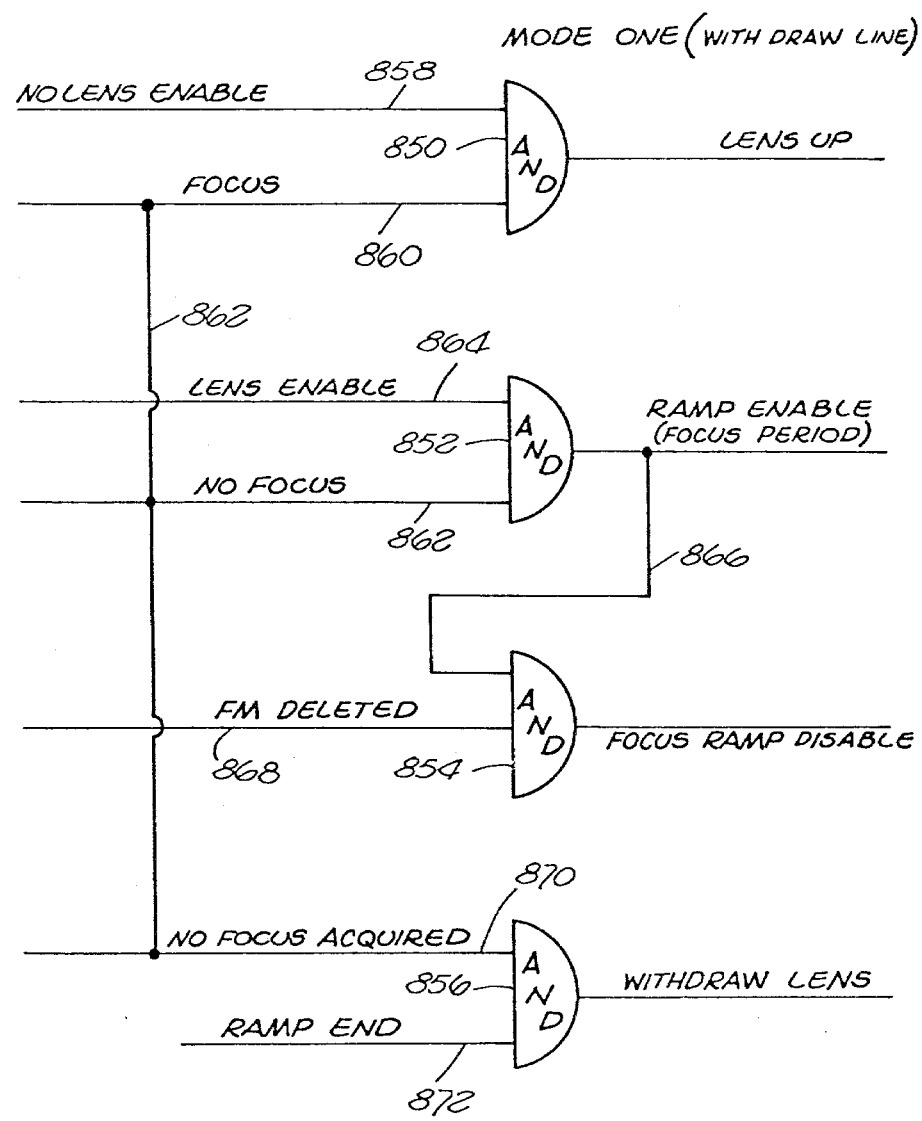
FIG. 28 is a logic diagram demonstrating the normal acquire focus mode of operation of the focus servo employed in the video disch shown in FIG. 1.

Referring to FIG. 28, there is shown a logic diagram representing the first mode of operation of the focus servo 36.

The logic diagram shown with reference to FIG. 28 comprises a plurality of AND function gates shown at 850, 852, 854 and 856. The AND function gate 850 has a plurality of input signals, the first of which is the $\overline{\text{LENS ENABLE}}$ applied over a line 858. The second input signal to the AND gate 850 is the $\overline{\text{FOCUS SIGNAL}}$ applied over a line 860. The AND gate 852 has a plurality of input signals, the first of which is the $\overline{\text{FOCUS SIGNAL}}$ applied thereto for the line 860 and a second line 862. The second input signal to the AND function gate 852 is the lens enable signal on a line 864. The output from the AND function gate 852 is the ramp enable signal which is available for the entire period the ramp signal is being generated. The output from the AND function gate 852 is also applied as an input signal to the AND function gate 854 over a line 866. The AND function gate 854 has a second input signal applied over the line 868. The signal on the line 868 is the FM detected signal. The output from the AND function gate 854 is the focus acquire signal. This focus acquire signal is also applied to the ramp generator 278 for disabling the ramping waveform at that point. The AND function gate 856 is equipped with a plurality of input signals, the first of which is the $\overline{\text{FOCUS SIGNAL}}$ applied thereto over the line 860 and an additional line 870. The second input signal to the AND function gate 856 is a ramp end signal applied over a line 872. The output signal from the AND function gate 856 is the withdraw lens enabling signal. Briefly, the logic circuitry shown with reference to FIG. 28 generates the basic mode of operation of the lens servo. Prior to the function generator 47 generating a lens enable signal, the $\overline{\text{LENS ENABLE}}$ signal is applied to the AND function gate 850 along with the $\overline{\text{FOCUS SIGNAL}}$. This indicates that the player is in a inactivated condition and the output signal from the AND function gate indicates that the lens is in the fully withdrawn position.

When the function generator generates a lens enable signal for application to the AND gate 852, the second input signal to the AND gate 852 indicates that the video disc player 1 is not in the focus mode. Accordingly, the output signal from the AND gate 852 is the ramp enable signal which initiates the ramping waveform shown with reference to line B of FIG. 6A. The ramp enable signal also indicates that the focus servo is in the acquire focus mode of operation and this enabling signal forms a first input to the AND function gate 854. The second input signal to the AND function gate 854 indicates that FM has been successfully detected and the output from the AND function gate 854 is the focused acquire signal indicating that the normal play mode has been successfully entered and frequency modulated video signals are being recovered from the surface of the video disc. The output from the AND function gate 856 indicates that a successful acquisition of focus was not achieved in the first focus attempt. The ramp end signal on the line 872 indicates that the lens has been fully extended towards the video disc surface. The $\overline{\text{FOCUS SIGNAL}}$ on the line 870 indicates that focus was not successfully acquired. Accordingly, the output from the AND function gate 856 withdraws the lens to its upper position at which time a focus acquire operation can be reattempted.

Figure 29:
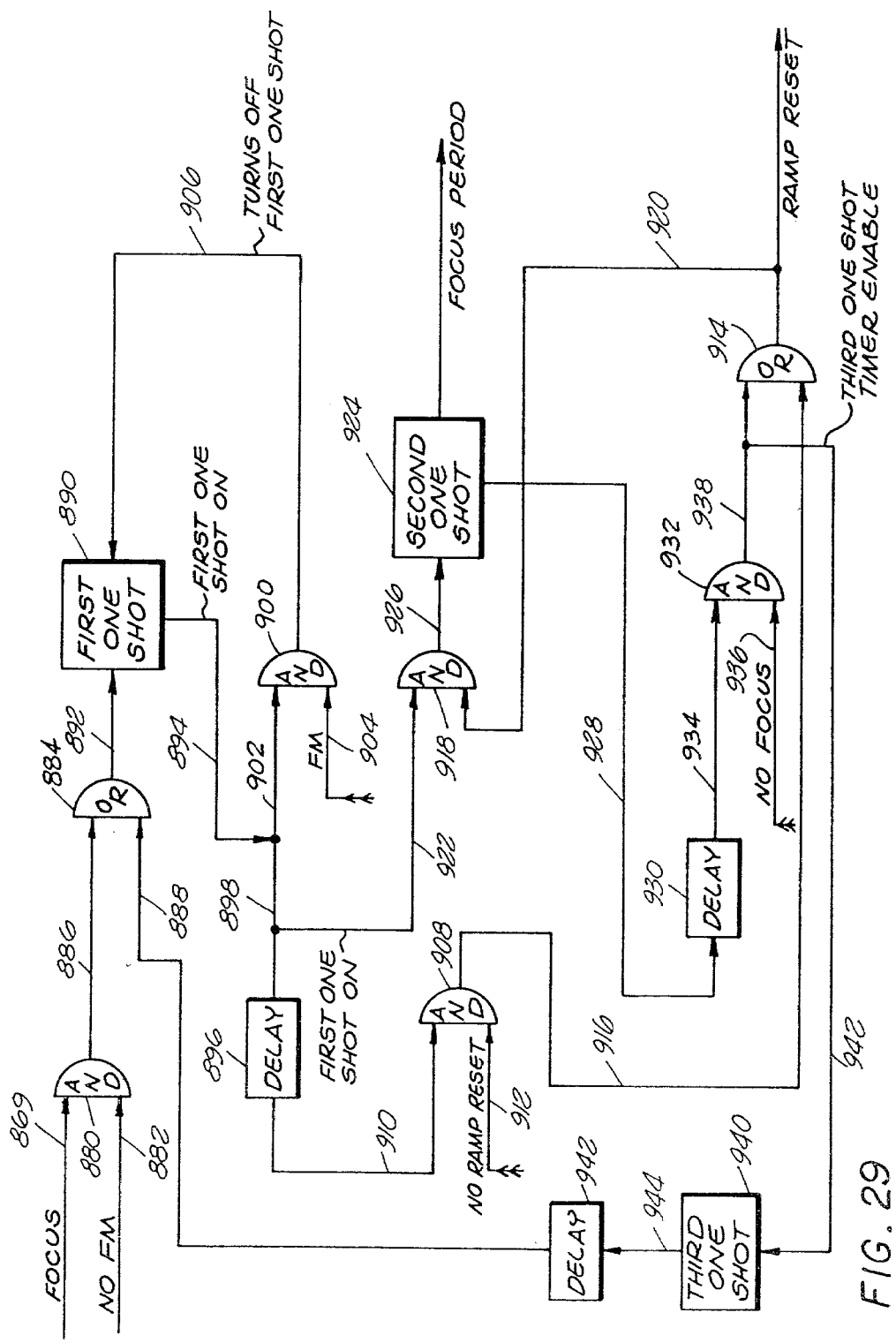
FIG. 29 is a logic diagram demonstrating other modes of operation of the focus servo shown with reference to FIG. 1.

Referring to FIG. 29, there is shown a logic diagram illustrating the additional modes of operation of the lens servo. A first AND gate 880 is equipped with a plurality of input signals, the first of which is the focus signal generated by the AND gate 854 and applied to the AND gate 880 over a line 869. The $\overline{\text{FM DETECT SIGNAL}}$ is applied to the AND gate 880 over a line 882. The output from the AND gate 880 is applied to an OR gate 84 over a line 886. A second input signal is applied to the OR gate 884 over a line 888. The output from the OR function gate 884 is applied to a first one-shot circuit shown at 890 over a line 892 to drive the one-shot into its state for generating an output signal on the line 894. The output signal on the line 894 is applied to a delay circuit 896 over a second line 898 and to a second AND function gate 900 over a line 902. The AND function gate 900 is equipped with a second input signal on which the FM detect signal is applied over a line 904. The output from the AND function gate 900 is applied to reset the first one-shot 890 over a line 906.

The output from the delay circuit 896 is applied as a first input signal to a third AND function gate 908 over a line 910. The AND function gate 908 is equipped with a second input signal which is the $\overline{\text{RAMP RESET SIGNAL}}$ applied to the AND function gate 908 over a line 912. The output from the AND function gate 908 is applied as a first input signal to an OR circuit 914 over a line 916.

The output from the OR function gate 914 is the ramp reset enabling signal which is applied at least a fourth AND function gate 918 over a line 920. The second input signal to the AND function gate 918 is the output signal from the first one-shot 890 over the line 894 and a second line 922. The output from the AND function gate 918 is applied to a second one-shot circuit 924 over a line 926. The output from the second one-shot indicates the timing period of the focus ramp voltage shown on line B of FIG. 6A. The input signal on line 926 activates the one-shot 924 to generate its output signal on a line 928 for application of a delay circuit 930. The output from the delay circuit 930 forms one input to a sixth AND function gate 932 over a line 932. The AND function 934 has as its second input signal the $\overline{\text{FOCUS SIGNAL}}$ available on a line 936. The output from the AND function gate 932 is applied as the second input signal to the OR function gate 914 over a line 938. The output from the AND function gate 932 is also applied to a third one-shot circuit 940 over a line 942. The output from the third one-shot is applied to a delay circuit 942 over a line 944. As previously mentioned, the output from the delay circuit 942 is applied to the OR function gate 884 over the line 888.

The one-shot 890 is the circuit employed for generating the timing waveform shown on line D of FIG. 6A. The second one-shot 924 is employed for generating a waveform shown on line E of FIG. 6A. The third one-shot 940 is employed for generating the waveform shown on line F of FIG. 6A.

In one form of operation, the logic circuitry shown in FIG. 29 operates to delay the attempt to reacquire focus due to momentary losses of FM caused by imperfections on the video disc. This is achieved in the following manner. The AND function gate 880 generates an output signal on the line 886 only when the video disc player is in the focus mode and there is a temporary loss of FM as indicated by the $\overline{\text{FM DETECT SIGNAL}}$ on line 882. The output signal on the line 886 triggers the first one-shot to generate a timing period of predetermined short length during which the video disc player will be momentarily stopped from reattempting to acquire lost focus superficially indicated by the availability of the FM DETECT SIGNAL on the line 882. The output from the first one-shot forms one input to the AND function gate 900. If the FM detect signal available on 984 reappears prior to the timing out of the time period of the first one-shot, the output from the AND circuit 900 resets the first one-shot 890 and the video disc player continues reading the reacquired FM signal. Assuming that the first one-shot is not reset, then the following sequence of operation occurs. The output from the delay circuit 896 is gated through the AND function gate 908 by the RAMP RESET SIGNAL available on line 912. The RAMP RESET SIGNAL is available in the normal focus play mode. The output from the AND gate 908 is applied to the OR gate 914 for generating the reset signal causing the lens to retrack and begin its focus operation. The output from the OR gate 914 is also applied to a turn on the second one-shot which establishes the shape of the ramping waveform shown in FIG. B. The output from the second one-shot 924 is essential coextensive in time with the ramping period. Accordingly, when the output from the second one-shot is generated, the machine is caused to return to the attempt to acquire focus. When focus is successfully acquired, the FOCUS SIGNAL on line 936 does not gate the output from the delay circuit 930 through to the OR function gate 914 to restart the automatic focus procedure. However, when the video disc player does not acquire focus the FOCUS SIGNAL on line 936 gates the output from the delay circuit 930 to restart automatically the focus acquire mode. When focus is successfully acquired, the output from the delay line is not gated through and the player continues in its focus mode.

While the invention has been particularly shown and described with reference to a preferred embodiment and alterations thereto, it would be understood by those skilled in the art that various changes in form and detail may be made therein without departing from the spirit and scope of the invention.

What is claimed is:

1. A spindle servo system for use in an apparatus for recovering an information signal from an information track arranged on an information bearing surface of a disc, wherein the information signal includes a signal defining a time base, and the apparatus includes optical system means for directing a source beam of radiation to the information track and for directing a modulated beam of radiation containing the information signal to signal recovery means for recovering the information signal from the modulated beam, the spindle servo system comprising:

spindle motor means for rotating the disc to impart relative motion between the disc and the source beam and thereby produce the modulated beam;

spindle tachometer means including first and second tachometer elements coupled to the spindle motor means, for producing first and second spindle tachometer signals indicative of the actual angular rate of rotation of the spindle motor means;

spindle reference signal means for producing a spindle reference signal representing a desired angular rate of rotation of the spindle motor means;

means for comparing each of the first and second spindle tachometer signals with the spindle reference signal, to produce first and second error signals representative of the detected differences therebetween; and means for summing together the first and second error signals to produce a spindle motor control signal for coupling to the spindle motor means, to produce the desired angular rate of rotation.

2. A spindle servo system as set forth in claim 1, wherein:

the first and second spindle tachometer signals both have frequencies indicative of the actual angular rate of rotation of the spindle motor means, the spindle reference signal has a frequency representing the desired angular rate of rotation of the spindle motor means, and the means for comparing comprises phase detection means for detecting the relative phase angles of such signals.

3. A spindle servo system as set forth in claim 2, wherein the information signal includes a color video signal, and the reference signal means comprises a color subcarrier oscillator and divider means for dividing the color subcarrier to produce the reference signal having a frequency representing the desired angular rate of rotation.

4. A spindle servo system as set forth in claim 3, wherein the color subcarrier oscillator is the sole source of the spindle reference signal, whereby fixed errors in the time base of the information signal recovered from the modulated beam are prevented.

5. A spindle servo system as set forth in claim 1, wherein the apparatus includes focus means for moving an objective lens along a prescribed path to focus the source beam on the disc, and the spindle servo system further comprises lock detection means, responsive to the spindle motor control signal, for enabling the focus means only when the spindle motor means is rotating at the desired angular rate of rotation.

6. A spindle servo system as set forth in claim 1, wherein the apparatus includes carriage means for translating the disc and the optical system means relative to one another along a radius of the disc, and the spindle servo system further comprises lock detection means, responsive to the spindle motor control signal, for enabling the carriage means only when the spindle motor means is rotating at the desired angular rate of rotation.

7. A spindle servo system as set forth in claim 1, wherein the apparatus includes beam steering means for steering the source beam to follow a path defined by the information track, and the spindle servo system further comprises lock detection means, responsive to the spindle motor control signal, for enabling the beam steering means only when the spindle motor means is rotating at the desired angular rate of rotation.

* * * * *